US012619918B2

(12) United States Patent
Whelan et al.

(10) Patent No.: US 12,619,918 B2
(45) Date of Patent: *May 5, 2026

(54) PREDICTING TARGETED FUTURE ENGAGEMENT USING TRAINED ARTIFICIAL INTELLIGENCE PROCESSES

(71) Applicant: The Toronto-Dominion Bank, Toronto (CA)

(72) Inventors: Patrick James Whelan, Oakville (CA); Anson Wah Chun Wong, Toronto (CA); Maksims Volkovs, Toronto (CA); Tomi Johan Poutanen, Toronto (CA)

(73) Assignee: THE TORONTO-DOMINION BANK, Toronto (CA)

( * ) Notice: Subject to any disclaimer, the term of this patent is extended or adjusted under 35 U.S.C. 154(b) by 929 days.

This patent is subject to a terminal disclaimer.

(21) Appl. No.: 17/528,362

(22) Filed: Nov. 17, 2021

(65) Prior Publication Data

US 2022/0207432 A1     Jun. 30, 2022

Related U.S. Application Data

(60) Provisional application No. 63/132,981, filed on Dec. 31, 2020.

(51) Int. Cl.
| | |
|---|---|
| *G06N 5/04* | (2023.01) |
| *G06N 5/01* | (2023.01) |
| *G06N 20/20* | (2019.01) |

(52) U.S. Cl.
CPC ............... *G06N 20/20* (2019.01); *G06N 5/01* (2023.01)

(58) Field of Classification Search
CPC .................................. G06N 20/20; G06N 5/01
See application file for complete search history.

(56) References Cited

U.S. PATENT DOCUMENTS

| | | | | |
|---|---|---|---|---|
| 11,556,815 | B1 * | 1/2023 | Stave ...................... | G06N 20/20 |
| 2021/0295427 | A1 * | 9/2021 | Shiu .......................... | G06N 5/04 |
| 2022/0207432 | A1 * | 6/2022 | Whelan .................... | G06N 5/01 |

* cited by examiner

*Primary Examiner* — Hassan Mrabi
(74) *Attorney, Agent, or Firm* — NIXON PEABODY LLP

(57) ABSTRACT

The disclosed embodiments include computer-implemented processes that determine, in real time, a likelihood of a targeted future engagement using trained artificial intelligence processes. For example, an apparatus may generate a first input dataset based on elements of first interaction data associated with a first temporal interval, and based on an application of a trained first artificial intelligence process to the first input dataset, generate output data representative of a predicted likelihood of an occurrence of each of a plurality of target events during a second temporal interval. The second temporal interval is subsequent to the first temporal interval and is separated from the first temporal interval by a corresponding buffer interval. Further, the apparatus may transmit at least a portion of the output data to a computing system, which may generate notification data associated with the predicted likelihood, and provision the notification data to a device.

21 Claims, 8 Drawing Sheets

300

400

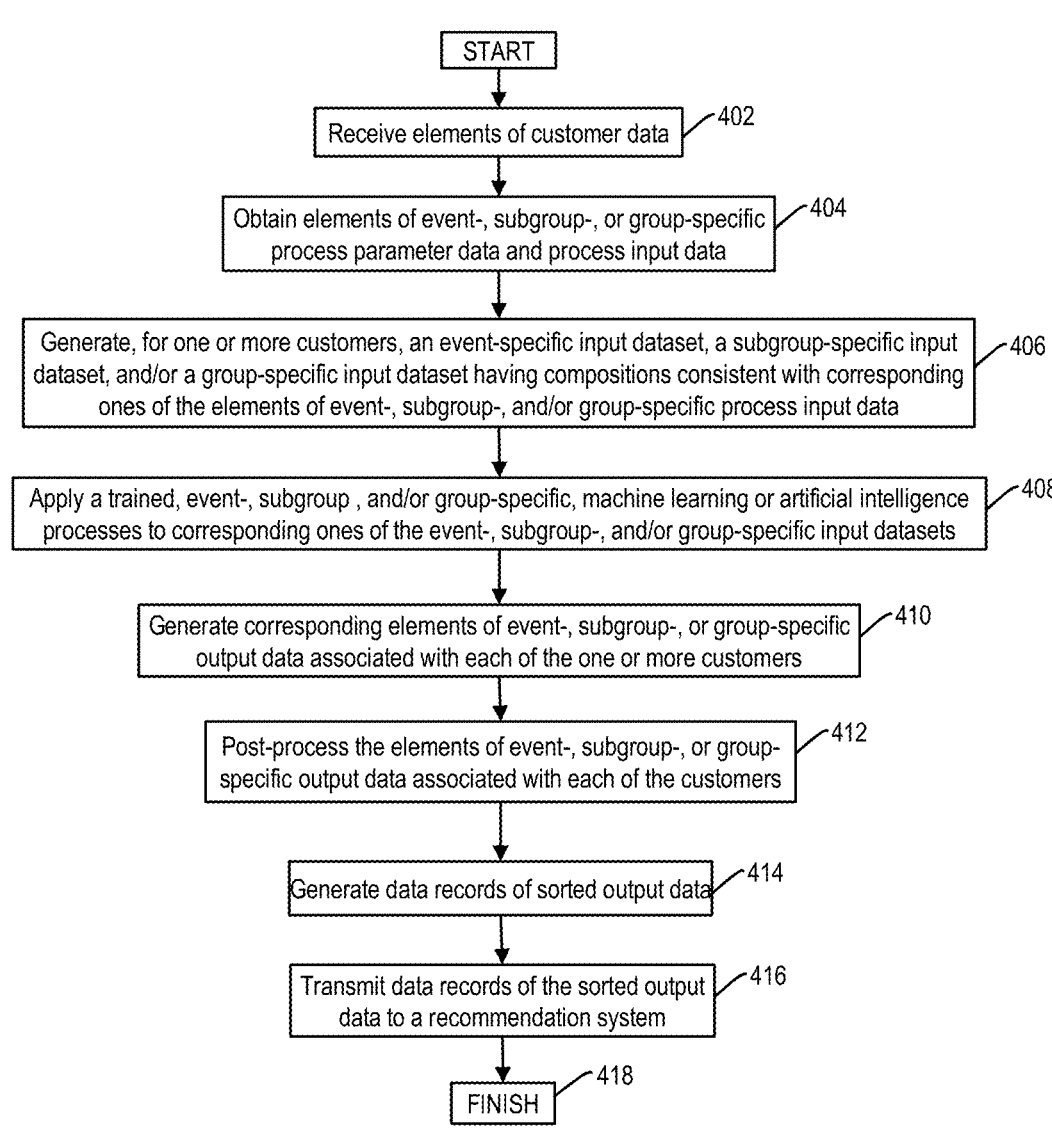

START

Receive elements of customer data ⟋402

Obtain elements of event-, subgroup-, or group-specific ⟋404
process parameter data and process input data Generate, for one or more customers, an event-specific input dataset, a subgroup-specific input ⟋406
dataset, and/or a group-specific input dataset having compositions consistent with corresponding
ones of the elements of event-, subgroup-, and/or group-specific process input data Apply a trained, event-, subgroup , and/or group-specific, machine learning or artificial intelligence ⟋408
processes to corresponding ones of the event-, subgroup-, and/or group-specific input datasets Generate corresponding elements of event-, subgroup-, or group-specific ⟋410
output data associated with each of the one or more customers Post-process the elements of event-, subgroup-, or group- ⟋412
specific output data associated with each of the customers Generate data records of sorted output data ⟋414

Transmit data records of the sorted output ⟋416
data to a recommendation system

FINISH ⟋418

FIG. 4

PREDICTING TARGETED FUTURE ENGAGEMENT USING TRAINED ARTIFICIAL INTELLIGENCE PROCESSES

CROSS-REFERENCE TO RELATED APPLICATION

This application claims the benefit of priority under 35 U.S.C. § 119(e) to prior U.S. Provisional Application No. 63/132,981, filed Dec. 31, 2020, the disclosure of which is incorporated by reference herein to its entirety.

TECHNICAL FIELD

The disclosed embodiments generally relate to computer-implemented systems and processes that facilitate a prediction of targeted future engagement using trained artificial intelligence processes.

BACKGROUND

Financial institutions offer a variety of financial products or financial services to their customers, both through in-person branch banking and through various digital channels, and offer a variety of access products that enable these customers to access the financial products or financial services via the various digital channels. Computing systems associated with these financial institution maintain often elements of data that characterize their customers' engagement with these financial products, financial services, or access products, and the elements of maintained, customer-specific data may characterize a time-evolving relationship between the customers and the financial, institutions.

SUMMARY

In some examples, an apparatus includes a memory storing instructions, a communications interface, and at least one processor coupled to the memory and the communications interface. The at least one processor is configured to execute the instructions to generate a first input dataset based on elements of first interaction data associated with a first temporal interval. Based on an application of a trained first artificial intelligence process to the first input dataset, the at least one processor is further configured to execute the instructions to generate output data representative of a predicted likelihood of an occurrence of each of a plurality of target events during a second temporal interval. The second temporal interval is subsequent to the first temporal interval and is separated from the first temporal interval by a corresponding buffer interval. The at least one processor is further configured to execute the instructions to transmit at least a portion of the output data to a computing system via the communications interface. The computing system is configured to generate, based on the portion of the output data, notification data associated with the predicted likelihood of the occurrence of at least one of the target events and to provision the notification data to a device.

In other examples, a computer-implemented method includes generating, using at least one processor, a first input dataset based on elements of first interaction data associated with a first temporal interval. The computer-implemented method also includes, using the at least one processor, and based on an application of a trained first artificial intelligence process to the first input dataset, generating output data representative of a predicted likelihood of an occurrence of each of a plurality of target events during a second temporal interval. The second temporal interval is subsequent to the first temporal interval and is separated from the first temporal interval by a corresponding buffer interval. The computer-implemented method also includes transmitting, using the at least one processor, at least a portion of the output data to a computing system. The computing system is configured to generate, based on the portion of the output data, notification data associated with the predicted likelihood of the occurrence of at least one of the target events and to provision the notification data to a device.

Further, in some examples, an apparatus includes a memory storing instructions, a communications interface, and at least one processor coupled to the memory and the communications interface. The at least one processor is configured to execute the instructions to receive, via the communications interface, output data associated with a plurality of target events from a computing system. The output data is generated based on an application of a trained artificial intelligence process to elements of interaction data associated with a first temporal interval, and the output data is representative of a predicted likelihood of an occurrence of each of the target events during a second temporal interval. The second temporal interval is subsequent to the first temporal interval and is separated from the first temporal interval by a corresponding buffer interval. Based on the output data, the at least one processor is further configured to execute the instructions to generate elements of notification data associated with the predicted likelihood of the occurrence of at least one of the target events during the second temporal interval. The at least one processor is further configured to execute the instructions to transmit the elements of notification data to a device via the communications interface. The elements of notification data cause an application program executed at the device to present digital content associated with the at least one of the target events within a digital interface.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed exemplary embodiments, as set forth in the accompanying claims.

BRIEF DESCRIPTION OF THE DRAWINGS

FIG. 4 is a flowchart of an exemplary process for predicting a likelihood of future occurrences of engagement events based on an application of one or more trained machine learning or artificial intelligence processes to customer-specific input datasets, in accordance with some exemplary embodiments.

Like reference numbers and designations in the various drawings indicate like elements.

DETAILED DESCRIPTION

Figure 1A:
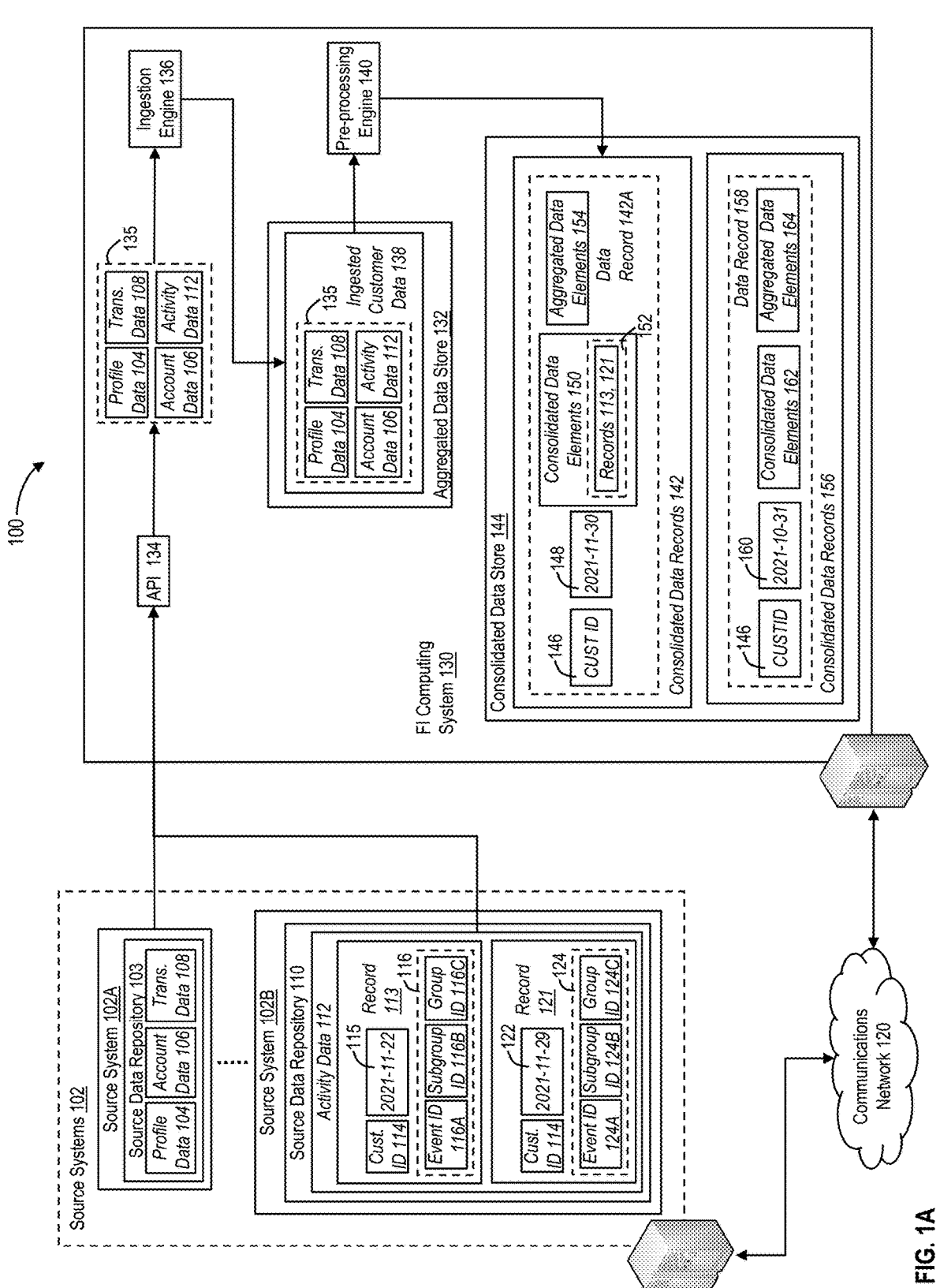
FIGS. 1A and 1B are block diagrams illustrating portions of an exemplary computing environment, in accordance with some exemplary embodiments.

Modern financial institutions offer a variety of financial products or financial services to their customers, both through in-person branch banking and through various digital channels. In some instances, computing systems operated by these financial institutions may maintain, within corresponding data repositories, elements of customer-specific data that identify and characterize the each these customers, their interaction with the financial institution, and an engagement of these customers with not only the financial products or services provisioned by the financial institution, but also one or more access products that facilitate the customer interaction with the financial institution via corresponding digital channels, such as, but not limited to, mobile applications, web-based online banking platforms, or voice-based banking platforms provisioned by the financial institution and accessible to the customers via corresponding computing devices or systems. The elements of customer-specific data maintained by the computing systems of the financial institutions may, for each of the customers, characterize not only a current relationship with a corresponding one of the financial institutions (e.g., during a current temporal interval), but also characterize a temporal evolution of that relationship over prior temporal intervals.

By way of example, one or more computing systems of a financial institution (e.g., the one or more FI computing systems) may obtain, generate, and maintain, for one or more customers of the financial institution, elements of customer profile data that identify the corresponding customer and characterize that customer's relationship with the financial institution, elements of account data identifying and characterizing one or more financial products issued to the corresponding customer by the financial institution, and elements of transaction data identifying and characterizing one or more transactions involving these issued financial products, e.g., during a current temporal interval and across one or more prior temporal intervals. Further, and as described herein, the one or more FI computing systems may also obtain, generate, and maintain one or more elements of activity data that identify, and characterize, engagements between corresponding ones of the customers and one or more financial products, financial services, or access products during the current temporal interval and across the one or more prior temporal intervals.

Each of the discrete engagements between a particular customer of the financial institution and a corresponding one of the financial products, financial services, or access products during a temporal interval (e.g., one of the current or prior temporal intervals, described herein) may represent an occurrence of an engagement event involving the particular customer and the corresponding financial product, financial service, or access product during that temporal interval. Further, and as described herein, the discrete engagements may include, among other things, one or more singular engagements of the customer with corresponding ones of the financial products, financial services, or access products, which may occur a single time during particular customer's relationship with the financial institution, and one or more repeated engagements of the customer with corresponding ones of the financial products, financial services, or access products, which may occur repeatedly throughout the particular customer's relationship between with the financial institution. As described herein, each of the customer engagements, and the occurrences of the corresponding engagement events, may be associated with, and assigned to, a respective one of a plurality of event-specific groupings established by the financial institution, e.g., to a respective "event group." In some instances, each of the event groups may be associated with a financial product or a financial service provisioned by, or available for provisioning by, the financial institution, or with an access product enable the particular customer to access, or interact with, the available financial products or financial services (e.g., via one or more digital portals established and maintained by the one or more FI computing systems, etc.). Further, one or more of the event groups described herein may be subdivided into a corresponding plurality of subgroups, e.g., "event subgroups," and in some instances, one or more of the discrete engagements, and the occurrences of the corresponding engagement events, may be associated with, and assigned to a respective event group and to a corresponding one of the event subgroups associated with that respective event group.

Further, and for each of the occurrences of the engagement events involving the particular customer and the financial products, financial services, or access products, the elements of activity data may include, among other things, a customer identifier associated with the particular customer (e.g., an alphanumeric character string, such as a customer name or an authentication credential, etc.), a temporal identifier (e.g., a time or date of the occurrence of the corresponding engagement event), an event identifier associated with the corresponding engagement event and further, identifiers of an event subgroup (e.g., a "subgroup identifier") and an event group (e.g., a "group identifier") associated with the corresponding engagement event. As described herein, the event identifier may include an alphanumeric character string that identifies, or characterizes an engagement associated with, the corresponding engagement event, and each of the subgroup and group identifiers may include an alphanumeric character string that identifies, or characterizes, a respective one of the event subgroups and event groups associated with the corresponding engagement event.

In some examples, the elements of customer profile, account, transaction, and activity data obtained, generated, and maintained by the one or more FI computing systems may identify and characterize one or more existing customers of the financial institution, and the engagement of these existing customers with one or more financial products, financial services, or access products provisioned, or available to provisioning, by the financial institution during a current temporal interval. Further, the elements of customer profile, account, transaction, and activity data obtained, generated, and maintained by the one or more FI computing systems may also characterize an engagement of not only these existing customers, but also one or more prior customers of the financial institution, with corresponding financial products, financial services, or access products provisioned, or available to provisioning, by the financial institution, during one or more prior temporal intervals. These prior temporal intervals may, for example, extend through multiple periods of economic growth and decline, and extend through multiple phases of the customers' personal or professional lives, and the elements of customer profile, account, transaction, and activity data may characterize the customers' engagement with the financial products, financial services, and access products during each of the customer's relationships with the financial institution.

Further, the one or more FI computing systems may also perform operations that predict future engagements of a customer of the financial institution with one, or more, financial products or financial services provisioned, or available for provisioning, by the financial institution, and that transmit recommendations associated with these predicted future engagements to a computing system or device associated with the particular customer. Many of these existing predictive processes, however, fail to analyze the time-evolving relationship of the particular customer with the financial institution (e.g., as characterized by the obtained, generated, and maintained elements of customer profile, account, transaction, and activity data described herein), and instead predict the likelihood of a future engagement of the particular customer with a corresponding financial product or financial service based an analysis of the elements of customer profile, account, and transaction data that characterize the customer's interaction and engagement with the financial institution during a current temporal interval.

Although these existing predictive processes may enable the one or more FI computing systems to establish a likelihood that the financial product or financial service would be available to the customer during a current temporal interval based on the elements of customer profile, account, transaction, or activity data characterizing the customer's current interaction and engagement with the financial institution, these existing predictive processes are often incapable of analyzing any temporal variation in the engagement of the particular customer, or any other of the customers, of the financial institution and corresponding ones of the financial products, financial services, or access products during one or more of the prior temporal intervals, and as such, are often incapable of predictive a likelihood that the particular customer will engage with the financial product or service during a future temporal interval. Furthermore, as these exemplary predictive processes often fail to analyze the temporal evolution in the customers' engagement with corresponding ones of the financial products, financial services, or access products, these exemplary processes may also be incapable of predicting accurately occurrences of repeated, future engagements of the customers with corresponding ones of the financial products, financial services, or access products, which may occur repeatedly throughout the particular customer's relationship between with the financial institution In some examples, described herein, one or more targeted machine learning or artificial intelligence processes may be trained adaptively to predict, at a temporal prediction point for a customer of a financial institution, a likelihood of an occurrence of each of a plurality of target engagement events during a future temporal interval and further, a likelihood of an occurrence of an engagement event associated with each of a plurality of target event subgroups and additionally, or alternatively, each of a plurality of target events groups, during the future temporal interval, using target-specific training data associated with a first prior temporal interval, and using target-specific validation data associated with a second, and distinct, prior temporal interval. The targeted machine learning or artificial intelligence process may include an ensemble or decision-tree process, such as a gradient-boosted decision-tree process (e.g., XGBoost process), and the training and validation data may include, but are not limited to, elements of customer profile, account, or transaction data characterizing corresponding ones of the customers of the financial institution during one or more prior temporal intervals, along with elements of activity data identifying and characterizing engagements of corresponding ones of the customers with financial products, financial services, or access products provisioned, or available for provisioning, to the corresponding customers of the financial institution during the one or more prior temporal intervals.

Through the implementation of the exemplary processes described herein, the one or more FI computing systems (e.g., which may collectively establish a distributed computing cluster associated with the financial institution) may perform operations that adaptively, and successively, train and validate the target-specific machine learning or artificial intelligence process based on corresponding subsets of the target-specific training and validation data. Further, the trained machine learning or artificial intelligence process (e.g., the trained gradient-boosted, decision-tree process described herein) may further ingest input datasets associated with one or more customers of the financial institution, and based on an application of the trained, target-specific gradient-boosted, decision-tree processes to the input datasets, the one or more FI computing systems may generate, at a temporal prediction point for each of the customers, elements of target-specific output data indicative of a predicted likelihood of an occurrence of each of a plurality of target engagement events, a predicted likelihood of an occurrence of an engagement event associated with each of a plurality of target event subgroups, and additionally, or alternatively, a predicted likelihood of an occurrence of an engagement event associated with each of a plurality of target events groups, during the future temporal interval, such a one-month interval disposed between one and two months from the temporal prediction point.

Certain of these exemplary processes, which adaptively train and validate a target-specific gradient-boosted, decision-tree process using customer- and target-specific training and validation datasets associated with respective training and validation periods, and which apply the target-specific trained and validated gradient-boosted, decision-tree process to additional customer-specific input datasets, may enable the one or more of the FI computing systems to predict, in real-time, and for a customer of the financial institution, a predicted likelihood of an occurrence of each of a plurality of target engagement events, a predicted likelihood of an occurrence of an engagement event associated with each of a plurality of target event subgroups, and additionally, or alternatively, a predicted likelihood of an occurrence of an engagement event associated with each of a plurality of target events groups, during a future temporal interval (e.g., via an implementation of one or more parallelized, fault-tolerant distributed computing and analytical protocols across clusters of graphical processing units (GPUs) and/or tensor processing units (TPUs)). These exemplary processes, which leverage customer- and target-specific training and validation datasets that characterize prior engagements of the customer with corresponding ones of provisioned financial products, financial services, of access products, and which predict likelihoods of singular and repeated engagements of the customer with financial products, financial services, of access products provisioned, or available for provisioning, by the financial institution during a future temporal interval, may be implemented in addition to, or as an alternate to, exiting predictive processes that establish a likelihood that a financial product or financial service would be available to the particular customer during a current temporal interval based on elements of customer profile, account, transaction, or activity data characterizing the particular customer's current relationship and engagement with the financial institution.

Figure 1B:
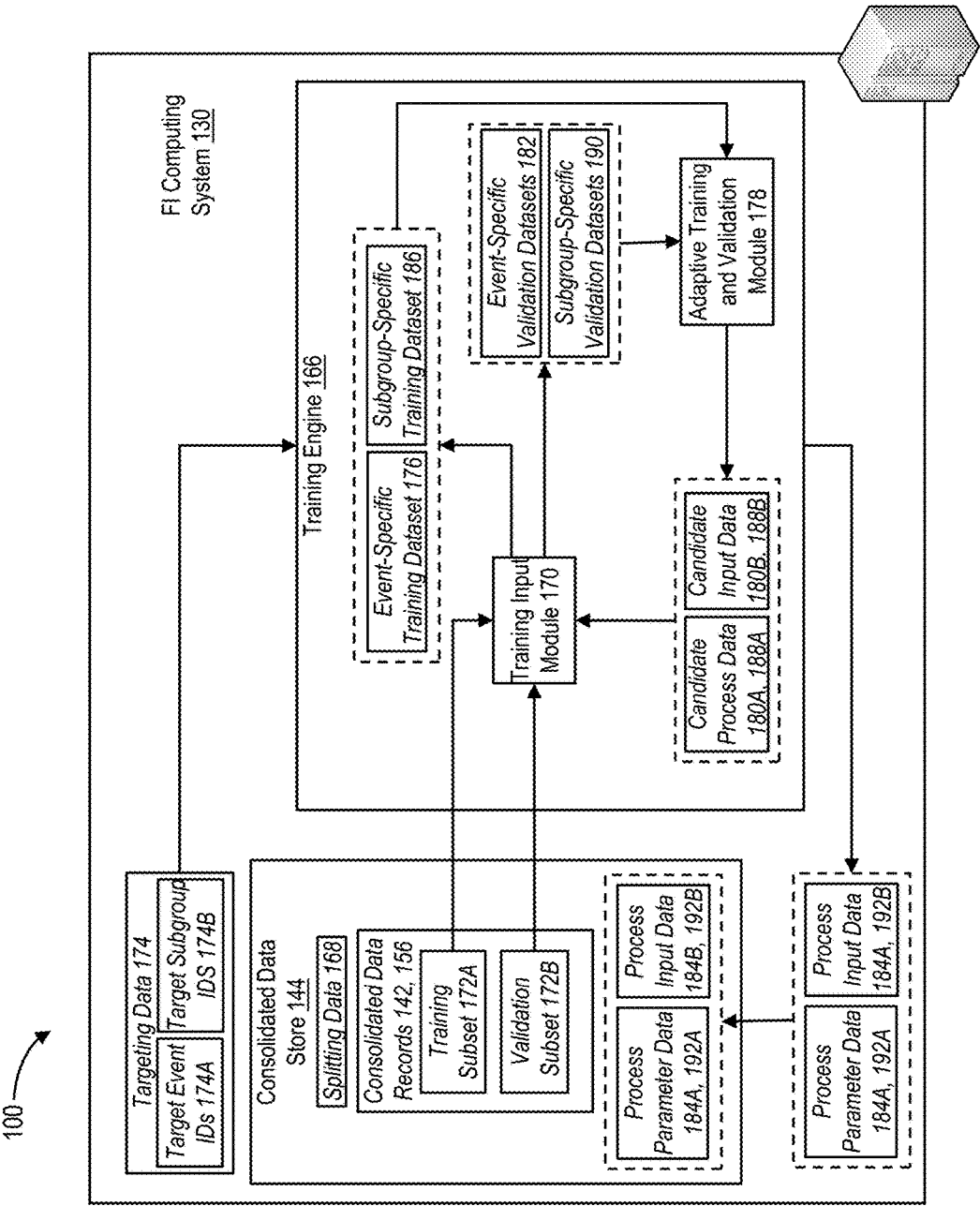

A. Exemplary Processes for Training Targeted Machine Learning or Artificial Intelligence Processes Using Activity Data in a Distributed Computing Environment FIGS. 1A and 1B illustrate components of an exemplary computing environment 100, in accordance with some exemplary embodiments. For example, as illustrated in FIG. 1A, environment 100 may include one or more source systems 102, such as, but not limited to, source systems 102A and 102B, and one or more computing systems associated with, or operated by, a financial institution, such as a financial institution (FI) computing system 130, In some instances, each of source systems 102 (including source systems 102A and 102B) and FI computing system 130 may be interconnected through one or more communications networks, such as communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In some examples, each of source systems 102 (including source systems 102A and 102B) and FI computing system 130 may represent a computing system that includes one or more servers and tangible, non-transitory memories storing executable code and application modules. Further, the one or more servers may each include one or more processors, which may be configured to execute portions of the stored code or application modules to perform operations consistent with the disclosed embodiments. For example, the one or more processors may include a central processing unit (CPU) capable of processing a single operation (e.g., a scalar operations) in a single clock cycle. Further, each of source systems 102 (including source systems 102A and 102B) and FI computing system 130 may also include a communications interface, such as one or more wireless transceivers, coupled to the one or more processors for accommodating wired or wireless internet communication with other computing systems and devices operating within environment 100, such as, but not limited to, across communications network 120.

Further, in some instances, source systems 102 (including source systems 102A and 102B) and FI computing system 130 may each be incorporated into a respective, discrete computing system. In additional, or alternate, instances, one or more of source systems 102 (including source systems 102A and 102B) and FI computing system 130 may correspond to a distributed computing system having a plurality of interconnected, computing components distributed across an appropriate computing network, such as communications network 120 of FIG. 1A. For example, FI computing system 130 may correspond to a distributed or cloud-based computing cluster associated with and maintained by the financial institution, although in other examples, FI computing system 130 may correspond to a publicly accessible, distributed or cloud-based computing cluster, such as a computing cluster maintained by Microsoft Azure™, Amazon Web Services™, Google Cloud™, or another third-party provider.

For example, FI computing system 130 may include a plurality of interconnected, distributed computing components, such as those described herein (not illustrated in FIG. 1A), which may be configured to implement one or more parallelized, fault-tolerant distributed computing and analytical processes (e.g., an Apache Spark™ distributed, cluster-computing framework, a Databricks™ analytical platform, etc.). Further, and in addition to the CPUs described herein, the distributed computing components of FI computing system 130 may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle. Through an implementation of the parallelized, fault-tolerant distributed computing and analytical protocols described herein, the distributed computing components of FI computing system 130 may perform any of the exemplary processes described herein, to ingest elements of data associated with the customers of the financial institution, including elements of customer profile, account, transaction, and activity data involving these customers, to preprocess, filter, and/or consolidate the ingested data elements using any of the exemplary operations described herein, and to store the preprocessed, filtered, and/or consolidated data elements within a data repository accessible to the distributed computing components of FI computing system 130 (e.g., within a portion of a distributed file system, such as a Hadoop distributed file system (HDFS)).

Further, and through an implementation of the parallelized, fault-tolerant distributed computing and analytical protocols described herein, the distributed components of FI computing system 130 may perform operations in parallel that not only train adaptively one or more targeted machine learning or artificial intelligence processed (e.g., the gradient-boosted, decision-tree process described herein) using corresponding training and validation datasets extracted from temporally distinct subsets of the preprocessed, filtered, and/or consolidated data elements, but also apply the trained machine learning or artificial intelligence process to customer-specific input datasets. Through the application of the trained machine learning or artificial intelligence process to the customer-specific input datasets, FI computing system 130 may perform any of the exemplary processes described herein to generate, in real time, elements of output data indicative of a predicted likelihood that customers of the financial institution will engage with one or more financial products, financial services, or access products provisioned by the financial institution, or with one or more predetermined groups or subgroups of these financial products, financial services, or access products, during a future temporal interval, such a one-month interval disposed between one and two months from a prediction date. The implementation of the parallelized, fault-tolerant distributed computing and analytical protocols described herein across the one or more GPUs or TPUs included within the distributed components of FI computing system 130 may, in some instances, accelerate the training, and the post-training deployment, of the machine learning and artificial intelligence process when compared to an adaptive training and deployment of the targeted machine learning and artificial intelligence processes across comparable clusters of CPUs capable of processing a single operation per clock cycle.

Referring back to FIG. 1A, one or more source systems 102 may maintain, within corresponding tangible, non-transitory memories, a data repository that includes elements of data that identify and characterize the customers of the financial institution, the interactions between the customer and financial institution, and in some instances, interactions between the customers and corresponding products or services offered by the financial institution. For instance, source system 102A may be associated with, or operated by, the financial institution, and may maintain, within the corresponding one or more tangible, non-transitory memories, a source data repository 103 that includes one or more elements of customer profile data 104, account data 106, and transaction data 108. By way of example, customer profile data 104 may include a plurality of data records associated with associated with corresponding ones of the customers of the financial institution, and for a particular customer of the financial institution, the data record of customer profile data 104 may include, among other things, a unique customer identifier (e.g., an alphanumeric character string, such as a login credential, a customer name, etc.), residence data (e.g., a street address, etc.), other elements of contact data (e.g., a mobile number, an email address, etc.), values of demographic parameters that characterize the particular customer (e.g., an age, occupations, marital status, etc.), and other data characterizing the relationship between the particular customer and the financial institution.

Account data 106 may also include a plurality of data records that identify and characterize one or more financial products or financial instruments issued by the financial institution to corresponding ones of the customers. For example, the data records of account data 104B may include, for each of the financial products issued to corresponding ones of the customers, one or more identifiers of the financial product (e.g., an account number, etc.), one or more unique customer identifiers (e.g., an alphanumeric character string, such as a authentication credential, a customer name, etc.), and additional information characterizing a balance or current status of the financial product (e.g., payment due dates or amounts, delinquent accounts statuses, etc.). Examples of these financial products may include, but are not limited to, one or more deposit accounts issued to corresponding ones of the customers (e.g., a savings account, a checking account, etc.), one or more brokerage or retirements accounts issued to corresponding ones of the customers by the financial institutions, one or more accounts associated with mutual funds of exchange-traded funds, and one or more secured credit products issued to corresponding ones of the customers by the financial institution (e.g., a home mortgage, a home-equity line-of-credit (HELOC), an auto loan, etc.). The financial products may also include one or more unsecured credit products issued to corresponding ones of the customers by the financial institution, and examples of these unsecured credit products may include, but are not limited to, a credit-card account or a line-of-credit.

Further, transaction data 108 may include data records that identify, and characterize one or more initiated, settled, or cleared transactions involving respective ones of the customers and corresponding ones of the financial products held by the customers. Examples of these transactions include, but are not limited to, purchase transactions, bill-payment transactions, electronic funds transfers (e.g., payroll deposits, etc.), currency conversions, purchases of securities, derivatives, or other tradeable instruments, electronic funds transfer (EFT) transactions, peer-to-peer (P2P) transfers or transactions, or real-time payment (RTP) transactions. For instance, and for a transaction involving a corresponding customer and corresponding financial product, the data records of transaction data 108 may include, but are limited to, a customer identifier associated with the corresponding customer (e.g., the alphanumeric character string described herein, etc.), a counterparty identifier associated with a counterparty to the particular transaction (e.g., an alphanumeric character string, a counterparty name, etc.), an identifier of the corresponding financial product or instrument (e.g., a tokenized account number, expiration data, card-security-code, etc.), and values of one or more parameters of the particular transaction (e.g., a transaction amount, a transaction date, etc.).

The disclosed embodiments are, however, not limited to these exemplary elements of customer profile data 104, account data 106, or transaction data 108. In other instances, source system 102A may maintain, within source data repository 103, any addition, or alternate, elements of customer profile data 104, account data 106, and transaction data 108 that identify and characterize the customers of the financial institution, the interactions between the customer and financial institution, and in some instances, interactions between the customers and corresponding products or services offered by the financial institution. Further, although stored in FIG. 1A within source data repository maintained within the tangible, non-transitory memories of source system 102A, the exemplary elements of customer profile data 104, account data 106, and transaction data 108 may be maintained by any additional or alternate computing system associated with the financial institution, including, but not limited to, within one or more tangible, non-transitory memories of FI computing system 130.

As illustrated in FIG. 1A, source system 102B may also be associated with, or operated by, the financial institution, and may maintain, within the one or more tangible, non-transitory memories, an additional source data repository, e.g., source data repository 110, that includes elements of activity data 112. Activity data 112 may include one or more structured or unstructured data records, and each of the structured or unstructured data records may identify, and characterize, a discrete engagement between a customer of the financial institution and a corresponding financial product, financial service, or access product during a prior temporal interval. In some instances, these discrete engagements may include one or more singular engagements, which may occur a single time during a relationship between a corresponding customer and the financial institution, and one or more repeated engagements, which occur repeatedly throughout the relationship between a corresponding customer and the financial institution.

Examples of the one or more singular engagements may include, but are not limited to, a request to access a mobile banking application associated with the financial institution, to register for a web-based online banking platform of the financial institution, or to initiate an application for a particular credit-card account, and examples of the repeated interactions may include, but are not limited to, an initiation of a transaction involving a credit-card account, a request to access funds within a deposit account, or a to purchase, or sell, units of a security or a mutual fund. Further, an occurrence of a corresponding one of the discrete engagements (e.g., a corresponding one of the singular or repeated engagements described herein) during a particular temporal interval may represent an occurrence of an engagement event involving a corresponding one of the customers and the corresponding financial product, financial service, or access product during that particular temporal interval.

As described herein, each of the discrete engagements, and the associated engagement events, may be associated with a corresponding event-specific grouping established by the financial institution, e.g., a corresponding "event group." In some instances, one or more of the event groups may be associated with a financial product or a financial service provisioned to customers by the financial institution, and examples of these event groups may include, but are not limited to, event groups associated with demand accounts, credit-card accounts, insurance products, mortgage products, home-equity line-of-credit (HELOC) products, mutual funds, personal lending products, or other financial products or financial services available for provisioning to customers of the financial institution. Additionally, or alternative, one or more of the event groups may be associated with access products that enable the customers of the financial institution to access, or interact with, the available financial products or financial services (e.g., via one or more digital portals established and maintained by FI computing system 130, etc.). The disclosed embodiments are, however, not limited to these exemplary product-specific groupings, and in other instances, the financial institution may assign the discrete engagements, and the associated engagement events, to any additional, or alternative, grouping appropriate to corresponding ones of the customers and to corresponding ones of the products associated with, or involved in, the discrete engagements and engagement events.

Further, one or more of the event groups may also be associated with corresponding pluralities of sub-groupings (e.g., "event subgroups"), and in some instances, the financial institution may also assign one or more of the discrete engagements, and the associated engagement events, to a corresponding one of the event subgroups associated with the respective (and previously assigned) event group. By way of example, the financial institution may establish, for the event group associated with the demand accounts, event subgroups associated with savings accounts, personal checking accounts, business checking accounts, direct deposits involving the demand accounts, or transactions involving the demand accounts, and the financial institution may establish, for the event group associated with the credit-card accounts, event subgroups associated with new credit-card accounts, a requested increase to a credit limit of an existing credit-card account, a requested modification to a term or condition of an existing credit-card account, or a request for a balance transfers involving existing credit-card accounts. Further, in some examples, the financial institution may also establish, for the event group associated with the access products, event subgroups associated with a mobile banking application associated with the financial institution, a web-based online banking platform of the financial institution, or a voice-based access platform associated with the financial institution. The disclosed embodiments are, however, not limited to these exemplary event subgroups, and in other instances, the financial institution may establish any additional, or alternate, event subgroups that are appropriate to the corresponding one of the product-, service-, or access-specific groupings established by the financial institution, to the corresponding financial products, financial services, and access products, and to the discrete engagements and engagement events.

By way of example, a particular customer of the financial institution may, through a digital portal of the financial institution (e.g., via a web page generated by a web browser executed at a customer device, etc.), request an increase to a credit limit associated with a rewards credit-card account issued by the financial institution on Nov. 22, 2021 (e.g., a credit card account that accrues rewards points based on purchases, etc.). In some instances, the requested increase to a credit limit may correspond to an occurrence of a discrete engagement event involving the customer and the financial institution on Nov. 22, 2021, and the discrete engagement event, and the rewards credit-card account, may be associated with a corresponding event group established by the financial institution (e.g., the credit-card event group described herein) and with a corresponding one of the event subgroups of that event group (e.g., the subgroup of the credit-card event group associated with a requested credit-limit increase, as described herein). Further, and as illustrated in FIG. 1A, activity data 112 may maintain one or more structured or unstructured data records, such as data record 113, that identifies and characterizes the occurrence of the engagement event involving the particular customer and the financial institution on Nov. 22, 2021, e.g., the requested credit-limit increase associated with the rewards credit-card account.

In some instances, data record 113 may include a unique customer identifier 114 of the particular customer (e.g., an alphanumeric character string "CUSTID") and temporal identifier 115 that characterizes a time or date of the occurrence of the customer engagement, and the corresponding engagement event, on Nov. 22, 2021 (e.g., the alphanumeric character string "2021-11-22"), and elements of event data 116 that identify the engagement event, e.g., the requested increase to the credit limit associated with the rewards credit-card account. By way of example, event data 116 may include, among other things, an event identifier 116A associated with engagement event (e.g., a product name of the rewards credit-card account subject to the requested credit-limit increase, such as "REWARDS CARD," etc.), a subgroup identifier 116B of the event subgroup associated with engagement event (e.g., an alphanumeric identifier of the event subgroup associated with the requested credit-limit increase, such as a character string "LIMIT INCREASE"), and a group identifier 116C of the event group associated with the engagement event (e.g., an alphanumeric identifier of the credit-card event group, such as a character string "CREDIT CARD," etc.).

Further, in some instances, the particular customer of the financial institution may access a digital portal of the financial institution (e.g., a web page generated by the executed web browser at the customer device, etc.), and provide input to the digital portal (e.g., via an input unit of the customer device) that requests access to a web-based, online banking platform provided by the financial institution on Nov. 29, 2021 (e.g., by logging into the web-based, online banking platform using corresponding authentication credentials). In some instances, the particular customer's log-in to the web-based, online banking platform may correspond to an occurrence of an additional engagement event involving the customer and the financial institution on Nov. 29, 2021, and as described herein, the additional engagement may be associated with a corresponding event group (e.g., the access-specific event group described herein) and a corresponding one of the event subgroups associated with that event group (e.g., the subgroup of the access event group associated with the web-based online banking platform, as described herein). As illustrated in FIG. 1A, activity data 112 may maintain one or more structured or unstructured data records, such as data record 121, that identifies and characterizes the occurrence of the additional engagement, e.g., through which the particular customer logs into the web-based online banking platform on Nov. 29, 2021.

For example, data record 121 may include customer identifier 114, a temporal identifier 122 that characterizes a time or date of the occurrence of the additional engagement event on Nov. 29, 2021 (e.g., the alphanumeric character string "2021-11-29"), and elements of event data 124 that identify the occurrence of the additional engagement event on Octo Nov. 29, 2021. In some instances, the elements of event data 124 may include an event identifier 124A associated with additional engagement event (e.g., an alphanumeric character string, such as "LOG INTO ONLINE BANKING," that characterizes the requested to access the web-based, online banking platform, etc.), a subgroup identifier 126B associated with the additional engagement event (e.g., an alphanumeric identifier of the event subgroup associated with the web-based, online banking platform, such as the character string "ONLINE BANKING," etc.), and a group identifier 126C associated with the access event group (e.g., an alphanumeric character string "ACCESS," etc.).

The disclosed embodiments are, however, not limited to these exemplary elements of data that identify and characterize the discrete engagements associated with the requested credit-limit increase and the registration for the web-based online banking platform, and in other instances, data records 113 and 121 may include any additional, or alternate, elements of data characterizing the discrete engagements, and the corresponding engagement events, associated with respective ones of the requested credit-limit increase and the registration for the web-based online banking platform. Further, although described in terms of data records 113 and 121, activity data 112 may include any additional, or alternate, number of structured or unstructured data records that identify and characterize occurrences of discrete customer engagements, and corresponding engagement events, involving corresponding customers of the financial institution and corresponding financial products, financial services, or access products during one or more temporal intervals.

Referring back to FIG. 1A, FI computing system 130 may perform operations that establish one or more centralized data repositories within corresponding ones of the tangible, non-transitory memories. For example, as illustrated in FIG. 1A, FI computing system 130 may establish an aggregated data store 132, which maintains, among other things, elements of the customer profile, account, transaction, activity data associated with one or more of the customers of the financial institution, which may be ingested by FI computing system 130 (e.g., source systems 102A and 102B) using any of the exemplary processes described herein. Aggregated data store 132 may, for instance, correspond to a data lake, a data warehouse, or another centralized repository established and maintained, respectively, by the distributed components of FI computing system 130, e.g., through a Hadoop™ distributed file system (HDFS).

For example, FI computing system 130 may execute one or more application programs, elements of code, or code modules that, in conjunction with the corresponding communications interface, establish a secure, programmatic channel of communication with each of source systems 102, including source system 102A and source system 102B, across network 120, and may perform operations that access and obtain all, or a selected portion, of the elements of customer profile, account, transaction, and/or activity data maintained by corresponding ones of source systems 102. As illustrated in FIG. 1A, source system 102A may perform operations that obtain all, or a selected portion, of customer profile data 104, account data 106, and transaction data 108, from source data repository 103, and transmit the obtained portions of customer profile data 104, account data 106, and transaction data 108 across network 120 to FI computing system 130. Further, source system 102B may also perform operations that obtain all, or a selected portion, of activity data 112, including data records 113 and 121 from source data repository 110, and that transmit the obtained portions of activity data 112 (including data records 113 and 121) across network 120 to FI computing system 130. In some instances, each of source systems 102, including source systems 102A and 102B, may perform operations that transmit respective portions of customer profile data 104, account data 106, transaction data 108, and activity data 112 across network 120 to FI computing system 130 in batch form and in accordance with a predetermined temporal schedule (e.g., on a daily basis, on a monthly basis, etc.), or in real-time on a continuous, streaming basis.

A programmatic interface established and maintained by FI computing system 130, such as application programming interface (API) 134, may receive the portions of customer profile data 104, account data 106, and transaction data 108 from source system 102A and the portions of activity data 112 (including data records 113 and 121) from source system 102B. As illustrated in FIG. 1A, API 134 may route the received portions of customer profile data 104, account data 106, transaction data 108, and activity data 112 (including data records 113 and 121) to a data ingestion engine 136 executed by the one or more processors of FI computing system 130. In some instances, the received portions of customer profile data 104, account data 106, transaction data 108, and activity data 112 (including data records 113 and 121) may represent elements of interaction data 135 characterizing interactions and engagements of the customer with the financial institution, and with the financial products, financial services, or access products provisioned by the financial institution. Further, and as described herein, the received portions of customer profile data 104, account data 106, transaction data 108, and activity data 112 (including data records 113 and 121) may be encrypted, and executed data ingestion engine 136 may perform operations that decrypt each of the encrypted portions of customer profile data 104, account data 106, transaction data 108, and activity data 112 using a corresponding decryption key, e.g., a private cryptographic key associated with FI computing system 130. Executed data ingestion engine 136 may also perform operations that store the portions of customer profile data 104, account data 106, transaction data 108, and activity data 112 (including data records 113 and 121) within aggregated data store 132, e.g., as ingested customer data 138.

As illustrated in FIG. 1A, a pre-processing engine 140 executed by the one or more processors of FI computing system 130 may access ingested customer data 138, and perform any of the exemplary data pre-processing operations described herein to selectively aggregate, filter, and process elements of ingested customer data 138, and to generate consolidated data records 142 based on the selectively aggregated, filtered, and processed elements of ingested customer data 138. Consolidated data records 142 may include structured or unstructured data records that, for corresponding ones of the customers of the financial institution, identify and characterize the corresponding customer, the one or more financial products or instruments issued to the corresponding customer by the financial institution, the one or more initiated, settled, or cleared transactions involving corresponding ones of the financial products or instruments held by the corresponding customer, and in some instances, an occurrence of one or more engagement events involving the corresponding customer, during a corresponding temporal interval associated with the ingestion of customer profile data 104, account data 106, transaction data 108, and activity data 112 by executed data ingestion engine 136.

By way of example, executed pre-processing engine 140 may access the data records of customer profile data 104, account data 106, transaction data 108, and activity data 112, e.g., as maintained within ingested customer data 138. As described herein, each of the accessed data records may include an identifier of corresponding customer of the financial institution, such as a customer name or an alphanumeric character string, and executed pre-processing engine 140 may perform operations that map each of the accessed data records to a customer identifier assigned to the corresponding customer by FI computing system 130. For instance, FI computing system 130 may assign a unique, alphanumeric customer identifier to each customer, and executed pre-processing engine 140 may perform operations that parse the accessed data records, obtain each of the parsed data records that identifies the corresponding customer using a customer name, and replace that customer name with the corresponding alphanumeric customer identifier.

Executed pre-processing engine 140 may also perform operations that assign a temporal identifier to each of the accessed data records, and that augment each of the accessed data records to include the newly assigned temporal identifier. In some instances, the temporal identifier may associate each of the accessed data records with a corresponding temporal interval, which may be indicative of reflect a regularity or a frequency at which FI computing system 130 ingests the elements of customer profile data 104, account data 106, transaction data 108, and activity data 112 from source systems 102A and 102B. For example, executed data ingestion engine 136 may receive elements of customer profile data 104, account data 106, transaction data 108, and activity data 112 from corresponding ones of source systems 102A and 102B on a monthly basis (e.g., on the final day of the month), and in particular, may receive and store the elements of customer profile data 104, account data 106, transaction data 108, and activity data 112 from corresponding ones of source systems 102A and 102B on Nov. 30, 2021. In some instances, executed pre-processing engine 140 may generate a temporal identifier associated with the regular, monthly ingestion of customer profile data 104, account data 106, transaction data 108, and activity data 112 on Nov. 30, 2021 (e.g., "2021-11-30"), and may augment the accessed data records of customer profile data 104, account data 106, transaction data 108, and activity data 112 (e.g., as maintained within ingested customer data 138) to include the generated temporal identifier. The disclosed embodiments are, however, not limited to temporal identifiers reflective of a regular, monthly ingestion of interaction data 135 by FI computing system 130, and in other instances, executed pre-processing engine 140 may augment the accessed data records to include temporal identifiers reflective of any additional, or alternative, temporal interval during which FI computing system 130 ingests the elements of customer profile data 104, account data 106, transaction data 108, and/or activity data 112.

In some instances, executed pre-processing engine 140 may perform further operations that, for a particular customer of the financial institution during the temporal interval (e.g., represented by a pair of the customer and temporal identifiers described herein), obtain one or more data records of customer profile data 104, account data 106, transaction data 108, and/or activity data 112 (including data records 113 and 121) that include the pair of customer and temporal identifiers. Executed pre-processing engine 140 may perform operations that consolidate the one or more obtained data records and generate a corresponding one of consolidated data records 142 that includes the customer identifier and temporal identifier, and that is associated with, and characterizes, the particular customer of the financial institution across the temporal interval. By way of example, executed pre-processing engine 140 may consolidate the obtained data records, which include the pair of customer and temporal identifiers, through an invocation of an appropriate Java-based SQL "join" command (e.g., an appropriate "inner" or "outer" join command, etc.). Further, executed pre-processing engine 140 may perform any of the exemplary processes described herein to generate another one of consolidated data records 142 for each additional, or alternate, customer of the financial institution during the temporal interval (e.g., as represented by a corresponding customer identifier and the temporal interval).

Executed pre-processing engine 140 may perform operations that store each of consolidated data records 142 within the one or more tangible, non-transitory memories of FI computing system 130, such as within consolidated data store 144. Consolidated data store 144 may, for instance, correspond to a data lake, a data warehouse, or another centralized repository established and maintained, respectively, by the distributed components of FI computing system 130, e.g., through a Hadoop™ distributed file system (HDFS). In some instances, and as described herein, consolidated data records 142 may include a plurality of discrete data records, and each of these discrete data records may be associated with, and may maintain data characterizing, a corresponding one of the customers of the financial institution during the corresponding temporal interval (e.g., a month-long interval extending from Nov. 1, 2021, to Nov. 30, 2021). For example, and for a particular customer of the financial institution, discrete data record 142A of consolidated data records 142 may include a customer identifier 146 of the particular customer (e.g., an alphanumeric character string "CUSTID"), a temporal identifier 148 of the corresponding temporal interval (e.g., a numerical string "2021-11-30"), and consolidated data elements 150 of customer profile, account, transaction, or activity data that characterize the particular customer during the corresponding temporal interval (e.g., as consolidated from the data records of customer profile data 104, account data 106, transaction data 108, and/or activity data 112 ingested by FI computing system 130 on Nov. 30, 2021).

In some instances, consolidated data elements 150 may include, for the particular customer associated with customer identifier 146, one or more elements of consolidated activity data 152, which identify and characterize occurrences of customer engagements, and corresponding engagement events, involving the particular customer associated with customer identifier 146 and the financial institution during the month-long interval extending from Nov. 1, 2021, to Nov. 30, 2021. For example, and as described herein, the particular customer associated with customer identifier 146 may, during the one-month interval, request an increase to a credit limit associated with a rewards credit-card account issued by the financial institution (e.g., on Nov. 22, 2021) and log into a web-based, online banking platform provided by the financial institution using corresponding authentication credentials (e.g., on Nov. 29, 2021). Executed pre-processing engine 140 may, in some instances, perform any of the exemplary processes described herein to parse the data records of activity data 112 and obtain data record 113, which identifies and characterizes the credit-limit increase requested for the rewards credit-card account Nov. 22, 2021, and data record 121, which identifies and characterizes the login to the web-based, online banking platform by the particular customer on Nov. 29, 2021.

Executed pre-processing engine 140 may perform operations that obtain the elements of event data 116 from data record 113, and that obtain the elements of event data 124 from data record 121. The elements of event data 116 may identify and characterize the increase to the credit limit associated with the rewards credit-card account requested by the particular customer on Nov. 22, 2021, and as described herein, the elements of event data 116 may include event identifier 116A (e.g., a corresponding product name associated with the engagement event, such as "REWARDS CARD," etc.), subgroup identifier 116B (e.g., an alphanumeric identifier of the event subgroup associated with the requested credit-limit increase, such as a character string "LIMIT INCREASE"), and group identifier 116C (e.g., an alphanumeric identifier of the credit-card event group, such as a character string "CREDIT CARD," etc.). Further, the elements of event data 124 may identify and characterize the login of the particular customer to the web-based, online banking platform on Nov. 29, 2021, and as described herein, the elements of event data 124 may include event identifier 124A associated with the login the web-based online banking platform (e.g., an alphanumeric character string "LOG INTO ONLINE BANKING," etc.), subgroup identifier 126B (e.g., the alphanumeric identifier of the event subgroup associated with the web-based, online banking platform, such as the character string "ONLINE BANKING," etc.), and group identifier 126C (e.g., the alphanumeric identifier of the access event group associated with the web-based, online banking platform, such as the alphanumeric character string "ACCESS," etc.). As illustrated in FIG. 1A, executed pre-processing engine 140 may package each of the elements of event data 116 and 124 into corresponding portions of consolidated activity data 152.

Further, discrete data record 142A of consolidated data records 142 may also maintain, for the particular customer of the financial institution, one or more elements of aggregated data 154 that include aggregated values of account and/or transaction parameters that characterize a behavior of the particular customer during the temporal interval extending from Nov. 1, 2021, to Nov. 30, 2021. For example, executed pre-processing engine 140 may process the data records of account data 106 (e.g., as maintained within ingested customer data 138) to compute aggregate values of account parameters that include, but are not limited to, an average balance of one or more accounts held by the particular customer, a total number of withdrawals of funds from, or deposits of funds into, one or more of the accounts held the particular customer, or a total value of the funds withdrawn from, or deposited into, the one or more of the accounts during the month-long interval. Additionally, in some examples, executed pre-processing engine 140 may process the data records of transaction data 108 (e.g., as maintained within ingested customer data 138) to compute aggregate values of transaction parameters that include, but are not limited to, an aggregate value of transactions initiated, cleared and settled during month-long interval, an average daily value of the initiated, cleared and settled transactions, or an aggregate or average daily value of those initiated, cleared, and settled transactions that involve a particular payment instrument, or a particular counterparty. The disclosed embodiments are, however, not limited to these exemplary aggregate values of account or transaction parameters, and in other examples, executed pre-processing engine 140 may compute, and aggregated data elements 154 may include, any additional or alternate aggregated values of account or transaction parameters the characterize the behavior of particular customer.

Further, in some instances, consolidated data store 144 may maintain each of consolidated data records 142 in conjunction with additional consolidated data records 156 associated with prior temporal intervals, and executed pre-processing engine 140 may perform any of the exemplary processes described herein to generate each of the additional consolidated data records 156 based on elements of profile, account, transaction, and/or activity data ingested from respective ones of source systems 102 during the prior temporal intervals. In some instances, each of additional consolidated data records 156 may include a plurality of discrete data records that are associated with and characterize a particular one of the customers of the financial institution during a corresponding one of the prior temporal intervals. By way of example, additional consolidated data records 156 may include one or more discrete data records, such as discrete data record 158, that are associated with the particular customer and with a prior temporal interval extending from Oct. 1, 2021, to Oct. 31, 2021. Data record 158 may, for instance, include customer identifier 146 of the particular customer (e.g., the alphanumeric character string "CUSTID"), a temporal identifier 160 of the prior temporal interval (e.g., a numerical string "2021-10-31"), consolidated elements 162 of customer profile, account, transaction, or activity data that characterize the particular customer during the prior temporal interval (e.g., as consolidated from the data records ingested by FI computing system 130 on Oct. 31, 2021), and elements of aggregated data 164 that include aggregated values of account and/or transaction parameters that characterize a behavior of the particular customer during the prior temporal interval.

The disclosed embodiments are, however, not limited to the exemplary consolidated data records described herein, or to the exemplary temporal intervals described herein. In other examples, FI computing system 130 may generate, and the consolidated data store 144 may maintain any additional or alternate number of discrete sets of consolidated data records, having any additional or alternate composition, that would be appropriate to the elements of customer profile, account, delinquency, or credit-bureau data ingested by FI computing system 130 at the predetermined intervals described herein. Further, in some examples, FI computing system 130 may ingest elements of customer profile, account, transaction, or activity data from corresponding ones of source systems 102 at any additional, or alternate, fixed or variable temporal interval that would be appropriate to the ingested data or to the adaptive training of the targeted machine learning or artificial intelligence processes described herein, including a continuous, real-time ingestion of the elements of customer profile, account, transaction, or activity data.

In some instances, FI computing system 130 may perform any of the exemplary operations described herein to adaptively train, and validate, one or more targeted machine learning or artificial intelligence process to predict, at a temporal prediction point, a likelihood of an occurrence of one or more engagement events involving customers of the financial institution during a future temporal interval using training datasets associated with a first prior temporal interval (e.g., a "training" interval), and using validation datasets associated with a second, and distinct, prior temporal interval (e.g., an out-of-time "validation" interval). As described herein, the targeted machine learning or artificial intelligence process may include an ensemble or decision-tree process, such as a gradient-boosted decision-tree process (e.g., the XGBoost process), and the training and validation datasets may include, but are not limited to, values of adaptively selected features obtained, extracted, or derived from the consolidated data records maintained within consolidated data store 144, e.g., from data elements maintained within the discrete data records of consolidated data records 142 or the additional consolidated data records 156. Further, and based on an outcome of these adaptive training processes, FI computing system 130 may perform any of the exemplary processes described herein to generate process coefficients, parameters, thresholds, and other data that collectively specify each of the trained machine learning or artificial intelligence processes, and FI computing system 130 may store the generated process coefficients, parameters, thresholds, and other data within a portion of the one or more tangible, non-transitory memories, e.g., within consolidated data store 144.

The one or more engagement events may include a plurality of target engagement events involving customers of the financial institution and corresponding financial products, financial services, or access products provisioned by the financial institution, such as, but not limited to, the exemplary financial products, financial services, and access products described herein. Based on elements of targeting data that identify each of the plurality of target engagement events, FI computing system 130 may perform any of the exemplary operations described herein to train adaptively, and to validate, an event-specific, machine learning or artificial intelligence process to predict, for a customer of the financial institution at the temporal prediction point, a likelihood of an occurrence of each of the plurality of target engagement events during the future temporal interval using event-specific training datasets associated with the training interval and event-specific validation datasets associated with the out-of-time validation interval.

Further, in some examples, the one or more engagement events may include engagement events associated with a plurality of target event groups, and additionally, or alternatively, a plurality of target event subgroups, such as, but not limited to, the exemplary event groups and subgroups described herein. Based on additional elements of targeting data that identify each of the plurality of target event groups, or each of the target event subgroups, FI computing system 130 may perform any of the exemplary operations described herein to train adaptively, and to validate, a group-specific, or a subgroup-specific, machine learning or artificial intelligence process (e.g., the gradient-boosted decision-tree process, etc.) to predict, for a customer of the financial institution at the temporal prediction point, a likelihood of an occurrence of an engagement event associated with each of the target event groups, or a likelihood of an occurrence of an engagement event associated with each of the target event subgroups, during the future temporal interval using corresponding group- or subgroup-specific training datasets associated with the training interval, and using corresponding group- or subgroup-specific validation datasets associated with the out-of-time validation interval.

As described herein, FI computing system 130 may include a plurality of interconnected, distributed computing components, which may include, individually or collectively, one or more GPUs or TPUs configured to operate as a discrete computing cluster). Further, the interconnected, distributed computing components of FI computing system 130 may be configured to implement one or more parallelized, fault-tolerant distributed computing and analytical processes, such as, but not limited to, an Apache Spark™ distributed, cluster-computing framework and/or a Databricks™ analytical platform. In some instances, the distributed computing components of FI computing system 130 may perform one or more of the exemplary processes described herein to train adaptively, and to validate, the event-specific, group-specific, and/or subgroup-specific machine learning or artificial intelligence processes (e.g., the gradient-boosted, decision-tree process) in parallel through an implementation of one or more of the exemplary parallelized, fault-tolerant distributed computing and analytical processes described herein.

Referring to FIG. 1B, a training engine 166 executed by the one or more processors of FI computing system 130 may perform operations that access the consolidated data records maintained within consolidated data store 144, such as, but not limited to, the discrete data records of consolidated data records 142 or additional consolidated data records 156. As described herein, each of the consolidated data records, such as discrete data record 142A of consolidated data records 142 or discrete data record 158 of additional consolidated data records 156, may include a customer identifier of a corresponding one of the customers of the financial institution (e.g., customer identifier 146 of FIG. 1A) and a temporal identifier that associates the consolidated data record with a corresponding temporal interval (e.g., temporal identifiers 148 and 160 of FIG. 1A). Each of the consolidated data records may also include consolidated elements of the customer profile, account, transaction, or activity data that characterize the corresponding one of the customers during the corresponding temporal interval (e.g., consolidated data elements 150 and 162 of FIG. 1A) and further, aggregated elements that include aggregated values of account and/or transaction parameters characterizing a behavior of the corresponding one of the customers during the corresponding temporal interval (e.g., aggregated data elements 154 of FIG. 1A). In some instances, described herein, the consolidated data elements that characterize at least a subset of the customers of the financial institution may also include elements of consolidated activity data that identify and characterize occurrences of engagement events involving corresponding ones of the subset of the customers during corresponding temporal interval (e.g., consolidated activity data 152 of FIG. 1A, which includes data records 113 and 121, etc.).

Figures 1C, 1D:
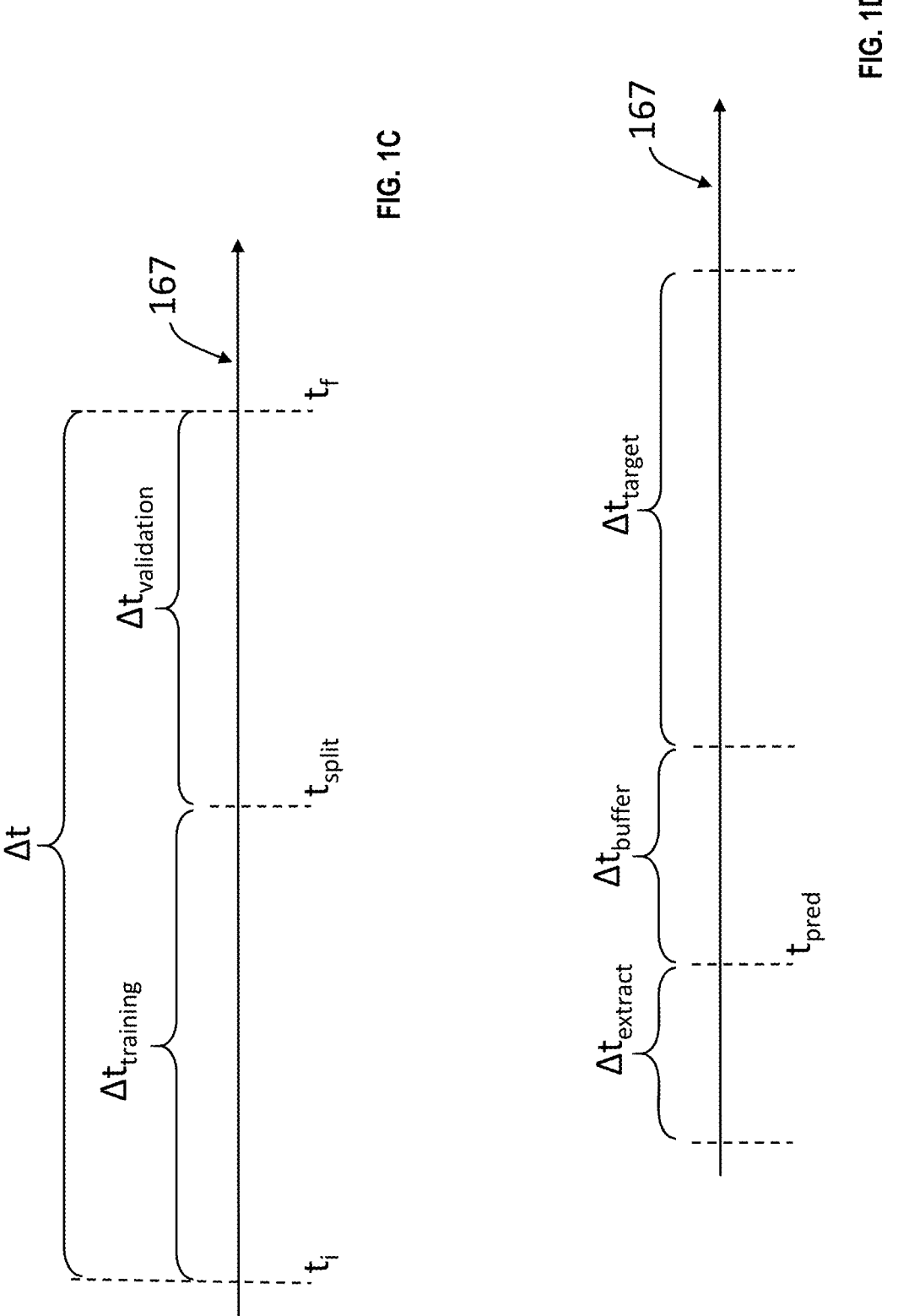
FIGS. 1C and 1D are diagrams of exemplary timelines for adaptively training a machine learning or artificial intelligence process, in accordance with some exemplary embodiments.

In some instances, executed training engine 166 may parse the accessed consolidated data records, and based on corresponding ones of the temporal identifiers, determine that the consolidated elements of customer profile, account, transaction, or activity data characterize the corresponding customers across a range of prior temporal intervals. Further, executed training engine 166 may also perform operations that decompose the determined range of prior temporal intervals into a corresponding first subset of the prior temporal intervals (e.g., the "training" interval described herein) and into a corresponding second, subsequent, and disjoint subset of the prior temporal intervals (e.g., the "validation" interval described herein). For example, as illustrated in FIG. 1C, the range of prior temporal intervals (e.g., shown generally as $\Delta t$ along timeline 167 of FIG. 1C) may be bounded by, and established by, temporal boundaries $t_i$ and $t_f$. Further, the decomposed first subset of the prior temporal intervals (e.g., shown generally as training interval $\Delta t_{training}$ along timeline 167 of FIG. 1C) may be bounded by temporal boundary $t_i$ and a corresponding splitting point $t_{split}$ along timeline 167, and the decomposed second subset of the prior temporal intervals (e.g., shown generally as validation interval $\Delta t_{validation}$ along timeline 167 of FIG. 1C) may be bounded by splitting point $t_{split}$ and temporal boundary $t_f$.

Referring back to FIG. 1B, executed training engine 166 may generate elements of splitting data 168 that identify and characterize the determined temporal boundaries of the consolidated data records maintained within consolidated data store 144 (e.g., temporal boundaries $t_i$ and $t_f$) and the range of prior temporal intervals established by the determined temporal boundaries Further, the elements of splitting data 168 may also identify and characterize the splitting point (e.g., the splitting point $t_{split}$ described herein), the first subset of the prior temporal intervals (e.g., the training interval $\Delta t_{training}$ and corresponding boundaries described herein), and the second, and subsequent subset of the prior temporal intervals (e.g., the validation interval $\Delta t_{validation}$ and corresponding boundaries described herein). As illustrated in FIG. 1B, executed training engine 166 may store the elements of splitting data 168 within the one or more tangible, non-transitory memories of FI computing system 130, e.g., within consolidated data store 144.

In some instances, each of the prior temporal intervals may correspond to a one-month interval, and executed training engine 166 may perform operations that establish adaptively the splitting point between the corresponding temporal boundaries such that a predetermined first percentage of the consolidated data records are associated with temporal intervals (e.g., as specified by corresponding ones of the temporal identifiers) disposed within the training interval, and such that a predetermined second percentage of the consolidated data records are associated with temporal intervals (e.g., as specified by corresponding ones of the temporal identifiers) disposed within the validation interval. For example, the first predetermined percentage may correspond to seventy percent of the consolidated data records, and the second predetermined percentage may corresponding to thirty percent of the consolidated data records, although in other examples, executed training engine 166 may compute one or both of the first and second predetermined percentages, and establish the decomposition point, based on the range of prior temporal intervals, a quantity or quality of the consolidated data records maintained within consolidated data store 144, or a magnitude of the temporal intervals (e.g., one-month intervals, two-week intervals, one-week intervals, one-day intervals, etc.).

As described herein, FI computing system 130 may perform operations that train adaptively an event-specific machine learning or artificial intelligence process (e.g., the gradient-boosted, decision-tree process described herein) to predict, for a customer of the financial institution during a current temporal interval, a likelihood of an occurrence of each of the plurality of target engagement events during a future temporal interval using event-specific training datasets associated with the training interval, and using event-specific validation datasets associated with the validation interval. Further, and using any of the exemplary processes described herein, FI computing system 130 may also train adaptively a group-specific, or a subgroup-specific, machine learning or artificial intelligence process (e.g., the gradient-boosted decision-tree process described herein) to predict, for the customer during the current temporal interval, a likelihood of an occurrence of an engagement event associated with each of a plurality of target event groups, or a likelihood of an occurrence of an engagement event associated with each of a plurality of target event subgroups, during the future temporal interval using the corresponding elements of group-specific or subgroup-specific training and validation datasets.

For example, and as illustrated in FIG. 1D, the current temporal interval may be characterized by a temporal prediction point $t_{pred}$ along timeline 167, and executed training engine 166 may perform any of the exemplary processes described herein to train adaptively the event-, subgroup-, and/or group-specific machine learning or artificial intelligence processes to predict, for the customer at temporal prediction point $t_{pred}$, a respective one of (i) the likelihood of the occurrence of each of the plurality of target engagement events, (ii) a likelihood of an occurrence of an engagement event associated with each of the plurality of target event subgroups, and/or (iii) a likelihood of an occurrence of an engagement event associated with each of a plurality of target event groups during a future, target temporal interval $\Delta t_{target}$ based on customer-specific input datasets associated with a corresponding prior extraction interval $\Delta t_{extract}$.

Further, as illustrated in FIG. 1D, the target temporal interval $\Delta t_{target}$ may be separated temporally from the temporal prediction point $t_{pred}$ by a corresponding buffer interval $\Delta t_{buffer}$. The target temporal interval $\Delta t_{target}$ may be characterized by a predetermined duration, such as, but not limited to, one month, and the prior extraction interval $\Delta t_{extract}$ may be characterized by a corresponding, predetermined duration, such as, but not limited to, one month. Further, in some examples, the buffer interval $\Delta t_{buffer}$ may also be associated with a predetermined duration, such as, but not limited to, one month, and the predetermined duration of buffer interval $\Delta t_{buffer}$ may established by FI computing system 130 to separate temporally the customers' prior interactions with the financial institution from the future target temporal interval $\Delta t_{target}$.

Referring back to FIG. 1B, a training input module 170 of executed training engine 166 may perform operations that access the consolidated data records maintained within consolidated data store 144, and parse each of the consolidated data records to obtain a corresponding customer identifier (e.g., which associates with the consolidated data record with a corresponding one of the customers of the financial institution) and a corresponding temporal identifier (e.g., which associated the consolidated data record with a corresponding temporal interval). For example, and based on the obtained customer and temporal identifiers, executed training input module 170 may generate sets of segmented data records associated with corresponding ones of the customer identifiers (e.g., customer-specific sets of segmented data records), and within each set of segmented data records, executed training input module 170 may order the consolidated data records sequentially in accordance with the obtained temporal interval. Through these exemplary processes, executed training input module 170 may generate sets of customer-specific, sequentially ordered data records (e.g., data tables), which executed training input module 170 may maintain locally within the consolidated data store 144 (not illustrated in FIG. 1B).

Executed training input module 170 may also perform operations that partition the customer-specific sets of sequentially ordered data records into subsets suitable for training adaptively the exemplary targeted machine learning or artificial intelligence processes described herein (e.g., which may be maintained in first subset 172A of consolidated data records within consolidated data store 144) and for validating the trained, targeted machine learning or artificial intelligence processes (e.g., which may be maintained in second subset 172B of consolidated data records within consolidated data store 144). By way of example, executed training input module 170 may access splitting data 168, and establish the temporal boundaries for the training interval $\Delta t_{training}$ (e.g., temporal boundary $t_i$ and splitting point $t_{split}$) and the validation interval $\Delta t_{training}$ (e.g., splitting point twit and temporal boundary $t_f$). Further, executed training input module 170 may also parse each of the sequentially ordered data records of the customer-specific sets, access the corresponding temporal identifier, and determine the temporal interval associated with the each of sequentially ordered data records.

If, for example, executed training input module 170 were to determine that the temporal interval associated with a corresponding one of the sequentially ordered data records is disposed within the temporal boundaries for the training interval $\Delta t_{training}$, executed training input module 170 may determine that the corresponding data record may be suitable for training, and may perform operations that include the corresponding data record within a portion of the first subset 172A (e.g., that store the corresponding data record within a portion of consolidated data store 144 associated with first subset 172A). Alternatively, if executed training input module 170 were to determine that the temporal interval associated with a corresponding one of the sequentially ordered data records is disposed within the temporal boundaries for the validation interval $\Delta t_{validation}$, executed training input module 170 may determine that the corresponding data record may be suitable for validation, and may perform operations that include the corresponding data record within a portion of the second subset 172B (e.g., that store the corresponding data record within a portion of consolidated data store 144 associated with second subset 172B). Executed training input module 170 may perform any of the exemplary processes described herein to determine the suitability of each additional, or alternate, one of the sequentially ordered data records of the customer-specific sets for adaptive training, or alternatively, validation, of the gradient-boosted, decision-tree processes.

In some instances, executed training input module 170 may also perform operations that filter the consolidated data records of first subset 172A and second subset 172B in accordance with one or more filtration criteria. By way of example, the one or more filtration criteria may include a customer-specific filtration criteria, which may cause executed training input module 170 to perform operations that exclude, from first subset 172A and second subset 172B, a consolidated data record of any customer characterized by a value of a demographic parameter that falls outside of a predetermined range of parameter values. For instance, the customer-specific filtration criteria may specify a minimum customer age, and executed training input module 170 to perform operations that exclude, from first subset 172A and second subset 172B, a consolidated data record of any customer characterized by a customer age below the minimum customer age. The disclosed embodiments are, however, not limited to these exemplary filtration criteria, and in other instances, the one or more filtration criteria may include any additional, or alternate filtration that would be appropriate to the consolidated data records of first subset 172A and second subset 172B.

Referring back to FIG. 1B, executed training input module 170 perform operations, described herein, that generate a plurality of event-specific training datasets, a plurality of subgroup-specific training datasets, and in some instances, a plurality of group-specific training datasets based on elements of data obtained, extracted, or derived from all or a selected portion of first subset 172A of the consolidated data records. As described herein, when provisioned as input to a machine learning or artificial intelligence process (e.g., to an input layer of the gradient-boosted decision-tree process described herein), the plurality of event-specific training datasets may enable training engine 166 to train adaptively the machine learning or artificial intelligence (e.g., as an "event-specific" machine learning or artificial intelligence process) to predict, for a customer of the financial institution at temporal prediction point $t_{pred}$, a likelihood of an occurrence of each of the plurality of target engagement events during a future temporal interval, e.g., temporal interval $\Delta t_{target}$.

Additionally, as described herein, when provisioned as input to an additional machine learning or artificial intelligence process, the plurality of subgroup-specific training datasets may enable training engine 166 to train adaptively the additional machine learning or artificial intelligence process (e.g., as a "subgroup-specific" machine learning or artificial intelligence process) to predict, for the customer at temporal prediction point $t_{pred}$, a likelihood of an occurrence of an engagement event associated with each of a plurality of target event subgroups during the future temporal interval. Further, although not illustrated in FIG. 1B, when provisioned as input to a further machine learning or artificial intelligence process, the plurality of group-specific training datasets may enable executed training engine 166 to train adaptively the further machine learning or artificial intelligence process (e.g., as a "group-specific" machine learning or artificial intelligence process) to predict, for the customer at temporal prediction point $t_{pred}$, a likelihood of an occurrence of an engagement event associated with each of a plurality of target event groups during the future temporal interval.

Referring back to FIG. 1B, executed training input module 170 may obtain, from the one or more tangible, non-transitory memories of FI computing system 130, elements of targeting data 174 that identify each of the plurality of target engagement events, each of the plurality of target event subgroups, and in some instances, each of the plurality of target products groups. For example, the elements of targeting data 174 may include a plurality of target event identifiers 174A associated with corresponding ones of the plurality of target engagement events (e.g., an alphanumeric product name associated with each of the target engagement events, as described herein, etc.) and a plurality of target subgroup identifiers 174B associated with corresponding ones of the plurality of target event subgroups (e.g., an alphanumeric identifier of subgroup name associated with each of the target event subgroups. In some instances, FI computing system 130 may perform operations that identify each of the plurality of target engagement events and the plurality of target event subgroups, and corresponding ones of target event identifiers 174A and target subgroup identifiers 174B, based on an analysis of the elements of consolidated activity data maintained within all, or a selected subset, of the consolidated data records of consolidated data store 144.

As described herein, each of the target engagement events may be associated with, or may involve, a corresponding one of a financial product, a financial service, or an access product provisioned, or available for provisioning, to customers by the financial institution. Examples of target engagement events associated with or involving a financial product or service may include, but are not limited to: an application by a customer for a new credit-card account issued by the financial institution; a request by a customer to transfer a balance to or from, a credit account issued by the financial institution; a request by a customer to increase a credit limit associated with a credit limit; a request by a customer to open a particular demand deposit account issued by the financial institution (e.g., a savings account, a checking account, etc.); an application by the customer for a particular home-mortgage product offered by the financial institution; a request by the customer to access a home-equity line-of-credit (HELOC) originated by the financial institution; a request by the customer to purchase a particular insurance product underwritten or issued by the financial institution; a request by a customer to access an unsecured credit product issued by the financial institution (e.g., a personal loan or an unsecured line-of-credit); a referral of a customer for investment banking or financial planning services offered by the financial institution; or an engagement of a customer with a particular term deposit or investment account issued or managed by the financial institution (e.g., a registered education savings plan (RESP) account, a guaranteed investment certificate (GIC), a certificate of deposit (CD), etc.). In some instances, target event identifiers 174A may include, for each of the target engagement events associated with the financial products or services provisioned by the financial institution, an alphanumeric product or service name assigned to the financial product or financial service associated with, or involved in, the corresponding target engagement event.

Further, examples of the target engagement events that involve, or are associated with, an access product may include, but are not limited to: a request by a customer to download (e.g., to a corresponding device operable by the customer) a mobile banking application of the financial institution; an attempt by a customer to register for a web-based online banking platform associated with the financial institution; an attempt by the customer to log into the web-based online banking platform or the mobile banking application; or an attempt, by a customer, to voice-based access platform associated with the financial institution. In some instances, target event identifiers 174A may include, for each of the target engagement events associated with the access products provisioned by the financial institution, an alphanumeric character string that characterizes the engagement between the customer and corresponding access product associated with the target engagement event. The disclosed embodiments are, however, not limited to these exemplary target engagement events, and in other instances, target event identifiers 174A may include alphanumeric character strings that identify, and characterize, any additional or alternate engagement between a customer of the financial institution and corresponding financial products, financial services, or access products provisioned by, or offered by, the financial institution, including, but not limited to, an absence of any engagement between a customer of the financial institution and corresponding financial products, financial services, or access products provisioned by the financial institution.

Referring back to FIG. 1B, executed training input module 170 may perform operations that generate a plurality of event-specific training datasets 176 based on elements of data obtained, extracted, or derived from all or a selected portion of first subset 172A of the consolidated data records and further, based on target event identifiers 174A maintained within the elements of targeting data 174. By way of example, each of the plurality of event-specific training datasets 176 may be associated with a corresponding one of the customers of the financial institution and a corresponding temporal interval, and may include, among other things a customer identifier associated with that corresponding customer and a temporal identifier representative of the corresponding temporal interval, as described herein. Each of the plurality of event-specific training datasets 176 may also include elements of data (e.g., feature values) that characterize the corresponding one of the customers, the corresponding customer's engagement with the financial institution or with other financial institution, and/or an occurrence (or lack thereof) of one or more of the target engagement events, such as, but not limited to, the corresponding one of the target engagement events, involving the corresponding customer during a temporal interval disposed prior to the corresponding temporal interval, e.g., the extraction interval $\Delta t_{extract}$ described herein.

In some instances, executed training input module 170 may perform operations that identify, and obtain or extract, one or more of the features values from the consolidated data records maintained within first subset 172A and associated with corresponding ones of the customers and with the extraction interval $\Delta t_{extract}$ described herein. The obtained or extracted feature values may, for example, include elements of the customer profile, account, transaction, activity data described herein (e.g., which may populate the consolidated data records maintained within first subset 172A), and examples of these obtained or extracted feature values may include, but are not limited to: data identifying or characterizing corresponding ones of the customers (e.g., a customer age, etc.); data identifying one or more types of financial or access products held by corresponding ones of the customers; data characterizing the customer's use or misuse of the financial products (e.g., a balance maintained within a checking account, a balance or amount of available credit associated with a credit-card account, etc.); data characterizing one or more transactions involving the financial products by the customers (e.g., a transaction amount, a transaction date, an identifier of a counterparty, etc.); and/or data characterizing discrete occurrences of one or more of the target engagement events described herein (e.g., temporal data, an event identifier, etc.). The disclosed embodiments are, however, not limited to these examples of obtained or extracted feature values, and in other instances, event-specific training datasets 176 may include any additional or alternate element of data extracted or obtained from the consolidated data records of first subset 172A, associated with corresponding one of the customers, and associated with the extraction interval $\Delta t_{extract}$ described herein.

Further, in some instances, executed training input module 170 may perform operations that compute one or more of the features values based on elements of data extracted or obtained from the consolidated data records maintained within first subset 172A. Examples of these computed, determined, or derived feature values may include, but are not limited to: time-averaged values of payments associated with one or more financial products of held by corresponding ones of the customer; time-averaged balances associated with these financial products; sums of balances associated with various financial products held by corresponding ones of the customers; total amounts of credit available to corresponding ones of the customers across multiple financial products; time-averaged amounts of transactions involving financial products held by corresponding ones of the customers, involving particular counterparties or types of counterparties (e.g., particular types of merchants, etc.), and/or involving particular goods or services; and/or aggregate numbers of occurrences of one or more engagement events (e.g., repeated engagements between a customer and a financial product, financial service, or access product, which may occur repeatedly throughout the relationship between the customer and the financial institution). These disclosed embodiments are, however, not limited to these examples of computed, determined, or derived feature values, and in other instances, event-specific training datasets 176 may include any additional or alternate featured computed, determine, or derived from data extracted or obtained from the consolidated data records of first subset 172A, associated with corresponding one of the customers, and associated with the extraction interval $\Delta t_{extract}$ described herein.

Executed training input module 170 may perform operations that package, into portions of each of event-specific training datasets 176, the customer identifier associated with the corresponding customer, the temporal identifier representative of the corresponding temporal interval and all, or a selected subset of, the feature values, which characterize the corresponding customer, the corresponding customer's interaction with the financial institution or with other financial institution, and/or an occurrence (or lack thereof) of one or more of the target engagement events involving the corresponding customer during a temporal interval disposed prior to the corresponding temporal interval. Further, each of event-specific training datasets 176 may also include elements of ground-truth data indicative of a determined occurrence, or a determined non-occurrence, of each of the plurality of the target engagement events involving the corresponding customer during a one-month, target temporal interval disposed between one and two months subsequent to the corresponding temporal interval (e.g., target temporal interval $\Delta t_{target}$, as described herein).

By way of example, for each of event-specific training datasets 176, the elements of ground-truth data may associate each of the target event identifiers 174A with a value indicative of a determined occurrence or non-occurrence (e.g., a value of unity indicative of the determined occurrence, or a value of zero indicative of the determined non-occurrence, etc.). In some instances, executed training input module 170 may perform operations that determine the target temporal interval $\Delta t_{target}$ for each of the event-specific training datasets 176 (e.g., a temporal interval disposed between one and two months subsequent to the corresponding temporal interval referenced by each of the event-specific training datasets 176). Executed training input module 170 may also perform operations that generate the elements of ground-truth data for each of event-specific training datasets 176 based on a comparison between the each of target event identifiers 174A and the elements of consolidated activity data maintained within a subset of the consolidated data records of first subset 172A that include the corresponding customer identifier and are associated with the corresponding target temporal intervals $\Delta t_{target}$ (e.g., based on a comparison between each of target event identifiers 174A and event identifiers 116A and 124A included within data records 113 and 121, etc.).

Referring back to FIG. 1B, executed training input module 170 may provide event-specific training datasets 176 as an input to an adaptive training and validation module 178 of executed training engine 166, which may perform any of the exemplary processes described herein to train adaptively the event-specific machine learning or artificial intelligence process (e.g., the gradient-boosted, decision-tree process described herein) to predict, for a customer of the financial institution at temporal prediction point $t_{pred}$, a likelihood of an occurrence of each of the plurality of target engagement events involving during a future temporal interval, e.g., target temporal interval $\Delta t_{target}$. For example, upon execution by the one or more processors of FI computing system 130, adaptive training and validation module 178 may perform operations that establish a plurality of nodes and a plurality of decision trees for the gradient-boosted, decision-tree process, with may ingest and process the elements of event-specific training data (e.g., the customer identifiers, the temporal identifiers, the feature values, etc.) maintained within each of the plurality of event-specific training datasets 176. Based on the execution of adaptive training and validation module 178, and on the ingestion of each of event-specific training datasets 176 by the established nodes of the gradient-boosted, decision-tree process, FI computing system 130 may perform operations that adaptively train the gradient-boosted, decision-tree process against the elements of training data included within each of event-specific training datasets 176 (e.g., as an "event-specific," gradient-boosted, decision-tree process).

In some examples, the distributed components of FI computing system 130 may execute adaptive training and validation module 178, and may perform any of the exemplary processes described herein in parallel to train adaptively the gradient-boosted, decision-tree process against the elements of training data included within each of event-specific training datasets 176. The parallel implementation of adaptive training and validation module 178 by the distributed components of FI computing system 130 may, in some instances, be based on an implementation, across the distributed components, of one or more of the parallelized, fault-tolerant distributed computing and analytical protocols described herein.

Through the performance of these adaptive training processes, executed adaptive training and validation module 178 may perform operations that compute one or more candidate process parameters that characterize the trained, event-specific gradient-boosted, decision-tree process, and package the candidate process parameters into corresponding portions of event-specific candidate process data 180A. In some instances, the candidate process parameters included within event-specific candidate process data 180A may include, but are not limited to, a learning rate associated with the trained, event-specific gradient-boosted, decision-tree process, a number of discrete decision trees included within the trained, event-specific, gradient-boosted, decision-tree process (e.g., the corresponding "n_estimator"), a tree depth characterizing a depth of each of the discrete decision trees, a minimum number of observations in terminal nodes of the decision trees, and/or values of one or more hyperparameters that reduce potential process overfitting (e.g., regularization of pseudo-regularization hyperparameters). Further, and based on the performance of these adaptive training processes, executed adaptive training and validation module 178 may also generate event-specific candidate input data 180B, which specifies a candidate composition of an event-specific input dataset for the trained, event-specific, gradient-boosted, decision-tree process (e.g., which be provisioned as inputs to the nodes of the decision trees of the trained, event-specific, gradient-boosted, decision-tree process).

As illustrated in FIG. 1B, executed adaptive training and validation module 178 may provide event-specific candidate process data 180A and event-specific candidate input data 180B as inputs to executed training input module 170 of training engine 166, which may perform any of them exemplary processes described herein to generate a plurality of event-specific validation datasets 182 having compositions consistent with event-specific candidate input data 180B. As described herein, the plurality of event-specific validation datasets 182 may, when provisioned to, and ingested by, the nodes of the decision trees of the trained, event-specific, gradient-boosted, decision-tree process, enable executed training engine 166 to validate the predictive capability and accuracy of the trained, event-specific, gradient-boosted, decision-tree process, e.g., based on elements of ground truth data incorporated within each of event-specific validation datasets 182, or based on one or more computed metrics, such as, but not limited to, computed precision values, computed recall values, and computed area under curve (AUC) for receiver operating characteristic (ROC) curves or precision-recall (PR) curves.

By way of example, executed training input module 170 may parse event-specific candidate input data 180B to obtain the candidate composition of the event-specific input dataset, which not only identifies the candidate elements of customer-specific data included within each event-specific validation dataset (e.g., the candidate feature values described herein), but also a candidate sequence or position of these elements of customer-specific data within the event-specific validation dataset. Examples of these candidate feature values include, but are not limited to, one or more of the feature values extracted, obtained, computed, determined, or derived by executed training input module 170 and packaged into corresponding portions of event-specific training datasets 176, as described herein. For instance, the candidate feature values may include one or more of the feature values extracted, obtained, computed, determined, or derived from elements of the customer account, account, transaction, or activity data described herein.

In some instances, each of the plurality of event-specific validation datasets 182 may be associated with a corresponding one of the customers of the financial institution and with a corresponding temporal interval within the validation interval $\Delta t_{validation}$. Executed training input module 170 may access the consolidated data records maintained within second subset 172B of consolidated data store 144, and may perform operations that extract, from an initial one of the consolidated data records, a customer identifier (which identifies a corresponding one of the customers of the financial institution associated with the initial one of the consolidated data records) and a temporal identifier (which identifies a temporal interval associated with the initial one of the consolidated data records). Executed training input module 170 may package the customer identifier and temporal identifier into portions of a corresponding one of event-specific validation datasets 182, e.g., in accordance with event-specific candidate input data 180B.

Executed training input module 170 may perform operations that access one or more additional ones of the consolidated data records that are associated with the corresponding one of the customers (e.g., that include the customer identifier) and as associated with a temporal interval (e.g., based on corresponding temporal identifiers) disposed prior to the corresponding temporal interval, e.g., within the extraction interval $\Delta t_{extract}$ described herein. Based on portions of event-specific candidate input data 180B, executed training input module 170 may identify, and obtain or extract, one or more of the feature values of the event-specific validation datasets from within the additional ones of the consolidated data records within second subset 172B. Further, in some examples, and based on portions of event-specific candidate input data 180B, executed training input module 170 may perform operations that compute one or more of the features values based on elements of data extracted or obtained from further ones of the consolidated data records within second subset 172B. Executed training input module 170 may package each of the obtained or extracted, and computed, feature values into corresponding positions within the initial one of event-specific validation datasets 182, e.g., in accordance with the candidate sequence or position specified within event-specific candidate input data 180B. Additionally, and in some examples, executed training input module 170 may also perform any of the exemplary processes described herein to package, into an appropriate position within portion of the corresponding one of event-specific validation datasets 182, elements of ground-truth data indicative of a determined occurrence, or a determined non-occurrence, of each of the plurality of the target engagement events (e.g., as specified within target event identifiers 174A) involving the corresponding one of the customers during a one-month, temporal interval disposed between one and two months subsequent to the corresponding temporal interval.

In some instances, executed training input module 170 may perform any of the exemplary processes described herein to generate additional, or alternate, ones of event-specific validation datasets 182 based on the elements of data maintained within the consolidated data records of second subset 172B. For example, each of the additional, or alternate, ones of event-specific validation datasets 182 may associated with a corresponding, and distinct, pair of customer and temporal identifiers, and as such, corresponding customers of the financial institution and corresponding temporal intervals within validation interval $\Delta t_{validation}$. Further, executed training input module 170 may perform any of the exemplary processes described herein to generate an additional, or alternate, ones of event-specific validation datasets 182 associated with each unique pair of customer and temporal identifiers maintained within the consolidated data records of second subset 172B, and in other instances a number of discrete validation datasets within event-specific validation datasets 182 may be predetermined or specified within event-specific candidate input data 180B.

Referring back to FIG. 1B, executed training input module 170 may provide the plurality of event-specific validation datasets 182 as inputs to executed adaptive training and validation module 178. In some examples, executed adaptive training and validation module 178 may perform operations that apply the event-specific gradient-boosted, decision-tree process to respective ones of event-specific validation datasets 182 (e.g., based on the candidate process parameters within event-specific candidate process data 180A, as described herein), and that generate elements of event-specific output data based on the application of the event-specific, gradient-boosted, decision-tree process to corresponding ones of event-specific validation datasets 182. In some instances, the elements of output data generated through the application of the event-specific gradient-boosted, decision-tree process to each of the event-specific validation datasets 182 may be representative of a predicted likelihood of an occurrence of each of the target engagement events involving the corresponding customer during the future temporal interval. Each of the predicted likelihoods may, for example, be represented by an event propensity score ranging from zero (e.g., indicative of a minimum predicted likelihood) to unity (e.g., indicative of a maximum predicted likelihood).

Executed adaptive training and validation module 178 may also perform operations that compute a value of one or more metrics that characterize a predictive capability, and an accuracy, of the gradient-boosted, decision-tree process based on the generated elements of output data and corresponding ones of event-specific validation datasets 182. The computed metrics may include, but are not limited to, one or more recall-based values for the trained, gradient-boosted, decision-tree process (e.g., "recall@5," "recall@10," "recall@20," etc.), and additionally, or alternatively, one or more precision-based values for the trained, gradient-boosted, decision-tree process. Further, in some examples, the computed metrics may include a computed value of an area under curve (AUC) for a precision-recall (PR) curve associated with the trained, gradient-boosted, decision-tree process, and additional, or alternatively, computed value of an AUC for a receiver operating characteristic (ROC) curve associated with the trained, gradient-boosted, decision-tree process. The disclosed embodiments are, however, not limited to these exemplary computed metric values, and in other instances, executed adaptive training and validation module 178 may compute a value of any additional, or alternate, metric appropriate to event-specific validation datasets 182, the elements of ground-truth data, or the trained, event-specific gradient-boosted, decision-tree process In some examples, executed adaptive training and validation module 178 may also perform operations that determine whether all, or a selected portion of, the computed metric values satisfy one or more threshold conditions for a deployment of the event-specific gradient-boosted, decision-tree process and a real-time application to elements of customer profile, account, transaction, or activity data, as described herein. For instance, the one or more threshold conditions may specify one or more predetermined threshold values, such as, but not limited to, a predetermined threshold value for the computed recall-based values, a predetermined threshold value for the computed precision-based values, and/or a predetermined threshold value for the computed AUC values. In some examples, executed adaptive training and validation module 178 that establish whether one, or more, of the computed recall-based values, the computed precision-based values, or the computed AUC values exceed, or fall below, a corresponding one of the predetermined threshold values and as such, whether the trained, event-specific, gradient-boosted, decision-tree process satisfies the one or more threshold requirements for deployment.

If, for example, executed adaptive training and validation module 178 were to establish that one, or more, of the computed metric values fail to satisfy at least one of the threshold requirements, FI computing system 130 may establish that the trained, event-specific gradient-boosted, decision-tree process is insufficiently accurate for deployment and a real-time application to the elements of customer profile, account, transaction, or activity data described herein. Executed adaptive training and validation module 178 may perform operations (not illustrated in FIG. 1B) that transmit data indicative of the established inaccuracy to executed training input module 170, which may perform any of the exemplary processes described herein to generate one or more additional, event-specific training datasets and to provision those additional encrypted training datasets to executed adaptive training and validation module 178. In some instances, executed adaptive training and validation module 178 may receive the additional training datasets, and may perform any of the exemplary processes described herein to train further the event-specific gradient-boosted, decision-tree process against the elements of training data included within each of the additional, event-specific training datasets.

Alternatively, if executed adaptive training and validation module 178 were to establish that each of the computed metric values satisfies the threshold requirements, FI computing system 130 may deem the trained, event-specific, gradient-boosted, decision-tree process ready for deployment and real-time application to the elements of customer profile, account, transaction, and/or activity data described herein. In some instances, executed adaptive training and validation module 178 may generate event-specific process parameter data 184A that includes the process parameters of the trained, event-specific gradient-boosted, decision-tree process, such as, but not limited to, a value of all, or a subset of, the candidate process parameters described herein. Further, executed adaptive training and validation module 178 may also generate event-specific process input data 184B, which characterizes a composition of an event-specific input dataset for the trained, and event-specific, gradient-boosted, decision-tree process and identifies each of the discrete data elements within the event-specific input dataset, along with a sequence or position of these elements within the event-specific input dataset (e.g., as specified within event-specific candidate input data 180B). As illustrated in FIG. 1B, executed adaptive training and validation module 178 may perform operations that store event-specific process parameter data 184A and event-specific process input data 184B within the one or more tangible, non-transitory memories of FI computing system 130, such as consolidated data store 144.

In some instances, executed training engine 166 may perform any of the exemplary processes described herein to train adaptively, and to validate, an event-specific, machine learning or artificial intelligence process (e.g., the event-specific gradient-boosted, decision-tree process described herein) to predict, for a customer of the financial institution at temporal prediction point $t_{pred}$, a likelihood of an occurrence of each of a plurality of target engagement events (e.g., as specified by target event identifiers 174A included within targeting data 174) during a future temporal interval, e.g., temporal interval $\Delta t_{target}$. The disclosed embodiments are, however, not limited to trained, event-specific machine learning or artificial intelligence processes, and in other instances, executed training engine 166 may perform further operations, described herein, to train adaptively a group-specific, or a subgroup-specific, machine learning or artificial intelligence process to predict, for a customer of the financial institution at temporal prediction point $t_{pred}$, a likelihood of an occurrence of an engagement event associated with each of a plurality of target event groups, or a likelihood of an occurrence of an engagement event associated with each of a plurality of target event subgroups, during the future temporal interval.

As described herein, targeting data 174 may also include a plurality of target subgroup identifiers 174B associated with corresponding ones of a plurality of target event subgroups, such as, but not limited to an alphanumeric identifier of subgroup name associated with each of the target event subgroups. Based on target subgroup identifiers 174B, executed training engine 166 may perform operations that train adaptively, and validate, a subgroup-specific machine learning or artificial intelligence process (e.g., a subgroup-specific, gradient-boosted, decision-tree process, as described herein) to predict, for a customer of the financial institution at temporal prediction point $t_{pred}$, a likelihood of an occurrence of an engagement event associated with each of a plurality of target products subgroups (e.g., as specified by target subgroup identifiers 174B included within targeting data 174) during the future temporal interval.

For example, as illustrated in FIG. 1B, executed training input module 170 perform any of the exemplary processes described herein to generate a plurality of subgroup-specific training datasets 186 based on elements of data obtained or extracted, and computed, from all or a selected portion of first subset 172A of the consolidated data records and further, based on target subgroup identifiers 174B maintained within the elements of targeting data 174. By way of example, each of the plurality of subgroup-specific training datasets 186 may be associated with a corresponding one of the customers of the financial institution and a corresponding temporal interval, and may include, among other things a customer identifier associated with that corresponding customer and a temporal identifier representative of the corresponding temporal interval, as described herein.

Each of the plurality of subgroup-specific training datasets 186 may also include elements of data (e.g., feature values) that characterize the corresponding one of the customers, the corresponding customer's interaction with the financial institution or with other financial institution, and/or an occurrence (or non-occurrence) of one or more engagement events, such as, but not limited to, engagement events associated with corresponding ones of the target event subgroups, involving the corresponding customer during a temporal interval disposed prior to the corresponding temporal interval, e.g., the extraction interval $\Delta t_{extract}$ described herein. In some examples, the feature values maintained within each of the subgroup-specific training datasets 186 may include one or more feature values obtained or extracted from the consolidated data records maintained within first subset 172A that are associated with corresponding ones of the customers and with the extraction interval $\Delta t_{extract}$ described herein, and additionally, or alternatively, one or more feature values computed from elements of data extracted or obtained from the consolidated data records maintained within first subset 172A that are associated with corresponding ones of the customers and with the extraction interval $\Delta t_{extract}$ described herein.

In some instances, the obtained or extracted feature values may include one or more of the elements of the customer profile, account, transaction, and activity data described herein, which may populate the consolidated data records maintained within first subset 172A, and the computed feature values may include one or more of the exemplary aggregated or time-averaged elements of the customer profile, account, transaction, and activity data described herein. The disclosed embodiments are, however, not limited to these examples of obtained or extracted feature values, or to these examples of computed feature values, and in other instances, subgroup-specific training datasets 186 may include any additional or alternate element of data extracted or obtained from the consolidated data records of first subset 172A, associated with corresponding one of the customers, and associated with the extraction interval $\Delta t_{extract}$ described herein, or any additional or alternate feature values compute from the elements of obtained or extracted data.

Executed training input module 170 may perform operations that package, into portions of each of subgroup-specific training datasets 186, the customer identifier associated with the corresponding customer, the temporal identifier representative of the corresponding temporal interval and all, or a selected subset of, the feature values, which characterize the corresponding customer, the corresponding customer's interaction with the financial institution or with other financial institution, and/or an occurrence (or lack thereof) of one or more of the engagement events involving the corresponding customer during a temporal interval disposed prior to the corresponding temporal interval. Further, each of subgroup-specific training datasets 186 may also include elements of ground-truth data indicative of a determined occurrence, or a determined non-occurrence, of an engagement event associated with each of the plurality of the target event subgroups and involving the corresponding customer during a one-month, target temporal interval disposed between one and two months subsequent to the corresponding temporal interval (e.g., a corresponding target temporal interval, as described herein).

By way of example, for each of subgroup-specific training datasets 186, the elements of ground-truth data may asso-ciate each of the target subgroup identifiers 174B with a value indicative of a determined occurrence or non-occurrence (e.g., a value of unity indicative of the determined occurrence, or a value of zero indicative of the determined non-occurrence, etc.) of an engagement event associated with each of the target event subgroups during the corresponding target temporal interval. In some instances, executed training input module 170 may perform any of the exemplary processes described herein to determine the target temporal interval for each of the subgroup-specific training datasets 186 (e.g., a temporal interval disposed between one and two months subsequent to the corresponding temporal interval referenced by each of the subgroup-specific training datasets 186), and to generate the elements of ground-truth data for each of subgroup-specific training datasets 186 (e.g., based on a comparison between each of target subgroup identifiers 174B and the elements of consolidated activity data maintained within the consolidated data records of first subset 172A that include the corresponding customer identifier and are associated with the corresponding target temporal interval).

Referring back to FIG. 1B, executed training input module 170 may provide subgroup-specific training datasets 186 as an input to executed adaptive training and validation module 178, which may perform any of the exemplary processes described herein to train adaptively the subgroup-specific machine learning or artificial intelligence process (e.g., the subgroup-specific, gradient-boosted, decision-tree process described herein) to predict, for a customer of the financial institution at temporal prediction point $t_{pred}$, a likelihood of an occurrence of an engagement event associated with each of plurality of target event subgroups during the future temporal interval. For example, upon execution by the one or more processors of FI computing system 130, adaptive training and validation module 178 may perform operations that establish a plurality of nodes and a plurality of decision trees for the subgroup-specific gradient-boosted, decision-tree process, which may ingest the elements of subgroup-specific training data maintained within each of the plurality of subgroup-specific training datasets 186. Based on the execution of adaptive training and validation module 178, and based on the ingestion of each of subgroup-specific training datasets 186 by the established nodes of the gradient-boosted, decision-tree process, FI computing system 130 may perform operations that adaptively train the subgroup-specific, gradient-boosted, decision-tree process against the elements of training data included within each of subgroup-specific training datasets 186, e.g., in parallel based on an implementation, across the distributed computing components of FI computing system 130, of one or more of the parallelized, fault-tolerant distributed computing and analytical protocols described herein.

Through the performance of these adaptive training processes, executed adaptive training and validation module 178 may perform operations that compute one or more additional candidate process parameters that characterize the subgroup-specific, gradient-boosted, decision-tree process, and package the additional candidate process parameters into corresponding portions of subgroup-specific candidate process data 188A. In some instances, as described herein the candidate process parameters included within subgroup-specific candidate process data 188A may include, but are not limited to, a learning rate, a number of discrete decision trees (e.g., a corresponding "n_estimator" for the subgroup-specific, gradient-boosted, decision-tree process), a tree depth characterizing a depth of each of the discrete decision trees, a minimum number of observations in terminal nodes of the decision trees, and/or values of one or more hyperparameters that reduce potential process overfitting (e.g., regularization of pseudo-regularization hyperparameters). Further, and based on the performance of these adaptive training processes, executed adaptive training and validation module 178 may also generate subgroup-specific candidate input data 188B, which specifies a candidate composition of a subgroup-specific input dataset for the subgroup-specific, gradient-boosted, decision-tree process (e.g., which may be provisioned as inputs to the nodes of the decision trees of the subgroup-specific, gradient-boosted, decision-tree process).

As illustrated in FIG. 1B, executed adaptive training and validation module 178 may provide subgroup-specific candidate process data 188A and subgroup-specific candidate input data 188B as inputs to executed training input module 170, which may perform any of the exemplary processes described herein to generate a plurality of additional validation datasets, e.g., subgroup-specific validation datasets 190, having compositions consistent with subgroup-specific candidate input data 188B. As described herein, the plurality of subgroup-specific validation datasets 190 may, when provisioned to, and ingested by, the nodes of the decision trees of the trained, subgroup-specific, gradient-boosted, decision-tree process, enable executed training engine 166 to validate the predictive capability and accuracy of the trained, subgroup-specific, gradient-boosted, decision-tree process, e.g., based on elements of ground truth data incorporated within each of subgroup-specific validation datasets 190, or based on one or more computed metrics, such as, but not limited to, computed precision values, computed recall values, and computed area under curve (AUC) for receiver operating characteristic (ROC) curves or precision-recall (PR) curves.

By way of example, executed training input module 170 may parse subgroup-specific candidate input data 188B to obtain the candidate composition of the subgroup-specific input dataset, which not only identifies the candidate elements of customer-specific data included within each subgroup-specific validation dataset (e.g., the candidate feature values described herein), but also a candidate sequence or position of these elements of customer-specific data within subgroup-specific validation datasets 190. Examples of these candidate feature values include, but are not limited to, one or more of the feature values extracted, obtained, or computed by executed training input module 170 and packaged into corresponding portions of subgroup-specific training datasets 186, as described herein. For instance, the candidate feature values may include one or more of the feature values extracted, obtained, or computed from elements of the customer account, account, transaction, or activity data described herein.

In some instances, each of the plurality of subgroup-specific validation datasets 190 may be associated with a corresponding one of the customers of the financial institution and with a corresponding temporal interval within the validation interval $\Delta t_{validation}$. Executed training input module 170 may access the consolidated data records maintained within second subset 172B of consolidated data store 144, and may perform operations that extract, from an initial one of the consolidated data records, a customer identifier (which identifies a corresponding one of the customers of the financial institution associated with the initial one of the consolidated data records) and a temporal identifier (which identifies a temporal interval associated with the initial one of the consolidated data records). Executed training input module 170 may package the extracted customer identifier and temporal identifier into portions of a corresponding one of subgroup-specific validation datasets 190, e.g., in accordance with subgroup-specific candidate input data 188B.

Executed training input module 170 may perform operations that access one or more additional ones of the consolidated data records that are associated with the corresponding one of the customers (e.g., that include the customer identifier) and as associated with a temporal interval (e.g., based on corresponding temporal identifiers) disposed prior to the corresponding temporal interval, e.g., within the extraction interval $\Delta t_{extract}$ described herein. Based on portions of subgroup-specific candidate input data 188B, executed training input module 170 may obtain or extract one or more of the feature values of the subgroup-specific validation datasets from the additional ones of the consolidated data records within second subset 172B. Further, in some examples, and based on portions of subgroup-specific candidate input data 188B, executed training input module 170 may perform operations that compute one or more of the features values based on further ones of the consolidated data records within second subset 172B. Executed training input module 170 may package each of the obtained, extracted, or computed feature values into corresponding positions within the initial one of subgroup-specific validation datasets 190, e.g., in accordance with the candidate sequence or position specified within subgroup-specific candidate input data 188B.

Additionally, and in some examples, executed training input module 170 may also perform any of the exemplary processes described herein to package, into an appropriate position within the initial one of subgroup-specific validation datasets 190, elements of ground-truth data indicative of a determined occurrence, or a determined non-occurrence, of an engagement event associated with each of the plurality of the target event subgroups (e.g., as specified within target subgroup identifiers 174B) involving the corresponding one of the customers during a one-month, temporal interval disposed between one and two months subsequent to the corresponding temporal interval. In some instances, executed training input module 170 may perform any of the exemplary processes described herein to generate additional, or alternate, ones of subgroup-specific validation datasets 190 based on the elements of data maintained within the consolidated data records of second subset 172B.

Referring back to FIG. 1B, executed training input module 170 may provide the plurality of subgroup-specific validation datasets 190 as inputs to executed adaptive training and validation module 178. In some examples, executed adaptive training and validation module 178 may perform operations that apply the trained, subgroup-specific, gradient-boosted, decision-tree process to respective ones of subgroup-specific validation datasets 190 (e.g., based on the candidate process parameters within subgroup-specific candidate process data 188A, as described herein), and that generate elements of subgroup-specific output data based on the application of the trained, gradient-boosted, decision-tree process to corresponding ones of subgroup-specific validation datasets 190. In some instances, the elements of output data generated through the application of the subgroup-specific gradient-boosted, decision-tree process to each of subgroup-specific validation datasets 190 may be representative of a predicted likelihood of an occurrence of an engagement event associated with each of the target event subgroups, and involving the corresponding customer, during the future temporal interval. As described herein, each of the predicted likelihoods may be represented by a subgroup propensity score ranging from zero (e.g., indicative of a minimum predicted likelihood) to unity (e.g., indicative of a maximum predicted likelihood).

Executed adaptive training and validation module 178 may perform operations that compute a value of one or more metrics that characterize a predictive capability, and an accuracy, of the trained, and subgroup-specific, gradient-boosted, decision-tree process based on the generated elements of output data and corresponding ones of subgroup-specific validation datasets 190, such as, but not limited to, the exemplary computed metrics described herein. Further, executed adaptive training and validation module 178 may perform any of the exemplary processes described herein to determine whether all, or a selected portion of, the computed metric values satisfy one or more threshold conditions (e.g., the exemplary threshold conditions described herein) for a deployment of the trained, subgroup-specific, gradient-boosted, decision-tree process and a real-time application to the elements of customer profile, account, transaction, or activity data.

If, for example, executed adaptive training and validation module 178 were to establish that one, or more, of the computed metric values fail to satisfy at least one of the threshold requirements, FI computing system 130 may establish that the trained, subgroup-specific, gradient-boosted, decision-tree process is insufficiently accurate for deployment and a real-time application to the elements of customer profile, account, transaction, and/or activity data described herein. Executed adaptive training and validation module 178 may perform operations (not illustrated in FIG. 1B) that transmit data indicative of the established inaccuracy to executed training input module 170, which may perform any of the exemplary processes described herein to generate one or more additional, subgroup-specific training datasets and to provision those additional encrypted training datasets to executed adaptive training and validation module 178. In some instances, executed adaptive training and validation module 178 may receive the additional training datasets, and may perform any of the exemplary processes described herein to train further the subgroup-specific, gradient-boosted, decision-tree process against the elements of training data included within each of the additional, subgroup-specific training datasets.

Alternatively, if executed adaptive training and validation module 178 were to establish that each computed metric value satisfies threshold requirements, FI computing system 130 may deem the trained, subgroup-specific, gradient-boosted, decision-tree process ready for deployment and real-time application to the elements of customer profile, account, transaction, and/or activity data. In some instances, executed adaptive training and validation module 178 may generate subgroup-specific process parameter data 192A that includes the process parameters of the trained, subgroup-specific gradient-boosted, decision-tree process, such as, but not limited to, a value of all, or a subset of, the candidate process parameters specified described herein. Further, executed adaptive training and validation module 178 may also generate subgroup-specific process input data 192B, which characterizes a composition of a subgroup-specific input dataset for the trained, subgroup-specific gradient-boosted, decision-tree process and identifies each of the discrete data elements within the subgroup-specific input dataset, along with a sequence or position of these elements within the subgroup-specific input dataset (e.g., as specified within subgroup-specific candidate input data 188B). As illustrated in FIG. 1B, executed adaptive training and validation module 178 may perform operations that store subgroup-specific process parameter data 192A and subgroup-specific process input data 192B within the one or more tangible, non-transitory memories of FI computing system 130, such as consolidated data store 144.

The disclosed embodiments are, however, not limited to exemplary processes for adaptively training, and validating, event- and subgroup-specific machine learning or artificial intelligence processes, and in other instances, FI computing system 130 may perform further operations, described herein, to train adaptively and validate a further machine learning or artificial intelligence process to predict, for a customer of the financial institution at a temporal prediction point $t_{pred}$, a likelihood of an occurrence of an engagement event associated with each of a plurality of target event groups, or with any additional, or alternate, grouping of engagement events, during future temporal interval $\Delta t_{target}$. For example, although not illustrated in FIG. 1B, targeting data 174 may also include one or more of the event group identifiers described herein, and FI computing system 130 may perform any of the exemplary processes described herein to generate a plurality of group-specific training datasets based on elements of data obtained, extracted, or derived from all or a selected portion of first subset 172A of the consolidated data records and further, based on the target subgroup identifiers 174B maintained within the elements of targeting data 174. In some instances, FI computing system 130 may perform any of the exemplary processes described herein to train adaptively the group-specific machine learning or artificial intelligence process (e.g., a group-specific, gradient-boosted, decision-tree process) against the elements of training data included within each of the group-specific training datasets, and to generate candidate process parameters that characterize the group-specific, machine learning or artificial intelligence process (such as, but not limited to, the exemplary process parameters of the trained, gradient-boosted, decision-tree process) and group-specific candidate input data that specifies a candidate composition of a group-specific input dataset for the group-specific, machine learning or artificial intelligence process (e.g., which may be provisioned as inputs to the nodes of the decision trees of the gradient-boosted, decision-tree process).

FI computing system 130 may also perform any of the exemplary processes described herein to generate a plurality of group-specific validation datasets having compositions consistent with the elements of group-specific candidate input data, and to validate the predictive capability and accuracy of the trained, group-specific machine learning or artificial intelligence process based on elements of ground truth data incorporated within each of the group-specific validation datasets, or based on one or more computed metrics, such as, but not limited to, computed precision values, computed recall values, and computed area under curve (AUC) for receiver operating characteristic (ROC) curves or precision-recall (PR) curves. Based on a successful validation of the predictive capability and accuracy of the group-specific machine learning or artificial intelligence process, FI computing system 130 may deem the trained, group-specific machine learning or artificial intelligence ready for deployment and a real-time application to the elements of customer profile, account, transaction, and/or activity data, and may generate elements of group-specific process parameter data that include the process parameters of the trained, group-specific, machine learning or artificial intelligence process (e.g., a value of all, or a subset of, the candidate process parameters) and elements of group-specific process input data that characterize a composition of a corresponding group-specific input dataset.

B. Exemplary Processes for Predicting Occurrences of Future Engagement Events Using Trained Machine Learning or Artificial Intelligence Processes In some examples, one or more computing systems associated with or operated by a financial institution, such as one or more of the distributed components of FI computing system 130, may perform operations that adaptively train a machine learning or artificial intelligence process to predict, for a customer during a current temporal interval, a likelihood of an occurrence of each of a plurality of target engagement events, a likelihood of an occurrence of an engagement event involving each of a plurality of target event subgroups, and additionally, or alternatively, a likelihood of an occurrence of an engagement event involving each of a plurality of target event groups, during a future temporal interval using corresponding elements of event-, subgroup-, or product-specific training datasets associated with a first prior temporal interval, and using corresponding elements of event-, subgroup-, or product-specific validation datasets associated with a second, and distinct, prior temporal interval. The machine learning or artificial intelligence process may include an ensemble or decision-tree process, such as a gradient-boosted, decision-tree process described herein, and the event-, subgroup, or group-specific training and validation datasets may include, but are not limited to, elements of customer profile, account, and transaction characterizing corresponding ones of the customers of the financial institution, along with elements of activity data identifying and characterizing prior occurrences of engagement events associated with, or involving, the corresponding customers and corresponding financial products, financial services, or access products provisioned by the financial institution.

Each of the engagement events, including the target engagement events, may be associated with a discrete engagement between a customer of the financial institution and a financial product, a financial service, or an access product provisioned by the financial institution, such as, but not limited to, the exemplary financial products, financial services, and access products described herein. For example, each of the target engagement events may be associated with a discrete engagement between a corresponding customer and a corresponding one of a plurality of target financial products, target financial services, or target access products, which may include all, or a selected subset, of the financial products, financial services, or access products provisioned to customers by the financial institution during a range of prior temporal intervals. Further, each of the of the financial products, financial services, and access products, and as such, each of the engagement events (including the target engagement events), may be associated with a corresponding event group, and with a respective one of the event subgroups associated with the corresponding event group, such as, but not limited to, the exemplary event groups and the exemplary event subgroups described herein, and in some instances, the plurality of target event groups and/or target event subgroups, may be associated with, and characterize, one or more of the financial products, financial services, or access products provisioned to customers by the financial institution during the range of prior temporal intervals.

In some instances, each of the trained machine learning or artificial intelligence processes may be associated with corresponding elements of process parameter data, which specify a value of one or more process parameters of the trained machine learning process, and with corresponding elements of process input data, with specify a composition and structure of an input dataset capable of ingestion by the trained machine learning process. By way of example, and the machine learning or artificial intelligence process trained adaptively to predict the likelihood of the occurrence of each of the plurality of target engagement events during the future temporal interval (e.g., the event-specific, machine learning or artificial intelligence process) may be associated with, and characterized by, corresponding elements of event-specific process parameter data (e.g., event-specific process parameter data 184A of FIG. 1B) and event-specific process input data (e.g., event-specific process input data 184B of FIG. 1B), and based on the elements of event-specific input data, FI computing system 130 may perform any of the exemplary processes described herein to generate event-specific input datasets associated with all, or a selected subset, of the customers of the financial institution.

FI computing system 130 may also perform any of the exemplary processes described herein to apply the trained, event-specific machine learning or artificial intelligence process to each of the event-specific input datasets, e.g., in accordance with the elements of event-specific process parameter data. Based on the application of the trained, event-specific machine learning or artificial intelligence process to each of the event-specific input datasets, FI computing system 130 may perform any of the exemplary processes described herein to generate corresponding elements of event-specific output data, each of which indicate of a predicted likelihood of occurrence of each of the target engagement events involving a corresponding customer, and as such, a predicted likelihood of occurrence of an engagement associated between the corresponding customer and each of the target financial products, target financial services, or target access products, during a future temporal interval, such as, but not limited to, one-month interval disposed between one and two months subsequent to a corresponding prediction date.

Further, and by way of example, the machine learning or artificial intelligence process trained adaptively to predict the likelihood of the occurrence of an engagement event associated with each of the plurality of target event subgroups during the future temporal interval (e.g., the subgroup-specific, machine learning or artificial intelligence process) may be associated with corresponding elements of subgroup-specific process parameter data (e.g., subgroup-specific process parameter data 192A of FIG. 1B) and subgroup-specific process input data (e.g., subgroup-specific process input data 192B of FIG. 1B). FI computing system 130 may perform any of the exemplary processes described herein to generate, based on the elements of subgroup-specific process input data, subgroup-specific input datasets associated with all, or a selected subset, of the customers of the financial institution, and to apply the trained, subgroup-specific, machine learning or artificial intelligence process to each of the subgroup-specific input datasets, e.g., in accordance with the elements of subgroup-specific process parameter data. Based on the application of the trained, subgroup-specific, machine learning or artificial intelligence process to each of the event-specific input datasets, FI computing system 130 may also perform any of the exemplary processes described herein to generate corresponding elements of subgroup-specific output data, each of which indicate of a predicted likelihood of occurrence of an engagement event involving the corresponding customer, and associated with each of the target event subgroups, during the future temporal interval.

Additionally, the machine learning or artificial intelligence process trained adaptively to predict the likelihood of the occurrence of an engagement event associated with each of the plurality of target event groups during the future temporal interval (e.g., the group-specific, machine learning or artificial intelligence process) may be associated with, and characterized by, corresponding elements of group-specific process data and group-specific input data, and FI computing system 130 may perform any of the exemplary processes described herein to generate, based on the elements of group-specific input data, group-specific input datasets associated with all, or the selected subset, of the customers of the financial institution. Fi computing system 130 may also perform operations, described herein, to apply the trained, group-specific machine learning or artificial intelligence process to each of the group-specific input datasets, e.g., in accordance with the elements of group-specific process parameter data. Based on the application of the trained, group-specific, machine learning or artificial intelligence process to each of the group-specific input datasets, FI computing system 130 may also perform any of the exemplary processes described herein to generate corresponding elements of group-specific output data, each of which indicate of a predicted likelihood of occurrence of an engagement event involving the corresponding customer, and associated with each of the target event groups, during the future temporal interval. The disclosed embodiments are, however, not limited to the exemplary event-, subgroup-, and group-specific, machine learning and artificial intelligence processes described herein, and in other instances, FI computing system 130 may perform any of the exemplary processes described herein to train adaptively a machine learning or artificial intelligence process to predict, for a customer of the financial institution, a likelihood of an occurrence of an engagement event involving any additional or alternate groupings of the financial products, financial services, or access products provisioned by the financial institution.

Through the implementation of the exemplary processes described herein, which adaptively train and validate event-, subgroup, or group-specific machine learning or artificial intelligence processes using customer-specific training and validation datasets associated with respective training and validation intervals, and which apply the trained event-, subgroup, or group-specific machine learning or artificial intelligence process to corresponding customer-specific input datasets, FI computing system 130 may predict, in real-time and for corresponding ones of the customers, a likelihood of an occurrence of an engagement event involving each of a plurality of target financial products or target access products (e.g., an occurrence of each of a plurality of target engagement events), an engagement event involving each of a plurality of target event subgroups and additionally, or alternatively, an engagement event involving each of a plurality of target event groups during a future temporal interval (e.g., via the implementation of the parallelized, fault-tolerant distributed computing and analytical protocols described herein across clusters of GPUs and/or TPUs). Certain of these exemplary processes described herein, which facilitate a real-time prediction of a likelihood of a future, customer-specific engagement event involving a range of target financial products and access products and discrete families of these target financial products and access products (e.g., the exemplary event groups or subgroups described herein), may be implemented by FI computing system 130 in addition to, or as an alternate to, existing processes that predict sequentially a future, product-specific engagements between a customer of the financial institution and a corresponding financial or access product on a product-by-product basis.

Further, when provisioned to an additional computing system of the financial institution, the generated elements of event-, subgroup-, and/or group specific output data may enable the additional computing system may identify probable occurrences of future customer-specific engagements with not only target financial products, financial services, or access products provisioned by the financial institution, but also with groups, or subgroups, of these of these target financial products, financial services, or access products. As described herein, the additional computing system generate elements of notification data that include, among other things, adaptable and personalized recommendations associated with the probable occurrences of the future customer-specific engagements with the target financial products, financial services, or access products, or with the groups or subgroups of these target financial products, financial services, or access products, and may provision the generated elements of notifications data to computing devices or systems associated with corresponding ones of the customers.

In some instances, the computing devices or systems may, in some instances, execute one or more application programs that render the elements of messaging data for presentation within a digital interface, and the corresponding customers may provide input to the devices that interaction with not only the rendered elements of messaging data, but also with the target financial products, financial services, or access products, or with the groups or subgroups of these target financial products, financial services, or access products. Through the implementation of the exemplary processes described herein, the additional computing system may provision, to a computing device or system of a customer, adaptable and personalized recommendations for future, customer-specific engagements with one or more target financial products, financial services, or access products, or with the groups or subgroups of these target financial products, financial services, or access products, that are not only relevant to a current interaction between the corresponding customer and the financial institution, but also are consistent with a time-evolving relationship between the customer and the financial institution across one or more prior temporal intervals.

Figure 2A:
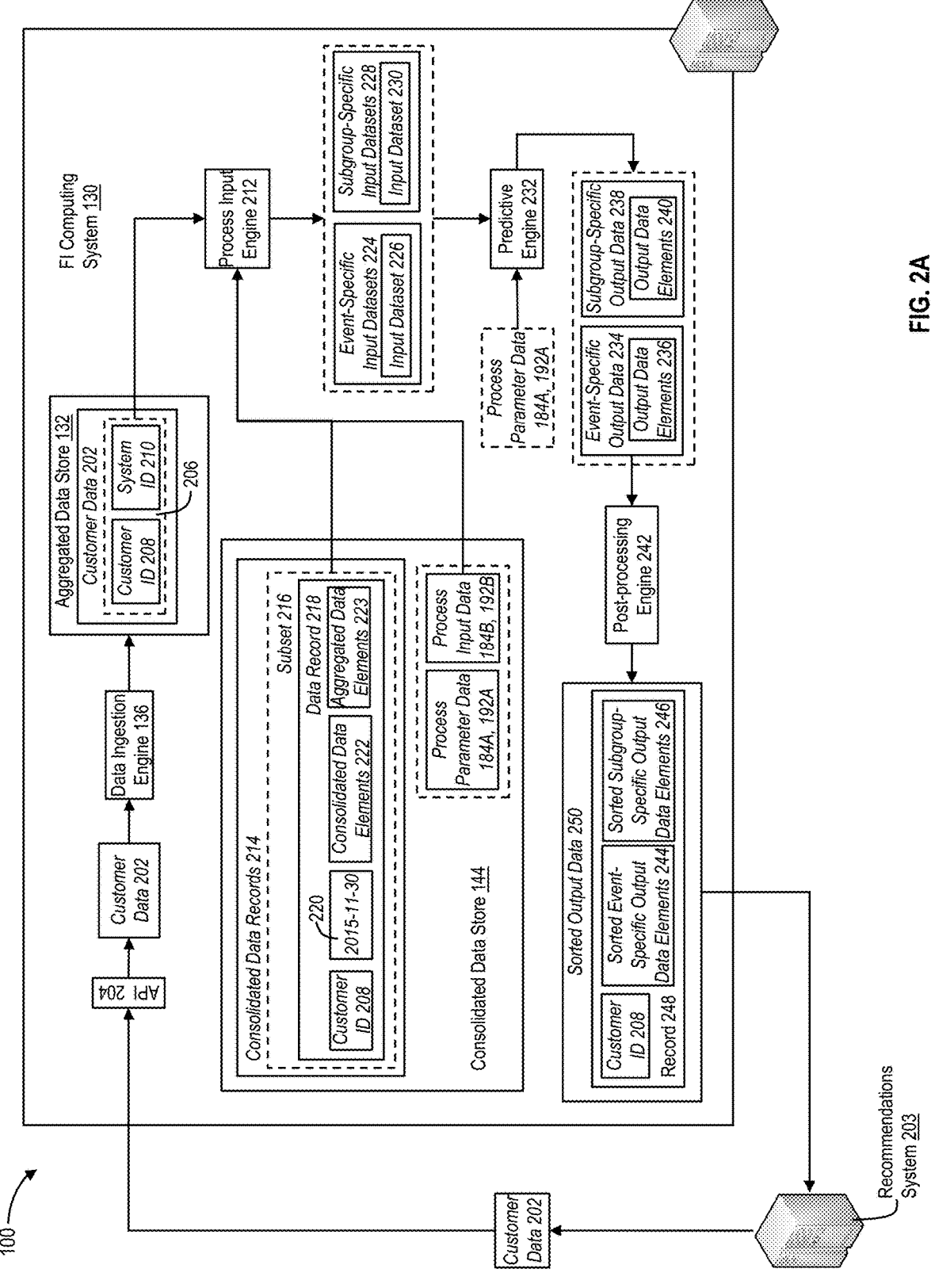
FIGS. 2A, 2B, and 2C are block diagrams illustrating additional portions of the exemplary computing environment, in accordance with some exemplary embodiments.

Referring to FIG. 2A, aggregated data store 132 of FI computing system 130 may maintain one or more elements of customer data 202 associated with corresponding customers of the financial institution. By way of example, one or more of the corresponding customers may hold a financial product or an access product provisioned by the financial institution and further, may engage with a financial product, financial service, or access product during one, or more, prior temporal intervals (e.g., during a time-evolving relationship between each of the corresponding customers and the financial institution). Further, in some instances, FI computing system 130 may receive all, or a selected portion, of the elements of customer data 202 from one or more additional computing systems associated with, or operated by, the financial institution, such as, but not limited to, recommendations system 203.

In some instances, recommendations system 203 may represent a computing system that includes one or more servers and tangible, non-transitory memories storing executable code and application modules. Further, the one or more servers may each include one or more processors (such as a central processing unit (CPU)), which may be configured to execute portions of the stored code or application modules to perform operations consistent with the disclosed embodiments. Recommendations system 203 may also include a communications interface, such as one or more wireless transceivers, coupled to the one or more processors for accommodating wired or wireless internet communication with other computing systems and devices operating within environment 100. In some instances, recommendations system 203 may be incorporated into a discrete computing system, although in other instances, recommendations system 203 may correspond to a distributed computing system having a plurality of interconnected, computing components distributed across an appropriate computing network, such as communications network 120 of FIG. 1A, or to a publicly accessible, distributed or cloud-based computing cluster, such as a computing cluster maintained by Microsoft Azure™, Amazon Web Services™, Google Cloud™, or another third-party provider.

Referring back to FIG. 2A, an application program executed by the one or more processors of recommendations system 203 may transmit the elements of customer data 202 across network 120 to FI computing system 130. The transmitted elements of customer data 202 may be encrypted using a corresponding encryption key, such as a public cryptographic key associated with FI computing system 130, and a programmatic interface established and maintained by FI computing system 130, such as application programming interface (API) 204, may receive the elements of customer data 202 from recommendations system 203 and route the elements of customer data 202 to executed data ingestion engine 136, which may perform operations that store the elements of customer data 202 within one or more tangible, non-transitory memories of FI computing system 130, such as within aggregated data store 132.

In some instances, and as described herein, the received elements of customer data 202 may be encrypted, and executed data ingestion engine 136 may perform operations that decrypt each of the encrypted elements of customer data 202 using a corresponding decryption key (e.g., a private cryptographic key associated with FI computing system 130) prior to storage within aggregated data store 132. Further, although not illustrated in FIG. 2A, aggregated data store 132 may also store one or more additional elements of customer data identifying customers of the financial institution, and executed data ingestion engine 136 may perform one or more synchronization operation that merge the received elements of customer data 202 with the previously stored elements of customer data, and that eliminate any duplicate elements existing among the received elements of customer data 202 with the previously stored elements of customer data (e.g., through an invocation of an appropriate Java-based SQL "merge" command).

As described herein, each of the elements of customer data 202 may be associated with, and include a unique identifier of, a customer of the financial institution holds a financial product or an access product provisioned by the financial institution and further, that interacts with a provisioned financial product, financial service, or access product during one, or more, prior temporal intervals. For example, as illustrated in FIG. 2A, element 206 of customer data 202, which may be associated with a particular one of the customers, may include a customer identifier 208 assigned to the particular customer by FI computing system 130 (e.g., an alphanumeric character string, such as a customer name or authentication credential, etc.), and a system identifier 210 associated with recommendations system 203 (e.g., an Internet Protocol (IP) address, a media access control (MAC) address, etc.). Further, although not illustrated in FIG. 2A, each additional, or alternate, element of customer data 202 may be associated with an additional customer of the financial institution, and may include a customer identifier associated with that additional customer and system identifier 210.

As described herein, FI computing system 130 may perform any of the exemplary processes described herein to generate an event-, subgroup-, and in some instances, a group-specific input dataset associated with each of the customers identified by the discrete elements of customer data 202, and to apply a respective one of the trained, event-, subgroup-, or a group-specific machine learning or artificial intelligence processes (e.g., a respective one of the trained, event-, subgroup-, or a group-specific gradient-boosted, decision-tree processes described herein) to corresponding ones of the event-, subgroup-, of, a group-specific input datasets, in accordance with a predetermined temporal schedule (e.g., on a daily, weekly, or monthly basis, etc.), or in response to a detection of a triggering event. By way of example, the triggering event may correspond to a detected change in a composition of the elements of customer data 202 maintained within aggregated data store 132 (e.g., to an ingestion of additional elements of customer data 202, etc.) or to a receipt of an explicit request received from recommendation system 203.

In some instances, and in accordance with the predetermined temporal schedule, or upon the detection of the triggering event, a process input engine 212 executed by FI computing system 130 may perform operations that access the elements of customer data 202 maintained within aggregated data store 132, and that obtain the customer identifier maintained within a corresponding one of the accessed elements of customer data 202. For example, as illustrated in FIG. 2A, executed process input engine 212 may access element 206 of customer data 202 and obtain customer identifier 208, which includes, but is not limited to, the alphanumeric character string assigned to a particular customer of the financial institution (e.g., one of customer identifier 146 of FIG. 1A, as described herein).

Executed process input engine 212 may also access consolidated data store 144, and perform operations that identify, within consolidated data records 214, a subset 216 of consolidated data records that include customer identifier 208 and as such, are associated with the particular customer of the financial institution identified by element 206 of customer data 202. In some instances, illustrated in FIG. 2A, each data record within subset 216 may include customer identifier 208 and as such, may be associated with the particular customer identified by element 206 of customer data 202. Each of subset 216 of consolidated data records 214 may also include a temporal identifier of a corresponding temporal interval, and one or more consolidated data elements characterizing the particular customer, financial products issued to the particular customer by the financial institution, transactions involving the financial products held by the particular customer and in some instances, an occurrence of one or more engagement events involving the particular customer, during corresponding ones of the temporal intervals.

By way of example, data record 218 of subset 216 may include customer identifier 208, a corresponding temporal identifier 220 (e.g., "2021-11-30," indicating a temporal interval spanning Nov. 1, 2021, through Nov. 30, 2021), and consolidated data elements 222, which identify and characterize the particular customer during the temporal interval spanning Nov. 1, 2021, through Nov. 30, 2021. As described herein, consolidated data elements 222 may also include elements of consolidated activity data that identify and characterize occurrences of customer engagements, and corresponding engagement events, involving the particular customer during the temporal interval (not illustrated in FIG. 2A). Further, data record 218 of subset 216 may also include one or more elements of aggregated data 223 that include aggregated values of account and/or transaction parameters that characterize a behavior of the particular customer during the temporal interval.

Executed process input engine 212 may also perform operations that obtain, from consolidated data store 144, elements of event-specific process input data 184B, which specifies a structure and composition of an event-specific input dataset for a trained, event-specific machine learning or artificial intelligence process, such as, but not limited to, the trained, event-specific, gradient-boosted, decision-tree process described herein. In some instances, executed process input engine 212 may parse event-specific process input data 184B to obtain the composition of the event-specific input dataset, which not only identifies the elements of customer-specific data included within each event-specific input dataset (e.g., input feature values, as described herein), but also a specified sequence or position of these input feature values within the event-specific input dataset.

In some instances, and based on the parsed portions of event-specific process input data 184B, executed process input engine 212 may that identify, and obtain or extract, one or more of the input feature values from one or more of data records maintained within subset 216 of consolidated data records 214 and associated with temporal intervals disposed within the extraction interval $\Delta t_{extract}$, as described herein. Executed process input engine 212 may perform operations that package the obtained, or extracted, input feature values within a corresponding one of event-specific input datasets 224, such as event-specific input dataset 226 associated with the particular customer identified by element 206 of customer data 202, in accordance with their respective, specified sequences or positions. Further, in some examples, and based on the parsed portions of event-specific process input data 184B, executed process input engine 212 may perform operations that compute, determine, or derive one or more of the input features values based on elements of data extracted or obtained from the additional ones of the consolidated data records, such as, but not limited to, one or more of the exemplary computed, determined, or derived input feature values described herein.

Executed process input engine 212 may perform operations that package each of the computed, determined, or derived input feature values into portions of event-specific input dataset 226 in accordance with their respective, specified sequences or positions. Further, in some instances, executed process input engine 212 may also perform any of the exemplary processes described herein to generate, and populate with input feature values, an additional one of event-specific input datasets 224 for each of the additional, or alternate, customers of the financial institution associated with corresponding elements of customer data 202. Executed process input engine 212 may package each of the additional, event-specific input datasets within event-specific input datasets 224, and executed process input engine 212 may provide event-specific input datasets 224 as an input to a predictive engine 232 executed by the one or more processors of FI computing system 130.

Further, as illustrated in FIG. 2A, executed process input engine 212 may also perform operations that obtain, from consolidated data store 144, elements of subgroup-specific process input data 192B, which specifies a structure and composition of a subgroup-specific input dataset for a trained, subgroup-specific machine learning or artificial intelligence process, such as, but not limited to, the trained, subgroup-specific, gradient-boosted, decision-tree process described herein. In some instances, executed process input engine 212 may parse subgroup-specific process input data 192B to obtain the composition of the subgroup-specific input dataset, which not only identifies the elements of customer-specific data included within each subgroup-specific input dataset (e.g., input feature values, as described herein), but also a specified sequence or position of these input feature values within the subgroup-specific input dataset.

In some instances, and based on the parsed portions of subgroup-specific process input data 192B, executed process input engine 212 may perform further operations that identify, and obtain or extract, one or more of the input feature values from one or more of data records maintained within subset 216 of consolidated data records 214 and associated with temporal intervals disposed within the extraction interval $\Delta t_{extract}$, as described herein. Executed process input engine 212 may perform operations that package the obtained, or extracted, input feature values within a corresponding one of subgroup-specific input datasets 228, such as subgroup-specific input dataset 230 associated with the particular customer identified by element 206 of customer data 202, in accordance with their respective, specified sequences or positions. Further, in some examples, and based on the parsed portions of subgroup-specific process input data 192B, executed process input engine 212 may perform operations that compute, determine, or derive one or more of the input features values based on elements of data extracted or obtained from the additional ones of the consolidated data records, such as, but not limited to, one or more of the exemplary computed, determined, or derived input feature values described herein.

Executed process input engine 212 may perform operations that package each of the computed, determined, or derived input feature values into portions of subgroup-specific input dataset 230 in accordance with their respective, specified sequences or positions. Further, in some instances, executed process input engine 212 may also perform any of the exemplary processes described herein to generate, and populate with input feature values, an additional one of subgroup-specific input datasets 228 for each of the additional, or alternate, customers of the financial institution (e.g., which are associated with additional, or alternate, elements of customer data 202). Executed process input engine 212 may package each of the additional, subgroup-specific input datasets within subgroup-specific input datasets 228, and executed process input engine 212 may also provide subgroup-specific input datasets 228 as an additional input to executed predictive engine 232.

As illustrated in FIG. 2A, executed predictive engine 232 may perform operations that obtain, from consolidated data store 144, elements of event-specific process parameter data 184A and subgroup-specific process parameter data 192A, which include a value of one or more process parameters of respective ones of the trained, event-specific and subgroup-specific, gradient-boosted, decision-tree processes, such as, but not limited to, the exemplary event- and subgroup-specific process parameters described herein. In some instances, and based on portions of event-specific process parameter data 184A, executed predictive engine 232 may perform operations that establish a plurality of nodes and a plurality of decision trees for the trained, event-specific, gradient-boosted, decision-tree process, each of which receive, as inputs (e.g., "ingest"), corresponding elements of event-specific input datasets 224. Further, and based on the execution of predictive engine 232, and on the ingestion of event-specific input datasets 224 by the established nodes and decision trees of the trained, gradient-boosted, decision-tree process, FI computing system 130 may perform operations that apply the trained, event-specific gradient-boosted, decision-tree process to each of the event-specific input datasets 224, including event-specific input dataset 226, and that generate elements of event-specific output data 234 associated with each of event-specific input datasets 224, and as such, each of the customers identified by the elements of customer data 202. The elements of event-specific output data 234 associated with corresponding ones of the customers may, for instance, indicate a predicted likelihood of an occurrence of each of a plurality of target engagement events involving the corresponding customer during the future temporal interval (e.g., the target interval $\Delta t_{target}$, described herein).

By way of example, and based on an application of the trained, event-specific gradient-boosted, decision-tree process to event-specific input dataset 226 associated with the particular customer, FI computing system 130 may perform any of the exemplary processes described herein to generate elements of event-specific output data 236 indicative of a predicted likelihood of an occurrence of each of a plurality of target engagement events (e.g., as specified by target event identifiers 174A, etc.) involving the particular customer during the future temporal interval. In some examples, each of the elements of event-specific output data 236 may be associated with the predicted likelihood of the occurrence of a corresponding one of the target engagement events, and may include an event identifier associated with the corresponding target engagement event (e.g., a corresponding one of target event identifiers 174A) and a corresponding event propensity score that ranges from zero, which indicates a minimum predicted likelihood, to unity, which indicates a maximum predicted likelihood. Further, the event propensity scores maintained within the elements of event-specific output data 236 may sum to unity.

Further, and based on portions of subgroup-specific process parameter data 192A, executed predictive engine 232 may perform operations that establish a plurality of nodes and a plurality of decision trees for the trained, subgroup-specific gradient-boosted, decision-tree process, each of which ingest corresponding elements of subgroup-specific input datasets 228. In some instances, based on the execution of predictive engine 232, and on the ingestion of subgroup-specific input datasets 228 by the established nodes and decision trees of the trained, subgroup-specific gradient-boosted, decision-tree process, FI computing system 130 may perform operations that apply the trained, subgroup-specific gradient-boosted, decision-tree process to each of subgroup-specific input datasets 228, including subgroup-specific input dataset 230, and that generate elements of subgroup-specific output data 238 associated with each of subgroup-specific input datasets 228, and as such, each of the customers identified by the elements of customer data 202. As described herein, the elements of subgroup-specific output data 238 associated with corresponding ones of the customers may indicate a predicted likelihood of an occurrence of an engagement event associated with the corresponding customer and with each of a plurality of target event subgroups during the target interval $\Delta t_{target}$.

By way of example, and based on an application of the trained, subgroup-specific gradient-boosted, decision-tree process to subgroup-specific input dataset 230 associated with the particular customer identified by element 206 of customer data 202, FI computing system 130 may perform any of the exemplary processes described herein to generate elements of subgroup-specific output data 240 indicative of a predicted likelihood of an occurrence of an engagement event associated with the particular customer and with each of a plurality of target event subgroups (e.g., as specified by target event identifiers 174A, etc.) during the future temporal interval. In some instances, each of the elements of subgroup-specific output data 240 may be associated with the predicted likelihood of the occurrence of the engagement event associated with a corresponding one of the target event subgroups, and may include a subgroup identifier associated with the corresponding target event subgroup (e.g., a corresponding one of target subgroup identifiers 174B) and a subgroup propensity score ranging from zero, which indicates a minimum predicted likelihood, to unity, which indicates a maximum predicted. Further, the propensity scores maintained within the elements of subgroup-specific output data 240 may sum to unity.

As illustrated in FIG. 2A, executed predictive engine 232 may provide the generated elements of event-specific output data 234 and the generated elements of subgroup-specific output data 238 (e.g., either alone, or in conjunction with corresponding ones of event-specific input datasets 224 or subgroup-specific input datasets 228) as inputs to a post-processing engine 242 executed by the one or more processors of FI computing system 130. In some instances, and upon receipt of the generated elements of event-specific output data 234 and subgroup-specific output data 238 (e.g., and additionally, or alternatively, the corresponding ones of event-specific input datasets 224 or subgroup-specific input datasets 228), executed post-processing engine 242 may perform operations that access the elements of customer data 202 maintained within aggregated data store 132, and associate each of the elements of customer data 202 (e.g., that identify corresponding ones of the customers of the financial institution) with a corresponding subset of the elements of event-specific output data 234 (e.g., that include the event identifiers and the corresponding event propensity scores) and a corresponding subset of the elements of subgroup-specific output data 238 (e.g., that include the subgroup identifiers and the corresponding subgroup propensity scores).

By way of example, the elements of event-specific output data 236 and the elements of subgroup-specific output data 240 may be associated with the particular customer associated with customer identifier 208, e.g., as maintained within element 206 of customer data 202. As described herein, each of the elements of event-specific output data 236 may include an event identifier associated with a corresponding one of the target engagement events (e.g., one of target event identifiers 174A, as described herein) and an event propensity score (e.g., ranging from zero to unity) indicating the predicted likelihood of an occurrence of the corresponding one of the target engagement events during the future temporal interval. Further, and as described herein, each of the elements of subgroup-specific output data 240 may include a subgroup identifier associated with a corresponding one of the target event subgroups (e.g., one of target subgroup identifiers 174B, as described herein) and a subgroup propensity score (e.g., ranging from zero to unity) indicating the predicted likelihood of an occurrence of an engagement event associated with the corresponding one of the target subgroups during the future temporal interval. Executed post-processing engine 242 may, in some instances, associate customer identifier 208 with the elements of event-specific output data 236 and subgroup-specific output data 240, and may perform any of these exemplary processes to associate additional, or alternate, ones of the elements of event-specific output data 234 and subgroup-specific output data 238 with a corresponding ones of the customer identifiers maintained within the elements of customer data 202.

Executed post-processing engine 242 may perform operations that, for each of the customers associated with elements of customer data 202, sort and in some instances, filter, the corresponding subset of the elements of event-specific output data 234 and the corresponding subset of the elements of subgroup-specific output data 238 in accordance with, among other things, respective ones of the event and subgroup propensity scores. By way of example, and for the particular customer associated with customer identifier 208, executed post-processing engine 242 may perform operations that rank the elements of event-specific output data 236 in accordance with values of corresponding ones of the event propensity scores (e.g., in descending order), and generate event-specific, sorted event-specific output data 244 that includes the now-ranked elements of event-specific output data 236. Further, and for the particular customer, executed post-processing engine 242 may perform operations that rank the elements of subgroup-specific output data 240 in accordance with values of corresponding ones of the subgroup propensity scores (e.g., in descending order), and generate subgroup-specific, sorted output data 246 that includes the now-ranked elements of subgroup-specific output data 240. Executed post-processing engine 242 may also perform any of these exemplary processes to ranked the subsets of the elements of event-specific output data 234 and of the elements of subgroup-specific output data 238 associated with each additional, or alternate, customers associated with customer data 202 in accordance with respective ones of the event and subgroup propensity scores (e.g., in descending order, as described herein), and to generate corresponding elements of sorted event-specific and subgroup-specific output data for each of the additional, or alternate customers.

Executed post-processing engine 242 may also perform operations (not illustrated in FIG. 2A) that filter the sorted elements of event-specific output data 236 and subgroup-specific output data 240 in accordance with one or more filtration criteria (and further, the corresponding elements of sorted event-specific and subgroup-specific output data associated with each of the additional, or alternate customers). In some instances, the one or more filtration criteria may specify a threshold number of sorted elements (e.g., five sorted elements, ten sorted elements, etc.), and the threshold number of sorted elements may include those sorted elements of event- and subgroup-specific output data 236 and 240 are associated with the largest values of the respective event and subgroup propensity scores. For example, and for the particular customer associated with customer identifier 207, executed post-processing engine 242 may perform operations that package the threshold number of the sorted elements of event-specific output data 236 associated with the largest event propensity scores into corresponding portions of event-specific, sorted output data 244, and that package the threshold number of the sorted elements of subgroup-specific output data 240 associated with the largest subgroup propensity scores into corresponding portions of subgroup-specific, sorted output data 246.

In other examples, the one or more filtration criteria may specify a threshold score for each of the event propensity scores and the subgroup propensity scores. The threshold scores may, for example, identify a threshold likelihood of an occurrence of each of the target engagement events, and the engagement events associated with each of the target event subgroups during the future temporal interval (e.g., the target interval $\Delta t_{target}$, described herein), and executed post-processing engine 242 may perform further operations that package, into event-specific, sorted output data 244, those sorted elements of event-specific output data 236 associated with an event propensity score that exceeds the corresponding threshold propensity score, and that package, into subgroup-specific, sorted output data 246, those sorted elements of subgroup-specific output data 240 associated with an subgroup propensity score that exceeds the corresponding threshold propensity score. The disclosed embodiments are, however, not limited to these exemplary filtration criteria, and in other examples, executed post-processing engine 242 may also perform operations that filter the sorted elements of event-specific output data 236 and subgroup-specific output data 240 in accordance with any additional or alternate filtration criteria appropriate to the sorted elements of event-specific output data 236 and subgroup-specific output data 240 and to the respective event and subgroup propensity scores, such as, but limited to, a threshold range of event or propensity scores. Further, in some instances, executed post-processing engine 242 may perform any of these exemplary filtration processes described herein to filter the sorted subsets of the elements of event-specific output data 234 and of the elements of subgroup-specific output data 238 associated with each additional, or alternate, customers associated with customer data 202.

Referring back to FIG. 2A, executed pre-processing engine 242 may perform operations that, for the particular customer identified by element 206 of customer data 202, package customer identifier 208 associated with the particular customer (e.g., as maintained within element 206), the elements of event-specific, sorted output data 244, and the elements of subgroup-specific, sorted output data 246, into a data record 248 of sorted output data 250. In some instances, data record 248 may associate the particular customer (e.g., via customer identifier 208) with elements of event-specific, sorted output data 244 and with the sub-group-specific, sorted output data 246 and as such, identify likely occurrences of engagements between the particular customer and corresponding target financial products, financial services, or access products during a future temporal interval (e.g., via the event propensity scores and event identifiers maintained within elements of event-specific, sorted output data 244), and likely occurrences of engagements between the particular customer target subgroups of the financial products, financial services, or access products, during the future temporal interval. Further, executed pre-processing engine 242 may also perform any of the exemplary processes described herein that, for each additional or alternate customer identified by the elements of customer data 202, package into an additional data record of stored output data 250, the corresponding customer identifier associated with the additional, or alternate, customer, along with the corresponding elements of event-specific, output data and subgroup-specific, sorted output data, which characterize the likely future occurrences of the target engagement events, and the engagement events associated with the target event subgroups, that involve the additional, or alternate, customer.

FI computing system 130 may perform operations that transmit all, or a selected portion of, sorted output data 250 across network 120 to recommendations system 203 and in some instances, to an additional, or alternative, computing system associated with, or operated by the financial institution. By way of example, FI computing system 130 may obtain system identifier 210 of recommendation system 203 from one or more of the elements of customer data 202, e.g., from element 206, and based on system identifier 210, FI computing system 130 may perform operations that transmit the data records of sorted output data 250, which associate unique customer identifiers of the financial institution with elements of event- and subgroup-specific output data characterizing likely future occurrences of target engagement events, or engagement events associated with the target event subgroups, during the future temporal interval, across network 120 to recommendations system 203. Further, although not illustrated in FIG. 2A, FI computing system 130 may also encrypt all, or a selected portion of, sorted output data 250 prior to transmission across network 120 using a corresponding encryption key, such as, but not limited to, a corresponding public cryptographic key associated with recommendations system 203.

Figure 2B:
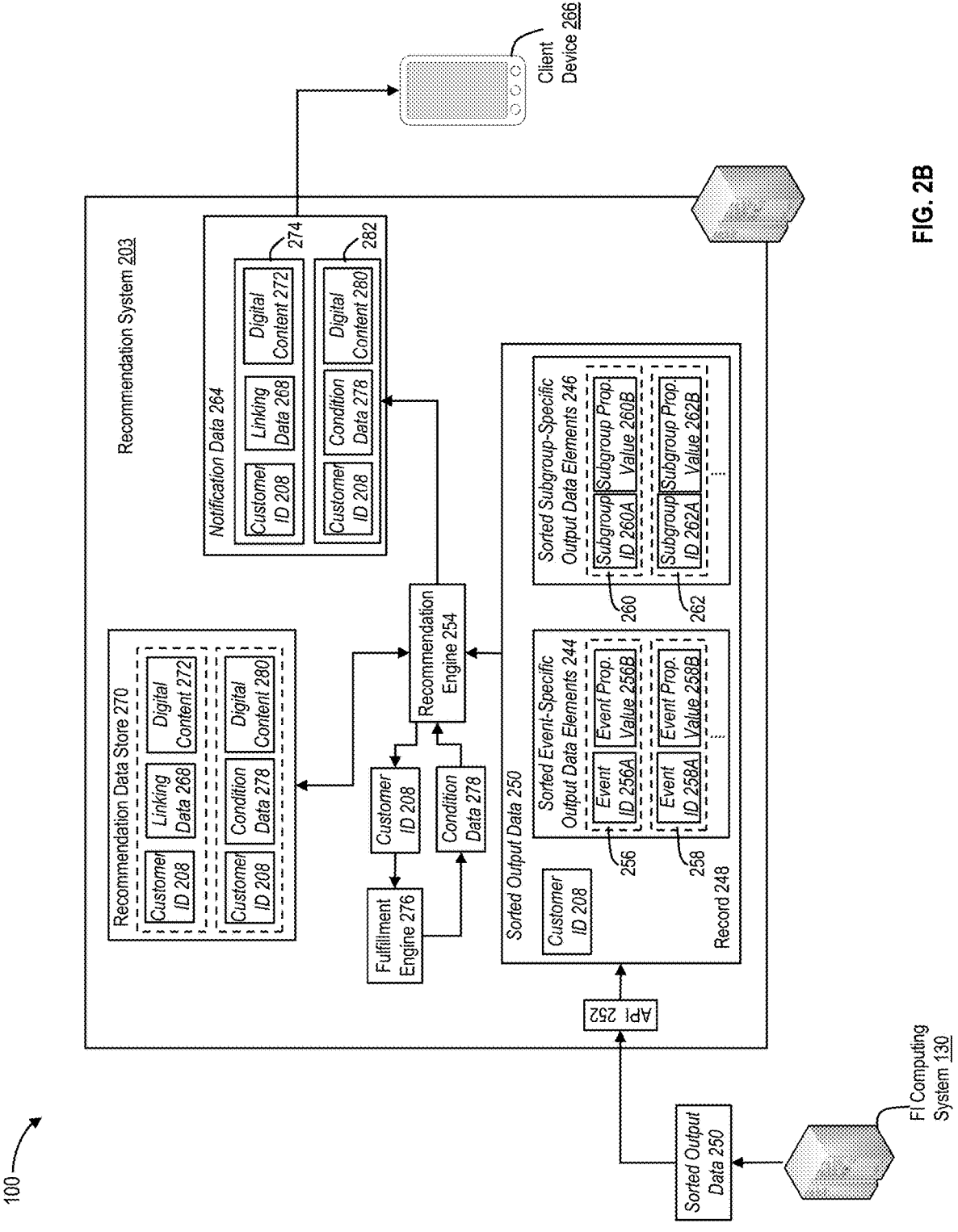

Referring to FIG. 2B, recommendations system 203, may receive, all, or a selected portion, the data records of sorted output data 250 from FI computing system 130. For example, a programmatic interface associated with and maintained by recommendations system 203, such as application programming interface (API) 252, may receive and route sorted output data 250 to a recommendations engine 254 executed by the one or more processors of recommendations system 203. As described herein, the data records of sorted output data 250 may associate corresponding customers of the financial institution (e.g., via a corresponding customer identifier) with elements of event-specific, sorted output data and subgroup-specific, sorted output data, which characterize, among other things, a likelihood that the corresponding customers will engage with target financial products, financial services, or access products provisioned by the financial institution (e.g., associated with the plurality of target engagement events described herein) during a future temporal interval (e.g., the target interval $\Delta t_{target}$, described herein), and a likelihood that the customers will engage with financial products, financial services, or access products during the future temporal interval.

By way of example, data record 248 of sorted output data 250 may include, for the particular customer described herein, customer identifier 208, elements of event-specific, sorted output data 244, and elements of subgroup-specific, sorted output data 246. As described herein, each of the elements of event-specific, sorted output data 244 may characterize a likelihood of an engagement between the particular customer and a corresponding one of the target financial products, financial services, or access products during the future temporal interval (e.g., via an occurrence of a corresponding one of the target engagement events described herein), and each of the each of the elements of subgroup-specific, sorted output data 246 may characterize a likelihood of an engagement between the particular customer and a financial product, financial service, or access product associated with a corresponding one of the target event subgroups during the future temporal interval.

Each of the elements of event-specific, sorted output data 244 may include an event identifier associated with the corresponding one of the target engagement events (and the corresponding one of the target financial or access products) and an event propensity score, which characterizes the likelihood of the occurrence of the corresponding one of the target engagement events involving the particular customer during the future temporal interval. Further, as described herein, each of the elements of subgroup-specific, sorted output data 246 may include a subgroup identifier associated with the corresponding one of the target event subgroups and a subgroup propensity score, which characterizes the likelihood of the occurrence of an engagement event associated with the particular customer and the corresponding one of the target event subgroups. In some instances, the elements of event-specific, sorted output data 244 and subgroup-specific, sorted output data 246 may include a threshold number of elements, as described herein, and the elements of event-specific, sorted output data 244 and subgroup-specific, sorted output data 246 may be ranked (e.g., in descending order) in accordance with respective ones of the event and subgroup propensity scores.

For example, element 256 of event-specific, sorted output data 244 may characterize a predicted likelihood that the particular customer will obtain (e.g., download to a corresponding customer device) a mobile banking application associated with the financial institution (e.g., an occurrence of a corresponding one of the target engagement events involving the particular customer) during the future temporal interval, and may include event identifier 256A associated with the corresponding target engagement event (e.g., alphanumeric identifier associated with the engagement with the mobile banking application, such as the event name described herein, etc.) and a corresponding event propensity value 256B of 0.68, which indicates a 68% likelihood that the particular customer will download the mobile banking application during the future temporal interval. Further, in some examples, element 258 of event-specific, sorted output data 244 may characterize a predicted likelihood that the particular customer will request an upgrade from an existing credit-account issued by the financial institution to a rewards based credit-card account issued by the financial institution (e.g., an occurrence of an additional one of the target engagement events involving the particular customer) during the future temporal interval, and may include event identifier 258A associated with the corresponding target engagement event (e.g., alphanumeric identifier associated with the engagement with the rewards-based credit-account, such as the event name described herein, etc.) and a corresponding event propensity value 258B of 0.15, which indicates a 15% likelihood that the particular customer will request the upgrade to the rewards-based credit-card account during the future temporal interval. The disclosed embodiments are, however, not limited to these exemplary elements of event-specific, sorted output data 244, and in other instances, event-specific, sorted output data 244 include any additional, or alternate, number of discrete data elements (such as, but not limited to the threshold number described herein) that characterize a predicted likelihood of an occurrence of any additional, or alternate, one of the target engagement events during the future temporal interval.

Further, and by way of example, element 260 of subgroup-specific, sorted output data 246 may characterize a predicted likelihood that the particular customer will be involved in an engagement event associated with a mobile application subgroup of the access event group (e.g., an occurrence of an engagement event involving the particular customer and associated with a corresponding one of the target event subgroups) during the future temporal interval, and may include subgroup identifier 260A associated with the corresponding target event subgroup (e.g., alphanumeric identifier associated with the engagement with the mobile application subgroup, such as the subgroup name described herein, etc.) and a corresponding event propensity value 260B of 0.8, which indicates a 80% likelihood that the particular customer will engage with access products associated with the mobile application subgroup during the future temporal interval. In some examples, element 262 of subgroup-specific, sorted output data 246 may characterize a predicted likelihood that the particular customer will be involved in an engagement event associated with a "new credit card" subgroup of the "credit card" event subgroup (e.g., an occurrence of an engagement event associated with an additional one of the target event subgroups) during the future temporal interval, and may include subgroup identifier 262A associated with the target event subgroup (e.g., alphanumeric identifier associated with the engagement with the "new credit card" event subgroup, such as the subgroup name described herein, etc.) and a corresponding event propensity value 262B of 0.2, which indicates a 20% likelihood that the particular customer will engage with the "new credit card" event subgroup during the future temporal interval. The disclosed embodiments are, however, not limited to these exemplary elements of subgroup-specific, sorted output data 246, and in other instances, subgroup-specific, sorted output data 246 include any additional, or alternate, number of discrete data elements (such as, but not limited to the threshold number described herein) that characterize a predicted likelihood of an occurrence of an engagement event involving any additional, or alternate, one of the target event subgroups during the future temporal interval.

As illustrated in FIG. 2B, executed recommendations engine 254 may receive the data records of sorted output data 250, including data record 248, from API 252, and may perform operations that store the data records of stored output data 250 within one or more tangible, non-transitory memories accessible to recommendations system 203. In some instances, executed recommendations engine 254 may perform operations that, for the customer of the financial institution associated with each of the discrete data records of sorted output data 250, generate corresponding elements of notification data characterizing one or more recommended engagements with financial or access products provisioned by the financial institution based on all, or selected portions, the elements of event-specific and subgroup-specific sorted output data maintained within corresponding ones of the discrete data records of sorted output data 250, and that provision the generated elements of notification to a computing system or device operable by the customer, e.g., for presentation within a corresponding digital interface.

In some instances, and for the particular customer associated with data record 248, executed recommendations engine 254 may perform operation that access data record 248, and obtain customer identifier 208 associated with the particular customer, the elements of event-specific, sorted output data 244, which characterize the probably future engagements between the particular customer and corresponding target financial products, financial services, or access products during the future temporal interval (e.g., the target engagement events described herein), and the elements of subgroup-specific, sorted output data 246, which characterize the probable future engagements between the particular customer and the financial products, financial services, or access products associated with corresponding ones of the target event subgroups during the future temporal interval. In some instances, and based on the elements of event-specific, sorted output data 244 and subgroup-specific, sorted output data 246, executed recommendations engine 254 may perform operations, described herein, that generate elements of notification data 264 identifying and characterizing one or more recommended future engagements associated with the one or more of corresponding target financial products, financial services, or access products, and additionally, or alternatively, with corresponding ones of the target event subgroups of the financial products, financial services, or access products, and that transmit the elements of notification data 264 across network 120 to a computing device or computing system operable by the particular customer, such as, but not limited to, client device 266 of FIG. 2B.

By way of example, executed recommendations engine 254 may access element 256 of event-specific, sorted output data 244, which characterizes the predicted likelihood that the particular customer will obtain the mobile banking application associated with the financial during the future temporal interval. Based on event identifier 256A, executed recommendations engine 254 may perform operations that determine a portion of a locally accessible or remotely accessible data repository that includes the mobile application, such as a storage location within a corresponding file system, and that generate linking data 268 that specifies, references, or points to the storage location of the mobile application. Executed recommendations engine 254 may store customer identifier 208 of the particular customer and generated linking data 268 within the one or more tangible, non-transitory memories of recommendations system 203, e.g., within recommendations data store 270, and may package customer identifier 208, linking data 268, and additional elements of digital content 272 associated with the particular customer, the mobile application, or the predicted future engagement involving the particular customer and the mobile application during the future temporal interval into corresponding portions of element 274 of notification data 264.

Executed recommendations engine 254 may also access element 258 of event-specific, sorted output data 244, which characterizes the predicted likelihood that the particular customer will request an upgrade from the existing credit-account issued by the financial institution to a rewards based credit-card account issued by the financial institution during the future temporal interval. Based on event identifier 258A, executed recommendations engine 254 may provide customer identifier 208 as an input to a fulfillment engine 276 executed by the one or more processors of recommendations system 203, and executed fulfillment engine 276 may perform operations (not illustrated in FIG. 2B) that obtain elements of customer profile, account, or transaction data associated with the particular customer and that pre-approve the particular customer for the rewards-based credit-card account in accordance with one or more initial terms and conditions, such as, but not limited to, an initial credit limit or an initial interest rate. Executed fulfillment engine 276 may, for example, generate condition data 278 that identifies each of the initial terms and conditions of the pre-approved rewards-based credit-card account and provision condition data 278 to executed recommendations engine 254, which may store customer identifier 208 and generated condition data 278 within recommendations data store 270, and may package customer identifier 208, condition data 278, and additional elements of digital content 280 associated with the particular customer, the rewards-based credit-card account, or the predicted future engagement involving the particular customer and the rewards-based credit-card account during the future temporal interval, into corresponding portions of element 282 of notification data 264.

Further, although not illustrated in FIG. 2B, executed recommendations engine 254 may perform any of the exemplary processes described herein to process additional, or alternate, ones of the elements of event-specific, sorted output data 244 maintained within data record 248 (such as, but not limited to, the threshold number of elements described herein), and to generate an additional element of notification data 264 associated with corresponding ones of the additional, or alternate elements of event-specific, sorted output data 244, each of which may characterize a predicted future engagement of the particular customer with the target financial or access products. Executed recommendations engine 254 may perform any of the exemplary processes described herein to access, and process, one or more of the elements of subgroup-specific, sorted output data 246 maintained within data record 248 (such as, but not limited to, the threshold number of elements described herein), and to generate a further element of notification data 264 associated with corresponding ones of the accessed and processed elements of subgroup-specific, sorted output data 246, each of which may characterize a predicted future engagement of the particular customer with the financial or access products associated with one of the target event subgroups described herein.

Executed recommendations engine 254 may also perform operations that cause recommendations system 203 to transmit the elements of notification data 264, including elements 274 and 282, across network 120 to a corresponding network address of the computing device or computing system operable by the particular customer, such as, but not limited to, an IP address of client device 266. In some instances, client device 266 may include a computing device having one or more tangible, non-transitory memories that store data and/or software instructions, and one or more processors configured to execute the software instructions. The one or more tangible, non-transitory memories may, in some examples, store application programs, application modules, and other elements of code executable by the one or more processors. For example, as illustrated in FIG. 1, client device 266 may maintain one or more executable application programs within the one or more tangible, non-transitory memories, and examples of the one or more executable application programs include, but are not limited to, an executable web browser, an executable messaging application (e.g., an executable electronic mail (e-mail) application, an executable text-messaging application, etc.), or an executable social-media application.

Additionally, in some instances, client device 266 may include a display unit configured to present interface elements to the particular customer, and an input unit configured to receive input from a user of client device 266, such as the particular customer. By way of example, the display unit may include, but is not limited to, an LCD display unit or other appropriate type of display unit, and the input unit may include, but is not limited to, a keypad, keyboard, touchscreen, fingerprint scanner, voice activated control technologies, stylus, or any other appropriate type of input unit. Further, in some examples, the functionalities of the display unit and the input unit may be combined into a single device, such as a pressure-sensitive touchscreen display unit that can present interface elements (e.g., graphical user interface) and can detect an input from the particular customer via a physical touch. Client device 266 may also include a communications unit, such as a wireless transceiver device, coupled to one or more processors, and the communications unit may be configured by the one or more processors to establish and maintain communications with communications network 120 via a communications protocol, such as WiFi®, Bluetooth®, NFC, a cellular communications protocol (e.g., LTE®, CDMA®, GSM®, etc.), or any other suitable communications protocol.

Figure 2C:
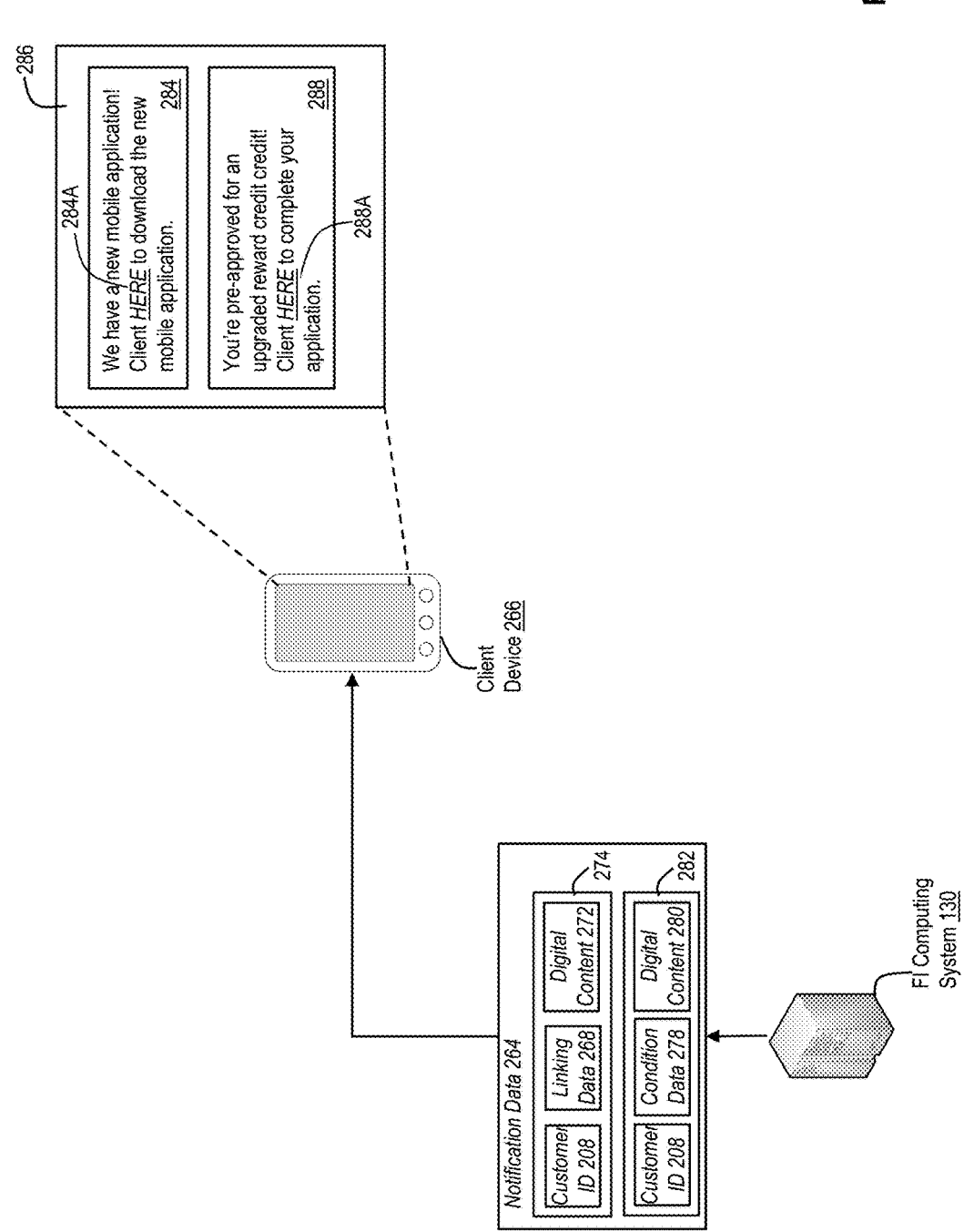

Referring to FIG. 2C, client device 266 may receive the elements of notification data 264 from recommendations system 203, and an application program executed by the one or more processors of client device 266 (e.g., the messaging application, etc.) may store the received elements of notification data 264 within a portion of the one or more tangible, non-transitory memories. Further, the executed application program may perform operations that render each of the elements of notification data 264 for presentation within a corresponding portion of a digital interface, e.g., via the display unit of client device 266. By way of example, the executed application program may access element 274 of notification data 264, which includes customer identifier 208, linking data 268, and digital content 272, generate interface elements 284 representative of the predicted future engagement of the particular customer with the mobile application of the financial institution during the future temporal interval, and present, via the display unit, interface elements 284 within a portion of a digital interface 286. In some instances, when presented within digital interface 286, interface elements 284 may provide a graphical representation of digital content 272 that indicates, to the particular customer, that the financial institution expects the particular customer to engage with the mobile application during the future temporal interval, and may include an interactive hyperlink 284A that, when selected by the particular customer via input provided to the input unit, enables client device 266 to access the storage location of the mobile application (e.g., via linking data 268) and perform operations that store the mobile application within the one or more tangible, non-transitory memories.

Further, in some examples, the executed application program may access element 282 of notification data 264, which includes customer identifier 208, linking data 268, and digital content 272, generate interface elements 288 representative of the predicted future engagement of the particular customer with the rewards-based credit-card account during the future temporal, and present, via the display unit, interface elements 288 within a portion of a digital interface 286. In some instances, when presented within digital interface 286, interface elements 288 may provide a graphical representation of digital content 280 that indicates, to the particular customer, that the financial institution expects the particular customer to engage with request the upgrade to the rewards-based credit-card account during the future temporal interval, and that the particular customer is pre-approved for the rewards-based credit-card account in accordance with the terms and conditions set forth in condition data 278. Interface elements 288 may also include an interactive hyperlink 288A that, when selected by the particular customer via input provided to the input unit, causes client device 266 transmit data indicative of the acceptable of the rewards-based credit-card account and the terms and conditions across network 120 to recommendations system 203, which may perform operations that complete the approval process and issue the rewards-based credit-card account in accordance with the terms and conditions.

In some instances, and through an implementation of certain of the exemplary processes described herein, FI computing system 130 may adaptively train and validate event- and subgroup-specific machine learning or artificial intelligence processes (such as the event- and subgroup-specific, gradient-boosted, decision-tree processes described herein) using customer-specific training and validation data-sets associated with respective training and validation intervals. Based on an application of the trained event- and subgroup-specific machine learning or artificial intelligence process to corresponding customer-specific input datasets, FI computing system 130 may predict, in real-time and for corresponding ones of the customers, a likelihood of an occurrence of an engagement event associated with each of a plurality of target financial products, financial services, or access products (e.g., an occurrence of each of a plurality of target engagement events) and an engagement event associated with each of a plurality of target event subgroups during a predetermined, future temporal interval, and provision output data indicative of the predicted event- or subgroup-specific likelihoods to one or more computing systems associated with the financial institution, such as recommendations system 203.

The disclosed embodiments are, however, not limited to trained and validated event- and subgroup-specific machine learning or artificial intelligence processes, or to the prediction of likely occurrences of engagement events associated with the target financial products, financial services, or access products, or associated with each of a plurality of target event subgroups. In other examples, FI computing system 130 may also perform any of the exemplary processes described herein to adaptively train and validate a group-specific machine learning or artificial intelligence processes (such as a group-specific, gradient-boosted, decision-tree process) using customer-specific training and validation datasets associated with respective training and validation intervals. Based on an application of the trained, group-specific machine learning or artificial intelligence process to corresponding customer-specific input datasets, FI computing system 130 may perform any of these exemplary processes to predict, in real-time and for corresponding ones of the customers, a likelihood of an occurrence of an engagement event involving each of a plurality of target event groups during a predetermined, future temporal interval, and to provision output data indicative of the predicted group-specific likelihoods to one or more computing systems associated with the financial institution, such as recommendations system 203, which may perform operations to provision notifications characterizing probable future engagements between customers of the financial institution and financial products, financial services, or access products associated with the target event groups to computing systems or devices of the customers.

Figure 3:
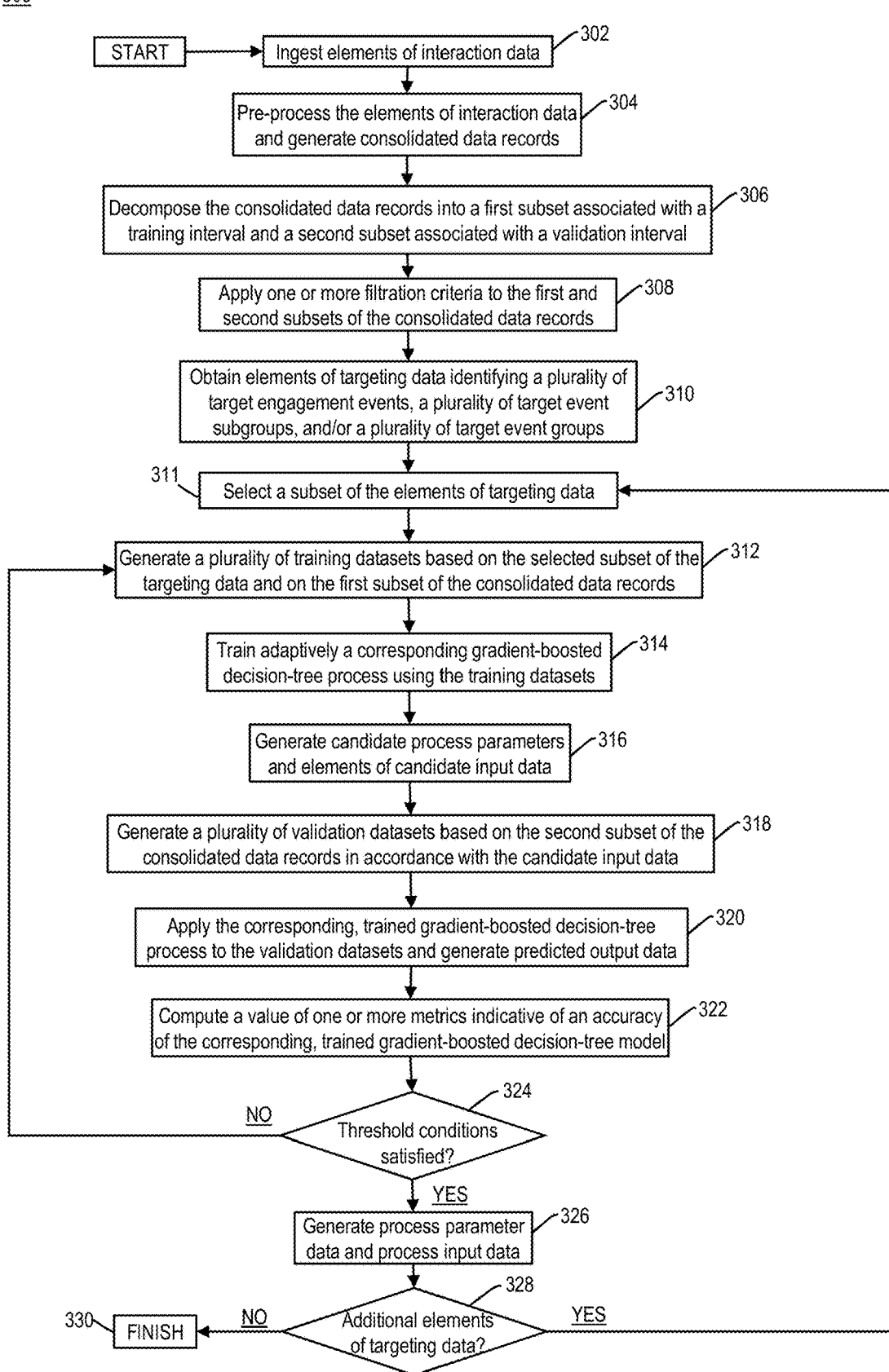
FIG. 3 is a flowchart of an exemplary process for training one or more machine learning or artificial intelligence processes, in accordance with some exemplary embodiments.

FIG. 3 is a flowchart of exemplary process 300 for adaptively training machine learning or artificial intelligence processes to predict likelihoods of occurrences of engagement events during a future temporal interval using training datasets associated with a first prior temporal interval, and using validation datasets associated with a second, and distinct, prior temporal interval. As described herein, the machine learning or artificial intelligence process may include an ensemble or decision-tree process, such as a gradient-boosted decision-tree process (e.g., the XGBoost process), and in some instances, one or more of the distributed components of FI computing system 130, may perform one or more of the steps of exemplary process 300, as described herein in reference to FIG. 3.

By way of example, and through a performance one or more of the steps of exemplary process 300, FI computing system 130 may train adaptively a machine learning or artificial intelligence process (e.g., the event-specific, gradient-boosted decision-tree process described herein) to predict, for a customer of a financial institution at a temporal prediction point, a likelihood of an occurrence of each of the plurality of target engagement events during a future temporal interval. In other examples, through a performance one or more of the steps of exemplary process 300, FI computing system 130 may also perform operations that train adaptively a machine learning or artificial intelligence process (e.g., the subgroup-specific, gradient-boosted decision-tree process described herein) to predict, for a customer of a financial institution at a temporal prediction point, a likelihood of an occurrence of an engagement event associated with each of the plurality of target event subgroups during the future temporal interval and additionally, or alternatively, that train adaptively a machine learning or artificial intelligence process (e.g., the group-specific, gradient-boosted decision-tree process described herein) to predict, for a customer of a financial institution at a temporal prediction point, a likelihood of an occurrence of an engagement event associated with each of the plurality of target event groups during the future temporal interval.

Referring to FIG. 3, FI computing system 130 may perform any of the exemplary processes described herein to establish a secure, programmatic channel of communication with one or more computing systems, such as source systems 102A and 102B of FIG. 1A, and to obtain, from the computing systems, elements of interaction data associated with and characterizing corresponding ones of the customers of the financial institution, such as but not limited to, the elements of customer profile data, account data, transaction data, and/or activity data described herein (e.g., in step 302 of FIG. 3). FI computing system 130 may also perform operations that store (or ingest) the obtained elements of interaction data, including the elements of customer profile data, account data, transaction data, and/or activity data, within one or more accessible data repositories, such as aggregated data store 132 (e.g., also in step 302 of FIG. 3). As described herein, FI computing system 130 may obtain and ingest the one or more of the elements of interaction data (e.g., the customer profile data, account data, transaction data, and/or activity data) in batch form and in accordance with a predetermined temporal schedule (e.g., on a daily basis, on a weekly basis, on a monthly basis, etc.), or on a continuous streaming basis, across the secure, programmatic channel of communication.

Further, FI computing system 130 may access the ingested elements of interaction data (e.g., the elements of customer profile data, account data, transaction data, and/or activity data, described herein), and may perform any of the exemplary processes described herein to pre-process the ingested data (e.g., the elements of customer profile, account, transaction, and/or activity data, as described herein) and generate one or more consolidated data records associated with the ingested data (e.g., in step 304 of FIG. 3). As described herein, the FI computing system 130 may store each of the consolidated data records within one or more accessible data repositories, such as consolidated data store 144 (e.g., also in step 304 of FIG. 3). For example, and as described herein, each of the consolidated data records may be associated with a particular one of the customers, and may include a corresponding pair of a customer identifier associated with the particular customer (e.g., an alphanumeric character string, etc.) and a temporal interval that identifies a corresponding temporal interval (e.g., an alphanumeric character string identifying a date on which FI computing system ingested the elements of customer profile, account, transaction, and/or activity data, as described herein). Further, and in addition to the corresponding pair of customer and temporal identifiers, each of the consolidated data records may also include one or more consolidated elements of the customer profile, account, transaction, and/or or activity data, and one or more aggregated elements of the customer profile, account, transaction, and/or activity data, that characterize the particular customer during the corresponding temporal interval associated with the temporal identifier.

Referring back to FIG. 3, in step 306, FI computing system 130 may perform any of the exemplary processes described herein to decompose the consolidated data records into (i) a first subset of the consolidated data records having temporal identifiers associated with a first prior temporal interval (e.g., the training interval $\Delta t_{training}$, as described herein) and (ii) a second subset of the consolidated data records having temporal identifiers associated with a second prior temporal interval (e.g., the validation interval $\Delta t_{validation}$, as described herein), which may be separate, distinct, and disjoint from the first prior temporal interval. By way of example, portions of the consolidated data records within the first subset may include data appropriate for training adaptively each of the machine-leaning or artificial processes (e.g., the event-, subgroup-, and group-specific gradient-boosted decision process, as described herein), and portions of the consolidated records within the second subset may include data appropriate for validating each of the trained machine-leaning or artificial intelligence processes (e.g., the event-, subgroup-, and group-specific gradient-boosted decision process, as described herein). Further, FI computing system 130 may also perform any of the exemplary processes described herein to filter the consolidated data records of the first and second subsets in accordance with one or more filtration criteria (e.g., in step 308 of FIG. 3).

In some instances, FI computing system 130 may obtain elements of targeting data that identify each of a plurality of target engagement events, each of a plurality of target event subgroups, and in some instances, each of a plurality of target event groups (e.g., in step 310 of FIG. 3). For example, the elements of targeting data may include a plurality of target event identifiers associated with corresponding ones of the plurality of target engagement events (e.g., an alphanumeric event name associated with each of the target engagement events, an alphanumeric character string characterizing an engagement associated with each of the target engagement events, etc.) and a plurality of target subgroup identifiers associated with corresponding ones of the plurality of target event subgroups (e.g., an alphanumeric identifier of subgroup name associated with each of the target event subgroups, as described herein, etc.). Further, in some examples, the elements of targeting data may also include a plurality of target group identifiers associated with corresponding ones of the plurality of target event groups (e.g., an alphanumeric identifier of group name associated with each of the target event subgroups, as described herein, etc.).

In some instances, FI computing system 130 may select a subset of the elements of targeting data for processing (e.g., in step 311 of FIG. 3), and may perform any of the exemplary processes described herein to generate a plurality of training datasets based on elements of data obtained, extracted, or derived from all or a selected portion of the first subset of the consolidated data records, and based on the selected subset of the elements of targeting data (e.g., in step 312 of FIG. 3). By way of example, the selected subset of the elements of targeting data may include the plurality of target event identifiers associated with corresponding ones of the plurality of target engagement events, and each of the training datasets (e.g., the "event-specific" training datasets described herein) may be associated with a corresponding one of the customers of the financial institution and a corresponding temporal interval, and may include, among other things a customer identifier associated with that corresponding customer and a temporal identifier representative of the corresponding temporal interval, as described herein.

Further, each of the event-specific training datasets may also include elements of data (e.g., feature values) that characterize the corresponding one of the customers, the corresponding customer's interaction with the financial institution or with other financial institution, and/or an occurrence (or lack thereof) of one or more of the engagement events, such as, but not limited to, the target engagement events described herein, involving the corresponding customer during a temporal interval disposed prior to the corresponding temporal interval, e.g., the extraction interval $\Delta t_{extract}$ described herein. Further, each of event-specific training datasets may also include elements of ground-truth data indicative of a determined occurrence, or a determined non-occurrence, of each of the plurality of the target engagement events involving the corresponding customer during a corresponding target prediction interval $\Delta t_{target}$, such as, but not limited to, a one-month period disposed between one and two months of the date specified by the temporal identifier.

FI computing system 130 may also perform any of the exemplary processes described herein, to train adaptively a corresponding one of the machine learning or artificial intelligence processes (e.g., the event-specific, gradient-boosted decision-tree process described herein using the plurality of generated training datasets (e.g., in step 314 of FIG. 3). In some examples, the distributed components of FI computing system 130 may perform any of the exemplary processes described herein in parallel to establish the plurality of nodes and a plurality of decision trees for the event-specific gradient-boosted, decision-tree process, and to adaptively train the event-specific gradient-boosted, decision-tree process against the elements of training data included within each of the plurality of the event-specific training datasets. The parallel implementation of these exemplary adaptive training processes by the distributed components of FI computing system 130 may, in some instances, be based on an implementation, across the distributed components, of one or more of the parallelized, fault-tolerant distributed computing and analytical protocols described herein.

Through the performance of these adaptive training processes, FI computing system 130 may perform any of the exemplary processes described herein to compute a value of one or more candidate process parameters that characterize the event-specific specific, gradient-boosted, decision-tree process described herein, and to generate elements of candidate process data that include each of the candidate process parameters (e.g., in step 316 of FIG. 3). In some instances, and for the event-specific, gradient-boosted, decision-tree process, the candidate process parameters may include, but are not limited to, a corresponding learning rate, a corresponding number of discrete decision trees included within the event-specific, gradient-boosted, decision-tree process (e.g., the "n_estimator," etc.), a tree depth characterizing a depth of each of the discrete decision trees, a minimum number of observations in terminal nodes of the decision trees, and/or values of one or more hyperparameters that reduce potential process overfitting (e.g., regularization of pseudo-regularization hyperparameters). Further, and based on the performance of these adaptive training processes, FI computing system 130 may perform any of the exemplary processes described herein to generate elements of candidate input data, which specifies a candidate composition of an input dataset for the corresponding machine learning or artificial intelligence process, such as the event-specific, gradient-boosted, decision-tree process described herein (e.g., also in step 316 of FIG. 3).

By way of example, and as described herein, FI computing system 130 may, in step 314, perform any of the exemplary processes described herein to train adaptively the event-specific, gradient-boosted, decision-tree process to predict, for a customer of the financial institution during a current temporal interval, a likelihood of an occurrence of each of the plurality of target engagement events during a future temporal interval. Further, and through the performance of these adaptive training processes, and FI computing system 130 may, in step 316, compute a value of one or more candidate process parameters that characterize the event-specific, gradient-boosted, decision-tree process, may generate elements of event-specific candidate process data that include each of the candidate process parameters, and may generate elements of event-specific, candidate input data that specifies a candidate composition of an input dataset for the event-specific, gradient-boosted, decision-tree process.

Referring back to FIG. 3, FI computing system 130 may perform any of the exemplary processes described herein to access the second subset of the consolidated data records, and to generate a plurality of validation subsets having compositions consistent with the elements of candidate input data (e.g., in step 318 of FIG. 3). As described herein, each of the plurality of the target-specific validation datasets may be associated with a corresponding one of the customers of the financial institution, and with a corresponding temporal interval within the validation interval $\Delta t_{validation}$, and may include a customer identifier associated with the corresponding one of the customers and a temporal identifier that identifies the corresponding temporal interval. Further, each of the plurality of the validation datasets may also include one or more feature values that are consistent with the candidate input data, associated with the corresponding one of the customers, and obtained, extracted, or derived from corresponding ones of the accessed second subset of the consolidated data records (e.g., during the corresponding extraction interval $\Delta t_{extract}$, as described herein), and one or more elements of ground-truth data, as described herein. In some instances, FI computing system 130 may perform any of the exemplary processes described herein to apply the corresponding machine learning or artificial intelligence process (e.g., the event-specific, gradient-boosted, decision-tree process described herein) to respective ones of the validation datasets, and to generate corresponding elements of output data based on the application of the trained, target-specific machine learning or artificial intelligence process to the respective ones of the validation datasets (e.g., in step 320 of FIG. 3).

Further, in some instances, the distributed components of FI computing system 130 may perform any of the exemplary processes described herein in parallel to validate the corresponding machine learning or artificial intelligence process based on the application of the corresponding machine learning or artificial intelligence process (e.g., configured in accordance with the candidate process parameters) to each of the validation datasets. The parallel implementation of these exemplary adaptive validation processes by the distributed components of FI computing system 130 may, in some instances, be based on an implementation, across the distributed components, of one or more of the parallelized, fault-tolerant distributed computing and analytical protocols described herein.

By way of example, the corresponding machine learning or artificial intelligence process may include the event-specific, gradient-boosted decision-tree process described herein, and in some instances, FI computing system 130 may perform any of the exemplary processes described herein to generate a plurality of event-specific validation subsets having compositions consistent with the elements of event-specific candidate input data (e.g., in step 318 of FIG. 3), and to apply the event-specific, gradient-boosted, decision-tree process to respective ones of the event-specific validation datasets (e.g., in step 320 of FIG. 3). Further, and based on the application of the event-specific, gradient-boosted, decision-tree process to the respective ones of the event-specific validation datasets, FI computing system 130 may perform operations to generate elements of event-specific output data associated with each of the event-specific validation data sets (e.g., also in step 320). As described herein, the elements of event-specific output data, which may be generated through the application of the event-specific, gradient-boosted, decision-tree process to the respective ones of the event-specific validation datasets, may be representative of a predicted likelihood of an occurrence of each of the target engagement events involving, or associated with, a corresponding one of the customers during the future temporal interval. Each of the predicted likelihoods may, for example, be represented by an event propensity score ranging from zero (e.g., indicative of a minimum predicted likelihood) to unity (e.g., indicative of a maximum predicted likelihood).

In step 322 of FIG. 3, FI computing system 130 may perform any of the exemplary processes described herein to compute a value of one or more metrics that characterize a predictive capability, and an accuracy, of the corresponding, trained machine learning or artificial intelligence process (e.g., the trained, event-specific, gradient-boosted, target-specific decision-tree process described herein) based on the generated elements of output data (e.g., the elements of event-specific output data described herein) and corresponding ones of the validation datasets (e.g., the event-specific validation datasets described herein). FI computing system 130 may perform any of the exemplary processes described herein to determine whether all, or a selected portion of, the computed metric values satisfy one or more threshold conditions for a deployment of the corresponding machine learning or artificial intelligence process (e.g., the event-specific, gradient-boosted, target-specific decision-tree process described herein) to the elements of customer profile, account, transaction, or activity data described herein (e.g., in step 324 of FIG. 3).

If, for example, FI computing system 130 were to establish that one, or more, of the computed metric values fail to satisfy at least one of the threshold conditions (e.g., step 324; NO), FI computing system 130 may establish that the corresponding machine learning or artificial intelligence process (e.g., the event-specific, gradient-boosted, target-specific decision-tree process described herein) is insufficiently accurate for deployment and a real-time application to the elements of customer profile, account, transaction, or activity data described herein. Exemplary process 300 may, for example, pass back to step 312, and FI computing system 130 may perform any of the exemplary processes described herein to generate additional training datasets based on the elements of the consolidated data records maintained within the first subset (e.g., additional ones of the event-specific training datasets described herein).

Alternatively, if FI computing system 130 were to determine that each computed metric value satisfies the threshold requirements (e.g., step 324; YES), FI computing system 130 may deem the corresponding machine learning or artificial intelligence process (e.g., the event-specific, gradient-boosted, decision-tree process described herein) ready for deployment and real-time application to the elements of customer profile, account, transaction, and/or activity data described herein, and may perform any of the exemplary processes described herein to generate elements of process parameter data (that includes the candidate process parameters) and elements of process input data associated with the corresponding, trained, machine learning or artificial intelligence process (e.g., in step 326 of FIG. 3). For example, and based on a determination that each of the computed metric value associated with the event-specific, gradient-boosted, decision-tree process satisfies the threshold requirements (e.g., step 324; YES), FI computing system 130 may deem the event-specific, gradient-boosted, decision-tree process ready for deployment, and FI computing system 130 may perform operations in step 326 that generate elements of event-specific process parameter data, which includes all, or a selected subset, of the process parameters included within the event-specific candidate process data, and elements of event-specific process input data, which specifies a structure and composition of an event-specific input dataset associated with the event-specific, gradient-boosted, decision-tree process.

FI computing system 130 may perform operations that determine whether additional, or alternate, subsets of the elements of targeting data await processing using any of the exemplary processes described herein (e.g., in step 328 of FIG. 3). If, for example, FI computing system 130 were to determine that further subsets of the elements of obtained targeting data await processing (e.g., step 328; YES), exemplary process 300 may pass back to step 310, and FI computing system 130 may perform any of the exemplary processes described herein to select an additional subset of the elements of targeting data, to generate a plurality of additional training datasets based on elements of data obtained, extracted, or derived from all or a selected portion of the first subset of the consolidated data records, and based on the additional subset of the elements of targeting data, and to train adaptively an additional one of the machine learning or artificial intelligence processes using the additional, target-specific training datasets, and to validate the additional machine learning or artificial intelligence process based on additional validation data sets associated with the additional subset of the elements of targeting data and derived from elements of data obtained, extracted, or computed from all or a selected portion of the second subset of the consolidated data records.

As described herein, and in addition to the selected subset of the elements of targeting data that include the plurality of target subgroup identifiers associated with corresponding ones of the plurality of target event subgroups and in some instances, the plurality of target group identifiers associated with corresponding ones of the plurality of target event groups. By way of example, FI computing system 130 may select the plurality of target subgroup identifiers as the additional subset of the elements of targeting data, and FI computing system 130 (e.g., in step 310 of FIG. 3), and may perform any of the exemplary processes described herein to generate a plurality of subgroup-specific training datasets based on elements of data obtained, extracted, or derived from all or a selected portion of the first subset of the consolidated data records, and based on the target subgroup identifiers (e.g., in step 312 of FIG. 3), and to train adaptively a subgroup-specific machine learning or artificial intelligence process (e.g., the subgroup-specific gradient-boosted decision-tree process described herein) using the subgroup-specific training datasets (e.g., in steps 314 and

316 of FIG. 3), and to validate the trained, subgroup-specific machine learning or artificial intelligence process based on subgroup-specific validation data sets derived from elements of data obtained, extracted, or derived from all or a selected portion of the second subset of the consolidated data records (e.g., in steps 318-326 of FIG. 3).

In other examples, FI computing system 130 may select the plurality of target group identifiers as the additional subset of the elements of targeting data (e.g., in step 310 of FIG. 3), and FI computing system 130 may perform any of the exemplary processes described herein to generate a plurality of group-specific training datasets based on elements of data obtained, extracted, or derived from all or a selected portion of the first subset of the consolidated data records, and based on the target subgroup identifiers (e.g., in step 312 of FIG. 3), to train adaptively a group-specific machine learning or artificial intelligence process (e.g., the gradient-boosted decision-tree process described herein) using the subgroup-specific training datasets (e.g., in steps 314 and 316 of FIG. 3), and to validate the trained, group-specific machine learning or artificial intelligence process based on group-specified validation data sets derived from elements of data obtained, extracted, or derived from all or a selected portion of the second subset of the consolidated data records (e.g., in steps 318-326 of FIG. 3).

Referring back to FIG. 3, if FI computing system 130 were to determine that no further subsets of the elements of obtained targeting data await processing (e.g., step 328; NO), exemplary process 300 is then complete in step 330.

FIG. 4 is a flowchart of an exemplary process 400 for predicting a likelihood of future occurrences of engagements events involving a customer of a financial institution based on an application of one or more trained, machine learning or artificial intelligence processes to corresponding, customer-specific input datasets, in accordance with the disclosed exemplary embodiments. As described herein, each of the one or more target-specific, machine learning or artificial intelligence processes may include an ensemble or decision-tree process, such as a gradient-boosted decision-tree process (e.g., the XGBoost process), and in some instances, one or more of the distributed components of FI computing system 130 may perform one or more of the steps of exemplary process 400, as described herein.

Referring to FIG. 4, FI computing system 130 may perform any of the exemplary processes described herein to receive elements of customer data that identify one or more customers of the financial institution (e.g., in step 402 of FIG. 4). For example, FI computing system 130 may receive the elements of customer data from one or more additional computing systems associated with, or operated by, the financial institution (such as, but not limited to, recommendations system 203), and in some instances, FI computing system 130 may perform any of the exemplary processes described herein to store the obtained elements of customer data within a locally accessible data repository (e.g., within aggregated data store 132). Further, in some instances, FI computing system 130 may also perform any of the exemplary processes described herein to synchronize and merge the obtained elements of customer data with one or more previously ingested elements of customer data maintained within the locally accessible data repository. As described herein, each of the elements of customer data may be associated with a corresponding one of the customers, and may include a customer identifier associated with the corresponding one of the customers (e.g., the alphanumeric character string, etc.) and a system identifier associated with a corresponding one of the additional computing systems (e.g., an IP or MAC address of recommendations system 203, etc.).

In some instances, FI computing system 130 may perform any exemplary processes described herein to generate, for each of the customers identified by the received elements of customer data, an input dataset associated with one or more trained, learning or artificial intelligence processes, and to apply a corresponding one of the trained machine learning or artificial intelligence processes to each of the input datasets, in accordance with a predetermined temporal schedule (e.g., on a daily, weekly, or monthly basis), or in response to a detection of a triggering event. By way of example, and without limitation, the triggering event may correspond to a detected change in a composition of the elements of customer data 202 maintained within aggregated data store (e.g., to an ingestion of additional elements of customer data 202, etc.) or to a receipt of an explicit request received from recommendations system 203.

By way of example, the one or more trained machine learning or artificial intelligence processes may include a trained, and event-specific, machine learning or artificial intelligence processes (e.g., the trained, event-specific, gradient-boosted, decision-tree process described herein), a trained, subgroup-specific, machine learning or artificial intelligence process (e.g., the trained, subgroup-specific, gradient-boosted, decision-tree process described herein), and in some instances, a trained, group-specific, machine learning or artificial intelligence process (e.g., the trained, group-specific, gradient-boosted, decision-tree process described herein). As illustrated in FIG. 4, FI computing system 130 may perform any of the exemplary processes described herein to obtain elements of event-, subgroup-, or group-specific process parameter data and process input data associated with respective ones of the trained, event-, sub-group-, or group-specific, gradient-boosted, decision-tree processes (e.g., in step 404 of FIG. 4). In some instances, each of elements of the event-, subgroup-, or group-specific process parameter data may specify corresponding values of one or more process parameters associated with respective ones of the trained, event-, subgroup-, or group-specific, machine learning or artificial intelligence processes, such as, but not limited to, the exemplary process parameters associated with the trained, event-, subgroup-, or group-specific, gradient-boosted, decision-tree processes, as described herein. Further, the elements of event-, subgroup-, or group-specific process input data specify a structure and composition of an input dataset associated with respective ones of the trained, event-, subgroup-, or group-specific, machine learning or artificial intelligence processes.

Referring back to FIG. 4, FI computing system 130 may access the elements of customer data associated with one or more customers of the financial institution, and may perform any of the exemplary processes described herein to generate, for each of the one or more customers, an event-specific input dataset, a subgroup-specific input dataset, and in some instances, a group-specific input dataset having compositions consistent with corresponding ones of the elements of event-, subgroup-, and group-specific process input data (e.g., in step 406 of FIG. 4). As described herein, the elements of customer data may include customer identifiers associated with each of the customers of the financial institution, or with a selected subset of these customers, and FI computing system 130 may perform any of the exemplary processes described herein to generate the event-, subgroup-, or group-specific input datasets for each of these customers in accordance with a predetermined schedule (e.g., on a daily, weekly, or monthly basis) or based on a detected occurrence of a triggering event. In other examples, FI computing system 130 may perform operations that generate the event-, subgroup-, or group-specific input datasets for each of these customers in real-time and contemporaneously with the receipt of the elements of the customer data from recommendations system 203.

In some instances, FI computing system 130 may perform any of the exemplary processes described herein to apply the trained, event-, subgroup-, and/or group-specific, machine learning or artificial intelligence processes to corresponding ones of the event-, subgroup-, and/or group-specific input datasets associated with each of the one or more customers (e.g., in step 408 of FIG. 4). Further, and based on the application of the corresponding ones of the trained, event-, subgroup-, and/or group-specific, machine learning or artificial intelligence processes to the event-, subgroup-, and/or group-specific input datasets, FI computing system 130 may perform any of the exemplary processes described herein to generate corresponding elements of event-, subgroup-, or group-specific output data associated with each of the one or more customers (e.g., in step 410 of FIG. 4).

By way of example, and based the values of the process parameters specified within the elements of event-specific process parameter data, FI computing system 130 may perform operations, described herein, that establish a plurality of nodes and a plurality of decision trees for the trained, event-specific gradient-boosted, decision-tree process, each of which receive, as inputs (e.g., "ingest"), corresponding elements of the event-specific input datasets for each of the customers. Based on the ingestion of the event-specific input datasets by the established nodes and decision trees of the trained, event-specific, gradient-boosted, decision-tree process, FI computing system 130 may perform operations that apply the trained, event-specific, gradient-boosted, decision-tree process to each of the event-specific input datasets (e.g., in step 408 of FIG. 4) and that generate the event-specific elements of the output data associated with the corresponding ones of the event-specific input datasets, and with corresponding ones of the customers (e.g., in step 410 of FIG. 4).

As described herein, the elements of event-specific output data may be indicative of a predicted likelihood of an occurrence of each of a plurality of target engagement events involving the corresponding ones of the customer of the financial institution during the future temporal interval. In some instances, and for a particular customer, each of the elements of event-specific output data may be associated with the predicted likelihood of the occurrence of a corresponding one of the target engagement events, and may include an event identifier associated with the corresponding target engagement event (e.g., a corresponding one of target event identifiers 174A of FIG. 1B) and a corresponding event propensity score that ranges from zero, which indicates a minimum predicted likelihood, to unity, which indicates a maximum predicted likelihood.

Further, in some examples, and based the values of the process parameters specified within the elements of sub-group-specific process parameter data, FI computing system 130 may perform operations, described herein, that establish a plurality of nodes and a plurality of decision trees for the trained, subgroup-specific gradient-boosted, decision-tree process, each of which ingest corresponding elements of the subgroup-specific input datasets for each of the customers. Based on the ingestion of the subgroup-specific input datasets by the established nodes and decision trees of the trained, subgroup-specific, gradient-boosted, decision-tree process, FI computing system 130 may perform operations that apply the trained, subgroup-specific, gradient-boosted, decision-tree process to each of the subgroup-specific input datasets (e.g., also in step 408 of FIG. 4) and that generate the subgroup-specific elements of the output data associated with the corresponding ones of the subgroup-specific input datasets, and with corresponding ones of the customers (e.g., in step 410 of FIG. 4).

The elements of subgroup-specific output data may, for corresponding ones of the customers of the financial institution, be indicative of a predicted likelihood of an occurrence of an engagement event associated with each of a plurality of target event subgroups during the future temporal interval. In some instances, and for a particular customer, each of the elements of subgroup-specific output data may be associated with the predicted likelihood of the occurrence of the engagement event associated with a corresponding ones of the target event subgroups, and may include an subgroup identifier associated with the corresponding target event subgroup (e.g., a corresponding one of target subgroup identifiers 174B of FIG. 1B) and a corresponding subgroup propensity score that ranges from zero, which indicates a minimum predicted likelihood, to unity, which indicates a maximum predicted likelihood.

Additionally, or alternatively, based on the values of the process parameters specified within the elements of group-specific process parameter data, FI computing system 130 may perform operations, described herein, that establish a plurality of nodes and a plurality of decision trees for the trained, group-specific gradient-boosted, decision-tree process, each of which ingest corresponding elements of the group-specific input datasets for each of the customers. Based on the ingestion of the group-specific input datasets by the established nodes and decision trees of the trained, group-specific, gradient-boosted, decision-tree process, FI computing system 130 may perform operations that apply the trained, group-specific, gradient-boosted, decision-tree process to each of the group-specific input datasets (e.g., also in step 408 of FIG. 4) and that generate the group-specific elements of the output data associated with the corresponding ones of the group-specific input datasets, and with corresponding ones of the customers (e.g., in step 410 of FIG. 4).

The elements of group-specific output data may, for corresponding ones of the customers of the financial institution, be indicative of a predicted likelihood of an occurrence of an engagement event associated with each of a plurality of target event groups during the future temporal interval. In some instances, and for a particular customer, each of the elements of group-specific output data may be associated with the predicted likelihood of the occurrence of the engagement event associated with a corresponding ones of the target event groups, and may include a group identifier associated with the corresponding target event group and a corresponding group propensity score that ranges from zero, which indicates a minimum predicted likelihood, to unity, which indicates a maximum predicted likelihood.

FI computing system 130 may also perform any of the exemplary processes described herein to post-process the elements of event-, subgroup-, and/or group-specific output data associated with each of the customers (e.g., in step 412 of FIG. 4). By way of example, in step 412, FI computing system 130 may also perform any of the exemplary processes described herein to, for each of the customers of the customers identified by the received elements of customer data: (i) rank corresponding elements of event-, subgroup-, and/or group-specific output data based on respective ones of the event, subgroup, and/or group propensity scores (e.g., in descending order, etc.), and (ii) to filter corresponding ones of the ranked elements of event-, subgroup-, and/or group-specific output data in accordance with one or more filtration criteria.

In some instances, FI computing system 130 may perform any of the exemplary processes described herein to package, into respective data records of ranked output data (e.g., sorted output data 250 of FIGS. 2A and 2B), the customer identifier associated with a corresponding one of the customers and the ranked and filtered elements of event-, subgroup-, and/or group-specific output data that characterize the corresponding customer (e.g., in step 414 of FIG. 4). FI computing system 130 may also perform operations that transmit all, or a selected subset, of the data records of the sorted output data across network 120 to recommendation system 203 (e.g., in step 416 of FIG. 4). As described herein, recommendations system 203, may receive the data records of ranked output data from FI computing system 130, and may perform any of the exemplary processes described herein to generate elements of notification data characterizing one or more recommended engagements between the each of the customers and financial products, financial services, or access products provisioned by the financial institution based on all, or selected portions, of the forted and filtered elements of event-, subgroup, and/or group-specific sorted output data maintained within corresponding ones of the discrete data records of the ranked output data, and to provision the generated elements of notification to a computing system or device operable by corresponding ones of the customer, e.g., for presentation within a corresponding digital interface. Exemplary process 400 is then complete in step 418.

C. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, including, but not limited to, application programming interfaces (APIs) 134, 204, and 252, ingestion engine 136, pre-processing engine 140, training engine 166, training input module 170, adaptive training and validation module 178, process input engine 212, predictive engine 232, post-processing engine 242, and recommendation engine 254, fulfillment engine 276, can be implemented as one or more computer programs, i.e., one or more modules of computer program instructions encoded on a tangible non transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow. Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:

a memory storing instructions;

a communications interface; and at least one processor coupled to the memory and the communications interface, the at least one processor being configured to execute the instructions to:

perform operations that train an artificial intelligence process using a plurality of training datasets and corresponding elements of ground-truth data, each of the training datasets being associated with a prior temporal interval, and for each of the training datasets, the elements of ground-truth data indicate an occurrence or a non-occurrence of each of a plurality of target events during a portion of the prior temporal interval;

receive, via the communications interface, an identifier associated with a customer from a computing system, and based on the received identifier, obtain, from the memory, first elements of consolidated data associated with a first temporal interval and with the received identifier;

generate a first input dataset based on the first elements of consolidated data;

based on an application of a trained first artificial intelligence process to the first input dataset, generate output data representative of a predicted likelihood of an occurrence of each of the plurality of target events during a second temporal interval, the second temporal interval being subsequent to the first temporal interval and being separated from the first temporal interval by a corresponding buffer interval; and transmit at least a portion of the output data to the computing system via the communications interface, the computing system being configured to generate, based on the portion of the output data, notification data associated with the predicted likelihood of the occurrence of at least one of the target events and to provision the notification data to a device.

2. The apparatus of claim 1, wherein:

the output data comprises a plurality of output data elements; and each of the output data elements comprises an identifier associated with a corresponding one of the target events and a numerical score indicative of the predicted likelihood of the occurrence of the corresponding one of the target events during the second temporal interval.

3. The apparatus of claim 2, wherein the at least one processor is further configured to execute the instructions to:

perform operations that rank the output data elements in accordance with the numerical scores; and transmit at least a predetermined subset of the ranked output data elements to the computing system via the communications interface.

4. The apparatus of claim 1, wherein the trained first artificial intelligence process comprises a trained, gradient-boosted, decision-tree process.

5. The apparatus of claim 1, wherein the at least one processor is further configured to:

obtain (i) one or more parameters that characterize the trained first artificial intelligence process and (ii) data that characterizes a composition of the first input dataset;

generate the first input dataset in accordance with the data that characterizes the composition; and apply the trained first artificial intelligence process to the first input dataset in accordance with the one or more parameters.

6. The apparatus of claim 5, wherein the at least one processor is further configured to:

based on the data that characterizes the composition, perform operations that at least one of extract a first feature value from the first elements of consolidated data or compute a second feature value based on the first feature value; and generate the first input dataset based on at least one of the extracted first feature value or the computed second feature value.

7. The apparatus of claim 1, wherein the at least one processor is further configured to execute the instructions to:

obtain second elements of consolidated data and elements of targeting data, each of the second elements of consolidated data comprising a temporal identifier associated with a corresponding one of the prior temporal intervals, and the elements of targeting data comprising event identifiers associated with the plurality of target events;

based on the temporal identifiers, determine that a first subset of the second elements of consolidated data are associated with a prior training interval, and that a second subset of the second elements of consolidated data are associated with a prior validation interval; and generate a plurality of training datasets based on the event identifiers and on corresponding portions of the first subset, and perform the operations that train the first artificial intelligence process using on the training datasets.

8. The apparatus of claim 7, wherein the at least one processor is further configured to execute the instructions to:

generate a plurality of validation datasets based the event identifiers and on corresponding portions of the second subset;

apply the trained first artificial intelligence process to the plurality of validation datasets, and generate additional elements of output data based on the application of the trained first artificial intelligence process to the plurality of validation datasets;

compute one or more validation metrics based on the additional elements of output data; and based on a determined consistency between the one or more validation metrics and a threshold condition, validate the trained first artificial intelligence process.

9. The apparatus of claim 1, wherein the at least one processor is further configured to execute the instructions to:

obtain (i) one or more parameters that characterize a trained second artificial intelligence process and (ii) data that characterizes a composition of a second input dataset associated with the trained second artificial intelligence process;

based on the first elements of consolidated data, generate the second input dataset in accordance with the data that characterizes the composition;

apply the trained second artificial intelligence process to the second input dataset in accordance with the one or more parameters, and based on the application of the trained second artificial intelligence process to the second input dataset, generate additional output data representative of a predicted likelihood of an occurrence of an event associated with a plurality of target event subgroups during the second temporal interval; and transmit at least a portion of the additional output data to the computing system via the communications interface.

10. The apparatus of claim 1, wherein:

the plurality of target events comprise a plurality of target engagement events associated with the customer; and the first elements of consolidated data comprise one or more elements of activity data associated with the customer, the one or more elements of activity data characterizing an occurrence of at least one of the target engagement events during the first temporal interval.

11. The apparatus of claim 1, wherein the at least one processor is further configured to execute the instructions to:

receive interaction data associated with the first temporal interval from a plurality of computing systems via the communications interface;

generate a plurality of elements of consolidated data based on an application of one or more pre-processing operations to the interaction data; and store, within the memory, each of the plurality of elements of consolidated data elements, each of the plurality of elements of consolidated data being associated with the first temporal interval and with an identifier of a corresponding device, and the stored elements of consolidated data comprising the first elements of consolidated data.

12. The apparatus of claim 1, wherein the at least one processor is further configured to execute the instructions to:

receive, via the communications interface, a plurality of additional identifiers from the computing system, each of the additional identifiers being associated with a corresponding one of a plurality of customers;

obtain, from the memory, subsets of the elements of consolidated data associated with the first temporal interval and with corresponding ones of the additional identifiers; and generate an additional input dataset based on each of the subsets, and based on an application of the trained first artificial intelligence process to the each of additional input datasets, generate, for corresponding ones of the additional identifiers, corresponding elements of additional output data representative of a predicted likelihood of an occurrence of each of the plurality of target events during the second temporal interval.

13. The apparatus of claim 1, wherein:

the trained artificial intelligence process is characterized by a value of one or more parameters; and the at least one processor is further configured to execute the instructions to:

perform operations that apply the trained artificial intelligence process to a corresponding plurality of validation datasets in accordance with the one or more parameter values, and that generate elements of validation output data based on the application of the trained artificial intelligence process to the plurality of validation datasets;

compute a value of a validation metric based on the elements of validation output data, and based on a determined inconsistency between the validation metric value and a threshold condition, update at least of the parameter values that characterize the trained artificial intelligence process; and apply the trained first artificial intelligence process to the first input dataset in accordance with the at least one of the updated parameter values.

14. A computer-implemented method, comprising:

performing operations, using at least one processor, that train an artificial intelligence process using a plurality of training datasets and corresponding elements of ground-truth data, each of the training datasets being associated with a prior temporal interval, and for each of the training datasets, the elements of ground-truth data indicate an occurrence or a non-occurrence of each of a plurality of target events during a portion of the prior temporal interval;

receiving an identifier associated with a customer from a computing system using the at least one processor, and based on the received identifier, obtaining, using the at least one processor, and from a data repository, first elements of consolidated data associated with the received identifier and with a first temporal interval;

generating, using the at least one processor, a first input dataset based on the first elements of consolidated data;

using the at least one processor, and based on an application of a trained first artificial intelligence process to the first input dataset, generating output data representative of a predicted likelihood of an occurrence of each of the plurality of target events during a second temporal interval, the second temporal interval being subsequent to the first temporal interval and being separated from the first temporal interval by a corresponding buffer interval; and transmitting, using the at least one processor, at least a portion of the output data to the computing system, the computing system being configured to generate, based on the portion of the output data, notification data associated with the predicted likelihood of the occurrence of at least one of the target events and to provision the notification data to a device.

15. The computer-implemented method of claim 14, wherein:

the output data comprises a plurality of output data elements; and each of the output data elements comprises an identifier associated with a corresponding one of the target events and a numerical score indicative of the predicted likelihood of the occurrence of the corresponding one of the target events during the second temporal interval.

16. The computer-implemented method of claim 15, wherein:

the computer-implemented method further comprises performing, using the at least one processor, operations that rank the output data elements in accordance with the numerical scores; and the transmitting comprises transmitting at least a predetermined subset of the ranked output data elements to the computing system.

17. The computer-implemented method of claim 14, wherein:

the trained first artificial intelligence process comprises a trained, gradient-boosted, decision-tree process; and the computer-implemented method further comprises:

using the at least one processor, obtaining (i) one or more parameters that characterize the trained first artificial intelligence process and (ii) data that characterizes a composition of the first input dataset;

based on the data that characterizes the composition, performing operations, using the at least one processor, that at least one of extract a first feature value from the first elements of consolidated data or compute a second feature value based on the first feature value; and generating, using the at least one processor, the first input dataset based on at least one of the extracted first feature value or the computed second feature value; and applying, using the at least one processor, the trained first artificial intelligence process to the first input dataset in accordance with the one or more parameters.

18. The computer-implemented method of claim 14, further comprising:

obtaining, using the at least one processor, second elements of consolidated data and elements of targeting data, each of the second elements of consolidated data comprising a temporal identifier associated with a corresponding one of the prior temporal intervals, and the elements of targeting data comprising event identifiers associated with the plurality of target events;

based on the temporal identifiers, determining, using the at least one processor, that a first subset of the second elements of consolidated data are associated with a prior training interval, and that a second subset of the second elements of consolidated data are associated with a prior validation interval; and generating, using the at least one processor, a plurality of training datasets based on the event identifiers and on corresponding portions of the first subset, and perform the operations that train the first artificial intelligence process using on the training datasets.

19. The computer-implemented method of claim 18, further comprising:

generating, using the at least one processor, a plurality of validation datasets based the event identifiers and on corresponding portions of the second subset;

using the at least one processor, applying the trained first artificial intelligence process to the plurality of validation datasets, and generating additional elements of output data based on the application of the trained first artificial intelligence process to the plurality of validation datasets;

computing, using the at least one processor, one or more validation metrics based on the additional elements of output data; and based on a determined consistency between the one or more validation metrics and a threshold condition, validating the trained first artificial intelligence process using the at least one processor.

20. The computer-implemented method of claim 14, further comprising:

using the at least one processor, obtain (i) one or more parameters that characterize a trained second artificial intelligence process and (ii) data that characterizes a composition of a second input dataset associated with the trained second artificial intelligence process;

based on the first elements of consolidated data, generating, using the at least one processor, the second input dataset in accordance with the data that characterizes the composition;

using the at least one processor, applying the trained second artificial intelligence process to the second input dataset in accordance with the one or more parameters, and based on the application of the trained second artificial intelligence process to the second input dataset, generating additional output data representative of a predicted likelihood of an occurrence of an event associated with a plurality of target event subgroups during the second temporal interval; and transmitting, using the at least one processor, at least a portion of the additional output data to the computing system.

21. An apparatus, comprising:

a memory storing instructions;

a communications interface; and at least one processor coupled to the memory and the communications interface, the at least one processor being configured to execute the instructions to:

transmit an identifier associated with a customer to a computing system via the communications interface;

receive, via the communications interface, output data associated with a plurality of target events from the computing system, the output data being generated based on an application of a trained artificial intelligence process to elements of consolidated data associated with the identifier and with a first temporal interval, the output data being representative of a predicted likelihood of an occurrence of each of the target events during a second temporal interval, the second temporal interval being subsequent to the first temporal interval and being separated from the first temporal interval by a corresponding buffer interval, the artificial intelligence process being trained using a plurality of training datasets and corresponding elements of ground-truth data, each of the training datasets being associated with a prior temporal interval, and for each of the training datasets, and the elements of ground-truth data indicate an occurrence or a non-occurrence of each of a plurality of target events during a portion of the prior temporal interval;

based on the output data, generate elements of notification data associated with the predicted likelihood of the occurrence of at least one of the target events during the second temporal interval; and transmit the elements of notification data to a device operable by the customer via the communications interface, the elements of notification data causing an application program executed at the device to present digital content associated with the at least one of the target events within a digital interface.

\* \* \* \* \*